United States Patent [19]

Someya et al.

[11] Patent Number: 5,396,257
[45] Date of Patent: Mar. 7, 1995

[54] MUTISCREEN DISPLAY APPARATUS

[75] Inventors: Ryuuichi Someya, Chigasaki; Fumio Inoue, Yokohama; Nobuaki Kabuto, Yokohama; Fumio Haruna, Yokohama; Takeshi Maruyama, Yokohama, all of Japan

[73] Assignee: Hitachi, Ltd., Tokyo, Japan

[21] Appl. No.: 889,117

[22] Filed: May 26, 1992

[30] Foreign Application Priority Data

May 24, 1991 [JP] Japan ................................. 3-119910
May 24, 1991 [JP] Japan ................................. 3-119911

[51] Int. Cl.$^6$ ............................................ G09G 1/00
[52] U.S. Cl. ........................................ 345/1; 345/20; 348/383; 348/687
[58] Field of Search ............... 340/701, 703, 728, 744, 340/793, 717; 358/160, 168, 169; 345/1, 20, 22, 138, 153, 147, 199; 348/383, 687; H04N 5/57

[56] References Cited

U.S. PATENT DOCUMENTS

| | | | |
|---|---|---|---|
| 4,746,981 | 5/1988 | Nadan et al. ....................... | 340/717 |
| 4,754,332 | 6/1988 | Bergquist .......................... | 358/168 |
| 4,825,201 | 4/1989 | Watanabe et al. ................. | 340/793 |
| 5,065,144 | 11/1991 | Edelson et al. .................... | 340/728 |

FOREIGN PATENT DOCUMENTS

| | | | |
|---|---|---|---|
| 57-111187 | 7/1982 | Japan . | |
| 4086893 | 3/1992 | Japan ................................. | 340/717 |

Primary Examiner—Richard Hjerpe
Attorney, Agent, or Firm—Antonelli, Terry, Stout & Kraus

[57] ABSTRACT

The present invention relates to a multiscreen display apparatus in which one large screen is formed by combining screens of a plurality of display units. The multiscreen display apparatus includes data converters respectively provided in the display units, the data converters receiving video signal data represented in a digital form and correcting the video signal data according to correction data obtained on the basis of display characteristics of the display units to make luminance or color shading of a plurality of divisional regions of the screen of each display unit uniform, and a control unit for controlling data correction operations of the plurality of data converters as a whole.

22 Claims, 37 Drawing Sheets

FIG. 8

| | j = 0 (000) | 1 (001) | 2 (010) | 3 (011) | 4 (100) | 5 (101) | 6 (110) | 7 (111) | 8 (000) | 9 (001) |
|---|---|---|---|---|---|---|---|---|---|---|
| i = 0 (000) | $a_{00}$ | $\frac{3}{4}a_{00}$ | $-\frac{1}{2}a_{00}$ | $-\frac{1}{4}a_{00}$ | 0 | $-\frac{1}{4}a_{08}$ | $-\frac{1}{2}a_{08}$ | $\frac{3}{4}a_{08}$ | $a_{08}$ | $\frac{3}{4}a_{08}$ |
| 1 (001) | $\frac{3}{4}a_{00}$ | $\frac{9}{16}a_{00}$ | $\frac{3}{8}a_{00}$ | $\frac{3}{16}a_{00}$ | 0 | $\frac{3}{16}a_{08}$ | $\frac{3}{8}a_{08}$ | $\frac{9}{16}a_{08}$ | $\frac{3}{4}a_{08}$ | $\frac{9}{16}a_{08}$ |
| 2 (010) | $-\frac{1}{2}a_{00}$ | $\frac{3}{8}a_{00}$ | $-\frac{1}{4}a_{00}$ | $-\frac{1}{8}a_{00}$ | 0 | $-\frac{1}{8}a_{08}$ | $-\frac{1}{4}a_{08}$ | $\frac{3}{8}a_{08}$ | $-\frac{1}{2}a_{08}$ | $\frac{3}{8}a_{08}$ |
| 3 (011) | $-\frac{1}{4}a_{00}$ | $\frac{3}{16}a_{00}$ | $-\frac{1}{8}a_{00}$ | $-\frac{1}{16}a_{00}$ | 0 | $-\frac{1}{16}a_{08}$ | $-\frac{1}{8}a_{08}$ | $\frac{3}{16}a_{08}$ | $-\frac{1}{4}a_{08}$ | $\frac{3}{16}a_{08}$ |
| 4 (100) | 0 | 0 | 0 | 0 | 0 | 0 | 0 | 0 | 0 | 0 |
| 5 (101) | $-\frac{1}{4}a_{80}$ | $\frac{3}{16}a_{80}$ | $-\frac{1}{8}a_{80}$ | $-\frac{1}{16}a_{80}$ | 0 | $-\frac{1}{16}a_{88}$ | $-\frac{1}{8}a_{88}$ | $\frac{3}{16}a_{88}$ | $-\frac{1}{4}a_{88}$ | $\frac{3}{16}a_{88}$ |
| 6 (110) | $-\frac{1}{2}a_{80}$ | $\frac{3}{8}a_{80}$ | $-\frac{1}{4}a_{80}$ | $-\frac{1}{8}a_{80}$ | 0 | $-\frac{1}{8}a_{88}$ | $-\frac{1}{4}a_{88}$ | $\frac{3}{8}a_{88}$ | $-\frac{1}{2}a_{88}$ | $\frac{3}{8}a_{88}$ |
| 7 (111) | $\frac{3}{4}a_{80}$ | $\frac{9}{16}a_{80}$ | $\frac{3}{8}a_{80}$ | $\frac{3}{16}a_{80}$ | 0 | $\frac{3}{16}a_{88}$ | $\frac{3}{8}a_{88}$ | $\frac{9}{16}a_{88}$ | $\frac{3}{4}a_{88}$ | $\frac{9}{16}a_{88}$ |
| 8 (000) | $a_{80}$ | $\frac{3}{4}a_{80}$ | $-\frac{1}{2}a_{80}$ | $-\frac{1}{4}a_{80}$ | 0 | $-\frac{1}{4}a_{88}$ | $-\frac{1}{2}a_{88}$ | $\frac{3}{4}a_{88}$ | $a_{88}$ | $\frac{3}{4}a_{88}$ |
| 9 (001) | $\frac{3}{4}a_{80}$ | $\frac{9}{16}a_{80}$ | $\frac{3}{8}a_{80}$ | $\frac{3}{16}a_{80}$ | 0 | $\frac{3}{16}a_{88}$ | $\frac{3}{8}a_{88}$ | $\frac{9}{16}a_{88}$ | $\frac{3}{4}a_{88}$ | $\frac{9}{16}a_{88}$ |

NUMERALS IN ( ) INDICATE LOWER THREE BITS

AVERAGE OF
CRT DRIVING VOLTAGE

MUTISCREEN DISPLAY APPARATUS

BACKGROUND OF THE INVENTION

The present invention relates to a multiscreen display apparatus for forming one screen by combining a plurality of image display units, and in particular to an apparatus for correcting luminance shading and color shading of the multiscreen display apparatus.

In multiscreen displays, one large screen is formed by piling up a plurality of display units $1a$–$1d$ as shown in FIG. 1. In case the same picture area is to be obtained, such multiscreen displays can be shortened in depth of entire apparatus and have comparatively high luminance as compared with single large-picture displays of front projection type and back projection type. Therefore, such multiscreen displays are used in event sites and showrooms, for example. As individual display units (hereafter referred to as cores), display units of cathode-ray tube (CRT) direct-view type or projection type have been put to practical use. Above all, cores of projection type have been put to frequent use because they are lighter in weight and have flat faces as compared with cores of direct-view type. However, cores of CRT direct-view type and projection type have inherent luminance shading in which the peripheral part (shaded region of FIG. 1) is typically darker than the central region of the screen. Especially in case of multiscreen display, that shading becomes prominent. In a measure against such a problem as described in JP-A-57-111187, overscan is so performed as to cause overlap to compensate for the luminance lowering in the peripheral parts between cores and thereby make the screen luminance uniform.

In the technique disclosed in the above described JP-A-57-111187, however, images must be aligned in overscan regions between cores and all characteristics such as convergence and distortion correction must be matched between cores. This technique has thus many problems to be solved for practical use. Therefore, nonuniformity in luminance should be solved for each core.

FIG. 2 is an example of a block diagram showing the configuration of a multiscreen display apparatus. Numeral 40 denotes an image expansion device, $4a$–$4d$ and 41 video signal input terminals, $1a$–$1d$ cores, 6 a comparison circuit for ABL, and $60a$–$60d$ ABL control information input terminals. A video signal output of the image expansion device 40 is so converted on time axis and applied to the upper left core $1a$ that the former halves of a horizontal scanning interval and a vertical scanning interval of an ordinary video signal may be so displayed as to fill up the screen. In the same way, the video signal output of the image expansion device 40 is so converted on time axis and applied to the upper right core $1b$ that the latter half of a horizontal scanning interval of the above described video signal and the former half of a vertical scanning interval of the video signal may be so displayed as to fill up the screen. With respect to the cores $1c$ and $1d$ as well, similar time-axis conversion processing is applied.

In this case, contents of video signals inputted to respective cores basically differ. If ABL (automatic brightness limit) functions independently in respective cores, therefore, contrasts of respective cores differ. As shown in FIG. 2, therefore, respective cores output ABL control information to the input terminals $60a$–$60d$, respectively. Further, the display apparatus is so configured that the ABL control information of a core having the highest average luminance may be detected by the comparison circuit 6 for ABL and screen luminance of all cores may be controlled in common in accordance with the ABL control information thus detected. As a result, ABL does not function independently for respective cores, but in principle control is so exercised that the luminance of all cores may become constant.

In the core outputting the maximum value of the ABL control information, its own control information is fed back and hence closed loop control using ABL is effected. In each of remaining cores, however, control information transmitted from other cores is supplied instead of its control information, resulting in open loop control. Because of dispersion of gains of respective open loops, i.e., because of dispersion of gains of the contrast and/or luminance control circuit and an ABL circuit, contrasts of cores do not perfectly coincide with each other, resulting in a problem of dispersion of luminance level. For example, it is now assumed that gray having a constant luminance is displayed on the four cores of FIG. 1 and a character or the like having a high luminance is added to only the core $1a$. If the average luminance of the screen $1a$ is at least a predetermined luminance, the ABL automatically outputs the ABL control information to the contrast and/or luminance control circuit to lower the average luminance of the screen of $1a$. The average luminance of other cores $1b$–$1d$ is also lowered by the ABL control information of the above described $1a$. If gains of the contrast and/or luminance control circuit and the ABL circuit have dispersion, however, there occurs difference between luminance levels of $1a$–$1d$, resulting in a problem of discontinuity of luminance at boundary between cores.

SUMMARY OF THE INVENTION

A first object of the present invention is to provide a multiscreen display apparatus capable of reducing the luminance shading and color shading between a plurality of display units.

In accordance with the present invention, this object is achieved by providing data converters for electrically correcting video signals respectively for respective cores, connecting respective data converters to one computer control device, and controlling data conversion methods of respective data converters via the computer control device so as to remove luminance shading of each core.

After screens are adapted to have a predetermined luminance, the above described computer control device is manipulated to adjust the luminance shading of each core so that the luminance shading of each core may be eliminated. If thereafter a further adjustment is so made as to remove luminance difference between cores, the screen luminance can be made more uniform. By repeating this manipulation while changing the luminance, it is possible to obtain uniform multiscreen display images free from color shading, not to mention luminance shading at all luminance levels.

A second object of the present invention is to provide a multiscreen display apparatus free from luminance shading and color shading between a plurality of cores by absorbing dispersion of characteristics of automatic brightness limit circuits in a plurality of cores of a multiscreen display apparatus using CRTs as cores.

In accordance with the present invention, the above described object is achieved by providing a reference voltage insertion circuit for inserting common reference voltage in the retrace line interval or the interval corresponding to overscan of the video signal inputted to each core, taking out a reference voltage signal included in the above described video signal from a stage succeeding the contrast and/or luminance control circuit of each core, and applying feedback control so as to make reference signal levels coincide between cores.

BRIEF DESCRIPTION OF THE DRAWINGS

FIG. 8 is a diagram for explaining data of a coefficient addition circuit according to the present invention;

DESCRIPTION OF THE PREFERRED EMBODIMENTS

Figure 3:
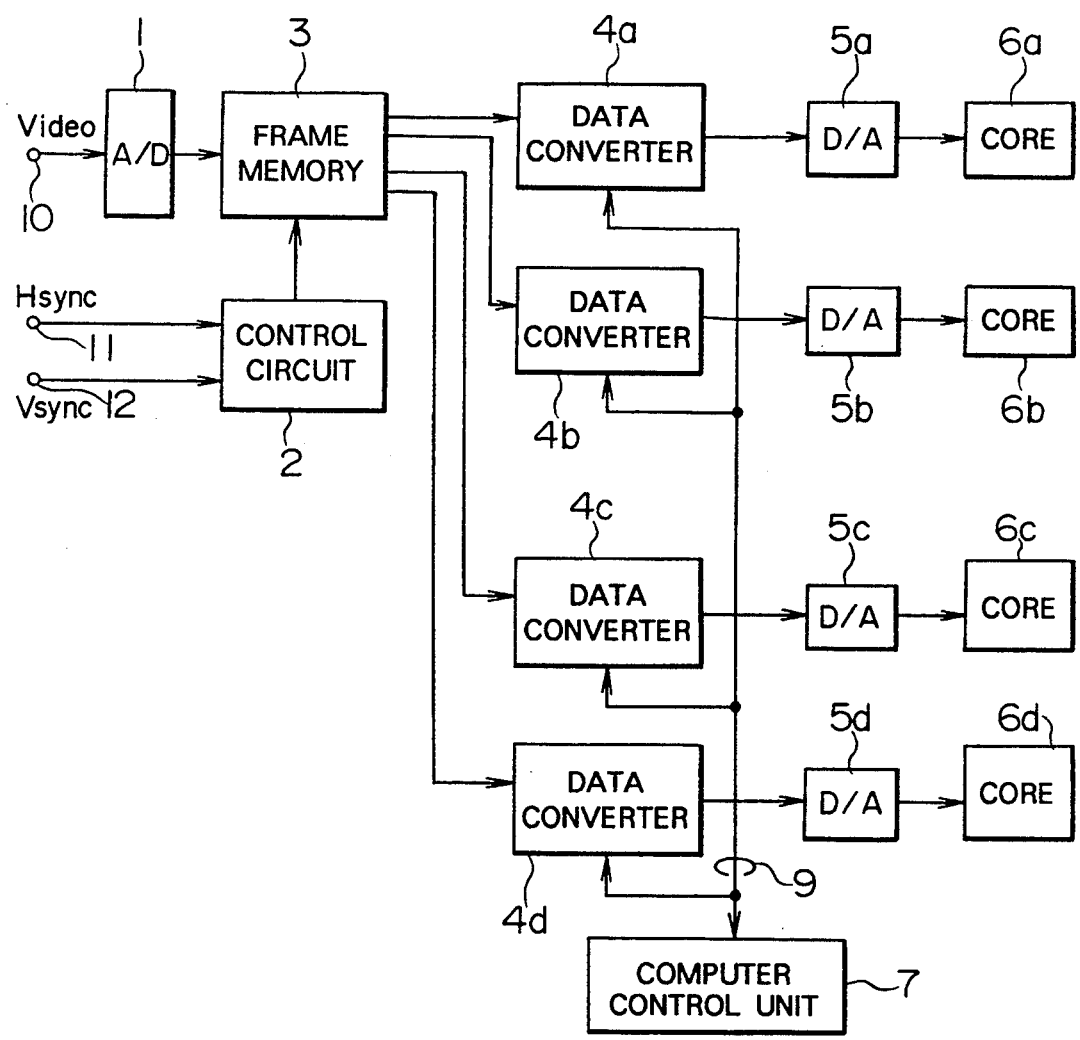
FIG. 3 is a circuit block diagram of a multiscreen display apparatus according to the present invention.

A first embodiment of the present invention is shown in FIG. 3.

Figure 1:
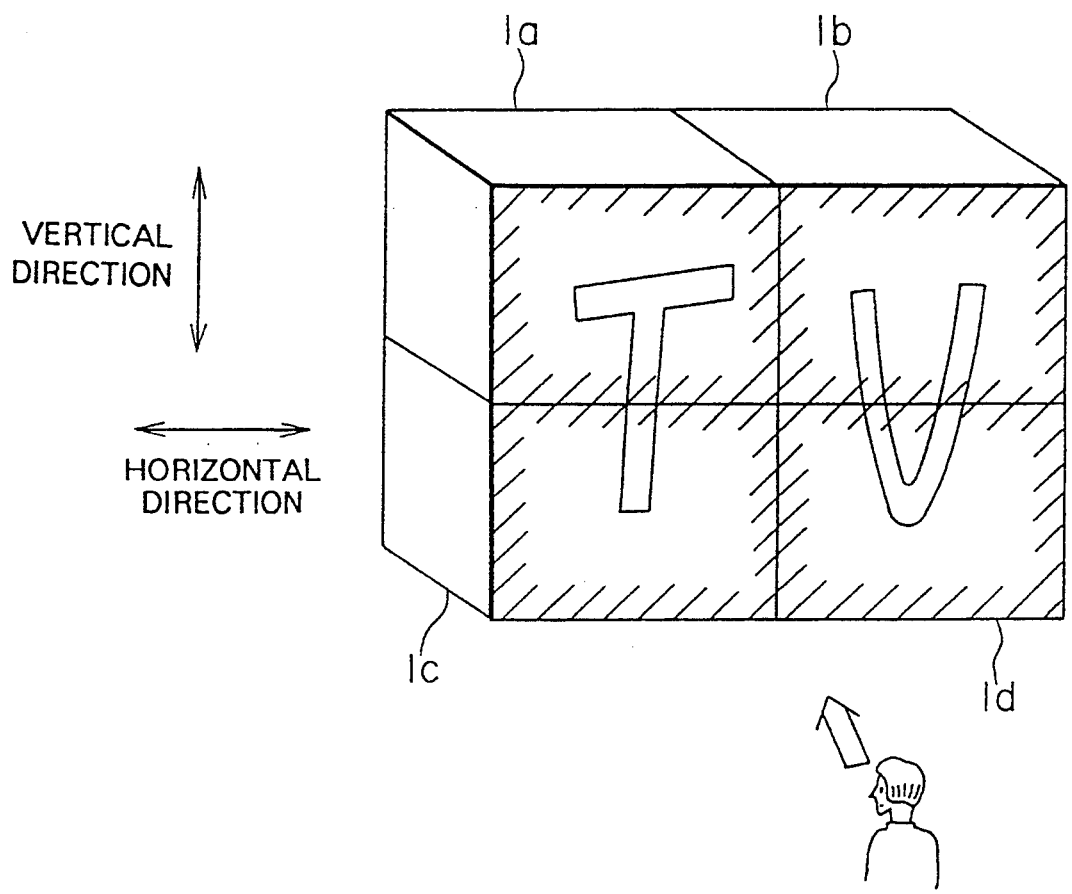
FIG. 1 is a structure diagram of an example of a multiscreen display apparatus.

FIG. 3 is a block diagram of an embodiment of a multiscreen display system using four cores, for example. Multiscreen display can be configured as shown in FIG. 1. As cores 6a, 6b, 6c and 6d, television sets of CRT projection type, for example, can be used.

The system of FIG. 3 includes an A/D converter 1, a control circuit 2, a frame memory 3, data converters 4a, 4b, 4c and 4d, D/A converters 5a, 5b, 5c and 5d, cores 6a, 6b, 6c and 6d, and a computer control device 7. In the present embodiment, the computer control device 7 connected to the data converters 4a, 4b, 4c and 4d via a bus 9 is provided to make corrections in luminance shading of each of the cores 6a, 6b, 6c and 6d and in luminance shading between the cores 6a, 6b, 6c and 6d. In order to make luminance shading corrections for each of the cores 6a, 6b, 6c and 6d, each screen of the cores 6a, 6b, 6c and 6d is divided into a plurality of blocks and a look-up table (LUT), for example, is provided for each block. The data converters 4a, 4b, 4c and 4d include such look-up tables. The computer control device 7 may include a microcomputer, for example.

The outline of the operation of the system shown in FIG. 3 will now be described. The video signal inputted to a terminal 10 is converted to a digital signal by the A/D converter 1 and written into the frame memory 3. The video signal written into the frame memory is read out under the control of the control circuit 2. The video signal read out from the field memory 3 is inputted to the data converters 4a, 4b, 4c and 4d, and converted into data corrected in luminance shading of each of the cores 6a, 6b, 6c and 6d and in luminance shading between the cores 6a, 6b, 6c and 6d. The data thus converted are converted into analog signals by the D/A converters 5a, 5b, 5c and 5d, and displayed on the cores 6a, 6b, 6c and 6d, respectively.

Figure 4:
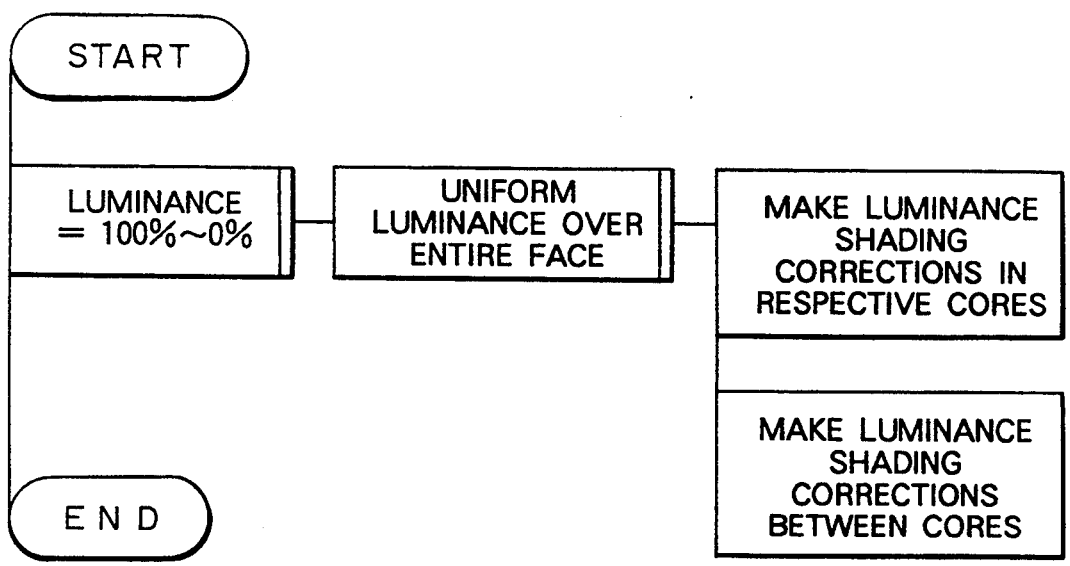
FIG. 4 is a flow chart showing a procedure of luminance shading correction.

By taking FIG. 1 as an example, an example of luminance shading correction procedure of the screen will now be described. The procedure is shown in FIG. 4.

Figure 5:
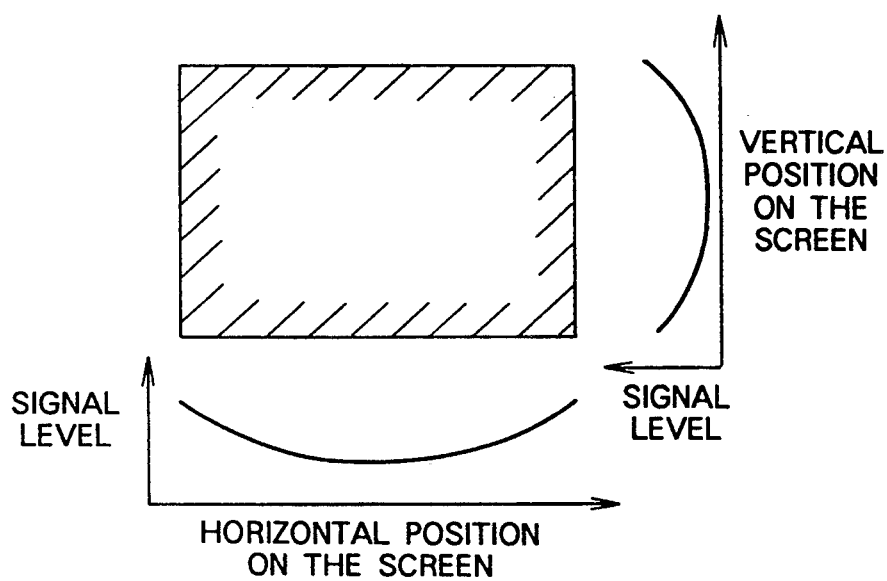
FIG. 5 shows an example of luminance shading in a display unit.

As an example of luminance shading of the cores 6a, 6b, 6c and 6d, luminance shading between the central part and the peripheral part of the screen, which in fact frequently occurs in display units of CRT projection type as shown in FIG. 5, will now be considered. Further, it is assumed that the screen of FIG. 5 is divided into 128 parts, for example, in each of the horizontal and vertical directions, resulting in a total of 16,384 blocks. Of course, an LUT is associated with each block.

Assuming that the luminance is 100%, correction of luminance shading is made in each of the cores 6a, 6b, 6c and 6d. As for the luminance shading correction of each core, LUT data of 16,384 blocks, for example, of each core are rewritten to make the luminance within the cores 6a, 6b, 6c and 6d uniform. As a matter of course, LUT data may be rewritten one by one. For convenience of use, however, data to LUT may be computed and rewritten one by one by the computer control device by using a function such as a parabolic wave as shown in FIG. 5, for example. After corrections are thus made for luminance shading in each of the cores 6a, 6b, 6c and 6d, corrections are made for luminance shading between the cores 6a, 6b, 6c and 6d. For example, data of the data converters 4b, 4c and 4d may be rewritten to become values obtained by adding/subtracting a fixed level thereto/therefrom so that the luminance of the cores 6b, 6c and 6d may become equivalent to the luminance of the core 6a taken as the reference.

If luminance shading occurs in each core as a result of corrections of luminance shading between cores, corrections for luminance shading in each core are made again and corrections for luminance shading between cores are made. This is repeated until the entire face becomes uniform.

In the LUTs of the data converters 4a, 4b, 4c and 4d, correction data for achieving 100% luminance uniformly are thus fixed. By making luminance corrections according to the procedure heretofore described up to 0% luminance for a plurality of luminance levels, it is possible to obtain uniform image display clear of luminance shading.

It is evident that color shading in the screen can also be corrected by making corrections for luminance shading at each luminance while keeping white balance.

As heretofore described, it is possible to obtain uniform multiscreen display clear of luminance shading and color shading.

The output of the frame memory 3 is inputted to the data converters 4a, 4b, 4c and 4d. As a matter of course, however, the present invention can also be applied to the case where A/D converters are so provided as to be respectively associated with the data converters 4a, 4b, 4c and 4d and separate video signals are inputted to the data converters 4a, 4b, 4c and 4d. Further, if cores having digital input and output terminals, for example, are used, outputs of the data converters can be directly inputted to the cores without being subject to D/A conversion and the D/A converters 5a, 5b, 5c and 5d become unnecessary.

It is a matter of course that the number of cores can be arbitrarily chosen. By increasing the number of data converters according to the number of cores and connecting the data converters to the computer control device 7 via the bus 9, it becomes possible to obtain uniform image display clear of luminance shading and color shading even in a multiscreen display having an arbitrary number of cores.

Figure 6:
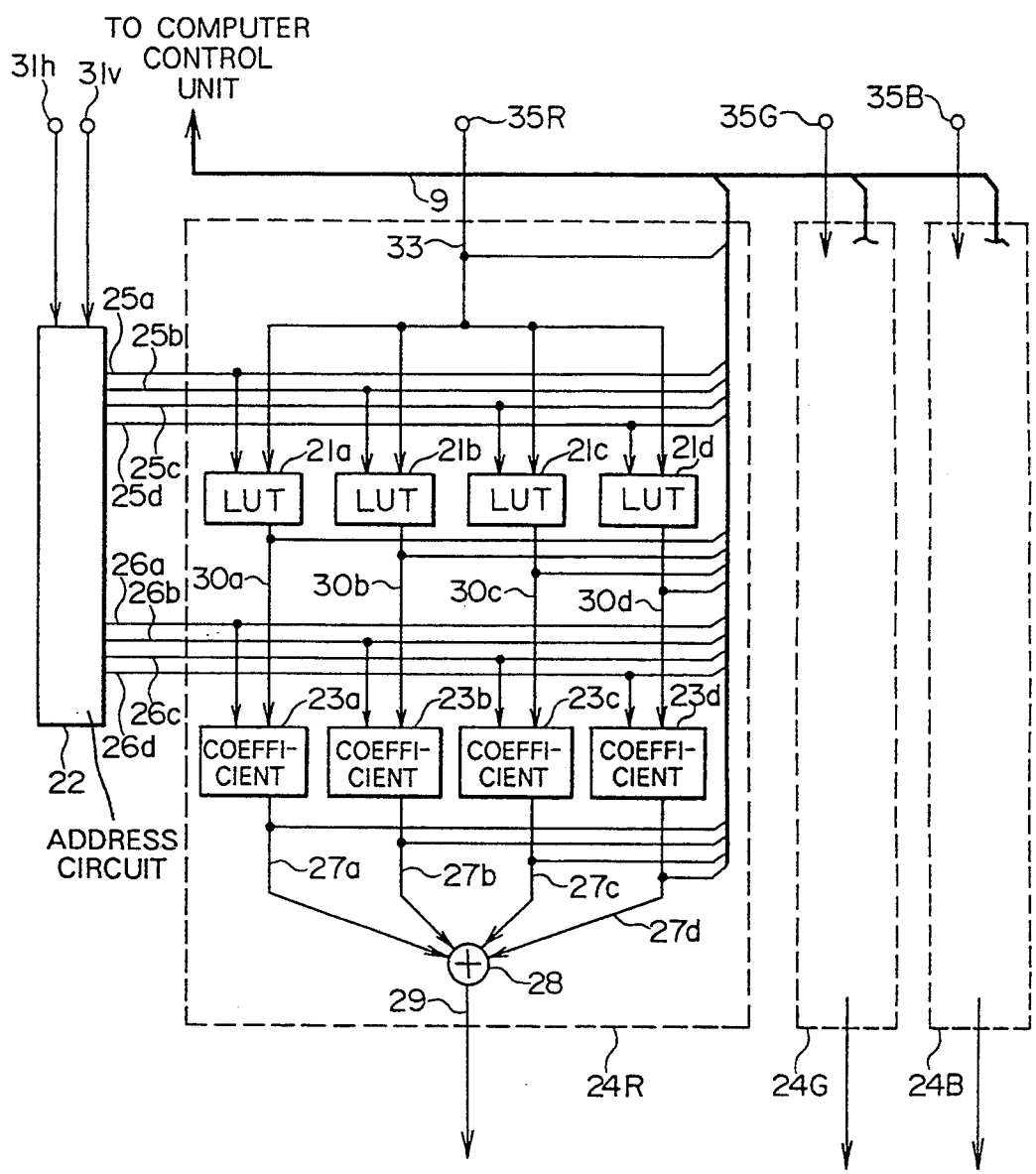
FIG. 6 is a circuit block diagram of a data converter according to the present invention.

FIG. 6 shows an example of concrete configuration of one of the data converters 4a, 4b, 4c and 4d used in the embodiment of FIG. 3. (The data converters 4a, 4b, 4c and 4d may have the same configuration.) In the data converter of the present embodiment, the memory capacity of the LUT used in the data converter is reduced and the data rewriting time is shortened by using interpolation.

Assuming that a digital image signal has 8 bits per pixel (0 to 255 gradation levels) and the luminance of the peripheral part of the screen is 75% as compared with the central part of the screen, for example, correction corresponding to the luminance difference of 25% (64 gradation levels) between the central part and the peripheral part becomes necessary. Because of difference in correction curve between blocks, luminance difference occurs and becomes prominent in joining parts (boundary regions) between blocks, resulting in a problem. In order to prevent this problem, correction between blocks is defined as approximately one gradation level, for example. In this case, the number of divisions from the central part to the peripheral part becomes 64 and the entire display screen is divided into 128 parts in each of the horizontal and vertical directions and includes $128 \times 128 = 16,384$ blocks.

Assuming that correction data of 8 bits corresponding to 256 gradation levels per block are required for each of three primary colors, the LUT must have a large capacity of data amounting to 16, $384 \times 256 \times 8 \times 3 = 96$ Mbits. (In accordance with the custom, the memory capacity is indicated by the units represented as 1024 bit=1 Kbit and 1024 Kbit=1 Mbit.)

Therefore, blocks are divided into blocks having correction data and blocks having no correction data. From the blocks having correction data, data of blocks having no correction data are derived by interpolation. If correction data are provided only for $4 \times 4 = 16$ blocks, for example, therefore, the capacity of the memory for storing correction data can be reduced to nearly 1/16 and the data rewriting time is reduced to 1/16 as compared with the method of providing 16,384 blocks with correction data.

The configuration of FIG. 6 will now be described. In FIG. 6, 21a, 21b, 21c and 21d denote LUTs, and 23a, 23b, 23c and 23d denote coefficient addition circuits. Numeral 28 denotes an adder. Terminals 35R, 35G and 35B are input terminals of digital video signals RGB.

The digital video signal output of 8 bits of R (red), for example, from the frame memory 3 is inputted to the low-order address of the LUTs 21a, 21b, 21c and 21d in parallel.

A horizontal driving pulse and a vertical driving pulse indicating a display position are applied to an address circuit 22 via terminals 31h and 31v. The horizontal driving pulse and the vertical driving pulse may be respectively a data read clock of the horizontal direction of the frame memory 3 and a data read clock of the vertical direction of the frame memory 3, for example.

On the basis of the horizontal driving pulse and the vertical driving pulse respectively applied to the terminals 31$h$ and 31$v$, the address circuit 22 generates horizontal block position data and vertical block position data indicating the position of a block obtained by dividing the screen. Then the address circuit 22 inputs LUT control signals 25$a$, 25$b$, 25$c$ and 25$d$ based upon the above described block position data to the high-order address, for example, of the LUTs 21$a$, 21$b$, 21$c$ and 21$d$. As a result, video signals 30$a$, 30$b$, 30$c$ and 30$d$, which have undergone data conversion and which correspond to four blocks, are obtained in the LUTs 21$a$, 21$b$, 21$c$ and 21$d$. At the same time, the address circuit 22 supplies coefficient selection signals 26$a$, 26$b$, 26$c$ and 26$d$ to the coefficient addition circuits 23$a$, 23$b$, 23$c$ and 23$d$ on the basis of the above described block position data. The above described video signals 30$a$, 30$b$, 30$c$ and 30$d$ corresponding to four blocks are preferably multiplied by predetermined coefficients for the coefficient selection signals, respectively. Resultant product signals 27$a$, 27$b$, 27$c$ and 27$d$ are obtained. By supplying these signals to the adder 28 to add them together, a spatially interpolated digital video signal 29 is so obtained as to be associated with a block position. The spatially interpolated digital video signal 29 is converted into an analog signal preferably by a D/A converter and inputted to the cores to yield a video image. Although the block 24R has heretofore been described, similar operation may be performed for 24G and 24B as well.

On the other hand, the bus 9 is connected to address lines 25$a$, 25$b$, 25$c$, 25$d$ and 33 as well as buses 30$a$, 30$b$, 30$c$ and 30$d$ of the LUTs 21$a$, 21$b$, 21$c$ and 21$d$. The bus 9 is also connected to buses 26$a$, 26$b$, 26$c$ and 26$d$ as well as buses 27$a$, 27$b$, 27$c$ and 27$d$ of the coefficient addition circuits 23$a$, 23$b$, 23$c$ and 23$d$. Via this bus 9, the LUTs 21, the coefficient addition circuits 23 and the computer control device 7 transmit/receive data and make corrections for luminance shading of the screen by utilizing the retrace line interval of the video signal, for example.

Operation of the data converter configured as heretofore described will hereafter be described.

Figure 7:
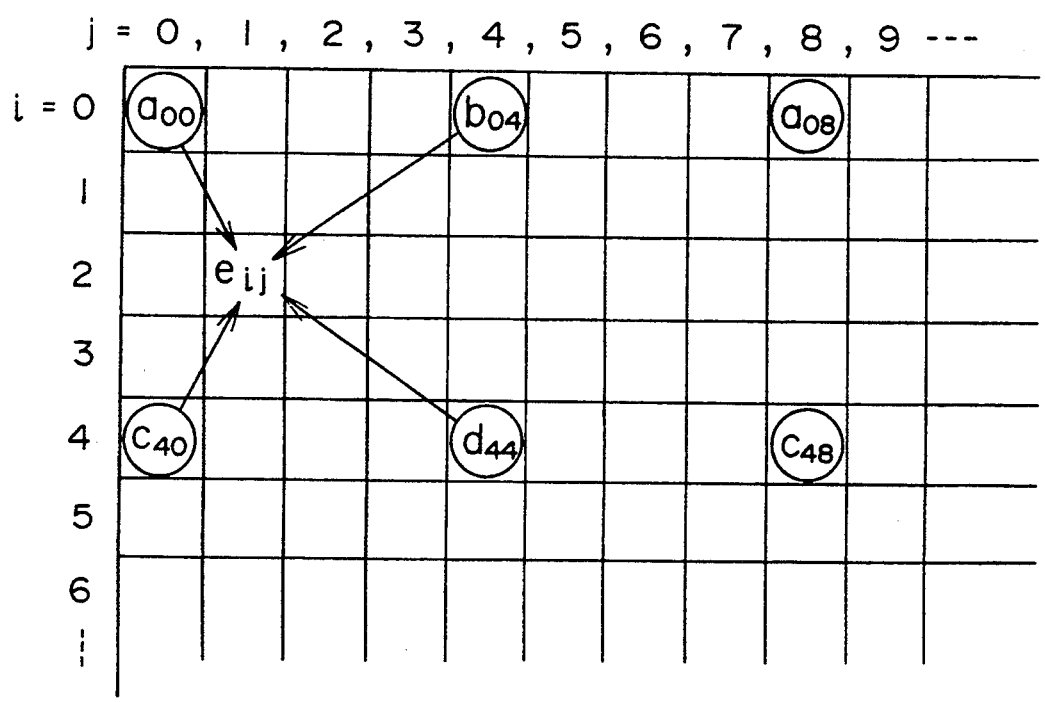
FIG. 7 is a diagram for explaining the operation of the circuit of FIG. 6.

FIG. 7 is a diagram for explaining the operation of the data converter shown in FIG. 6. From four blocks in vicinity, for example, having correction data, a corrected digital video signal $eij$ of a block having no correction data is derived by means of interpolation.

In FIG. 7, i and j represent a vertical block position and a horizontal block position, respectively. Hereafter, the position of a block is indicated by coordinates (i, j). Marks ○ are entered in blocks every four horizontal and vertical blocks having correction data.

It is now assumed that the LUTs 21$a$, 21$b$, 21$c$ and 21$d$ respectively store correction data of blocks (8$m$, 8$n$), (8$m$+4, 8$n$), (8$m$, 8$n$+4) and (8$m$+4, 8$n$+4), where m and n are integers and at least 0.

At this time, in the range $0 \leq i$, $j \leq 4$, correction data $a_{00}$, $b_{04}$, $c_{40}$ and $d_{44}$ of four blocks (0, 0), (0, 4), (4, 0) and (4, 4) located in the vicinity to the (i, j) block are utilized.

A video signal $eij$ corresponding to the input video signal of the (i, j) block can thus be derived by two-dimensional linear interpolation as represented by expression (1), for example.

$$eij = (1/16)\{(4-i)(4-j)a_{00} + (4-i)jb_{00} + i(4-j)c_{40} + ijd_{44}\} \quad (1)$$

That is to say, the corrected digital video signal $eij$ is obtained by multiplying the digital video signals $a_{00}$, $b_{04}$, $c_{40}$ and $d_{44}$ by respective predetermined coefficients and thereafter adding resultant products together. The circuit for performing the multiplication by the coefficients and addition includes the coefficient addition circuits 23$a$, 23$b$, 23$c$ and 23$d$ as well as the adder 28. Since $a_{00}$, $b_{04}$, $c_{40}$ and $d_{44}$ are data corrected in luminance shading as heretofore described, the video signal $eij$ interpolated from them has also been corrected in luminance shading.

Operation of the coefficient addition circuit will now be described by taking the coefficient addition circuit 23$a$ as an example.

As shown in FIG. 6, the output video signal 30$a$ (corresponding to video signals $a_{00}$ and $a_{08}$ in FIG. 7) of the LUT 21$a$ and the coefficient selection signal 26$a$ are inputted to the coefficient addition circuit 23$a$. The coefficient addition circuit 23$a$ is a circuit for deriving output data corresponding to the first term of the expression (1). These relations are put together in FIG. 8.

FIG. 8 is a diagram showing output data of the coefficient addition circuit 23$a$ in the above described first embodiment. In the same way as LUT, the coefficient addition circuit can be implemented by using a memory and so forth, for example. The 8-bit video signal 30$a$ switched as $a_{00}$, $a_{08}$, $a_{80}$ and so forth according to the block position may be supplied to the low-order address, for example. Three low-order bits of the address i and three low-order bits of the address j indicating the block position, i.e., 6 bits in total may be supplied to the high-order address, for example. In this configuration of 14-bit address and 8-bit data, the capacity required of the memory included in the coefficient addition circuit 23$a$ is 16 Kbits × 8 = 128 Kbits. At this time, the sum of the memory capacity of the coefficient addition circuit 23$a$ and the memory capacity of the LUT becomes 2 Mbits + 128 Kbits × 4 = 2.5 Mbits. A total memory capacity for three primary colors becomes 2.5 Mbits × 3 = 7.5 Mbits. Viewing the system as a whole, the memory capacity can be significantly reduced as compared with the above described 96 Mbits.

As understood from FIG. 8, there are only ten kinds of coefficients, 0, 1/16, 1/8, 3/16, 1/4, 3/8, 1/2, 9/16, 3/4 and 1 required of the coefficient addition circuit 23. By devising the coefficient selection signals, therefore, only ten kinds are required instead of 64 kinds of coefficient selection signals corresponding to 6 bits, which are the sum of 3 low-order bits of the address i and 3 low-order bits of the address j indicating the block position in case the coefficient addition circuit 23 is formed by using a memory. Therefore, the memory capacity of the coefficient addition circuit becomes 256 × 10 × 8 = 20 Kbits. That is to say, the memory capacity of the coefficient addition circuit can be reduced to 1/6 of the above described 128 Kbits.

On the basis of this technique for reducing the memory capacity, the concrete circuit configuration and operation of the address circuit 22 in the embodiment of FIG. 6 as well as the operation of the coefficient addition circuits 23$a$, 23$b$, 23$c$ and 23$d$ will hereafter be described.

Figure 9:
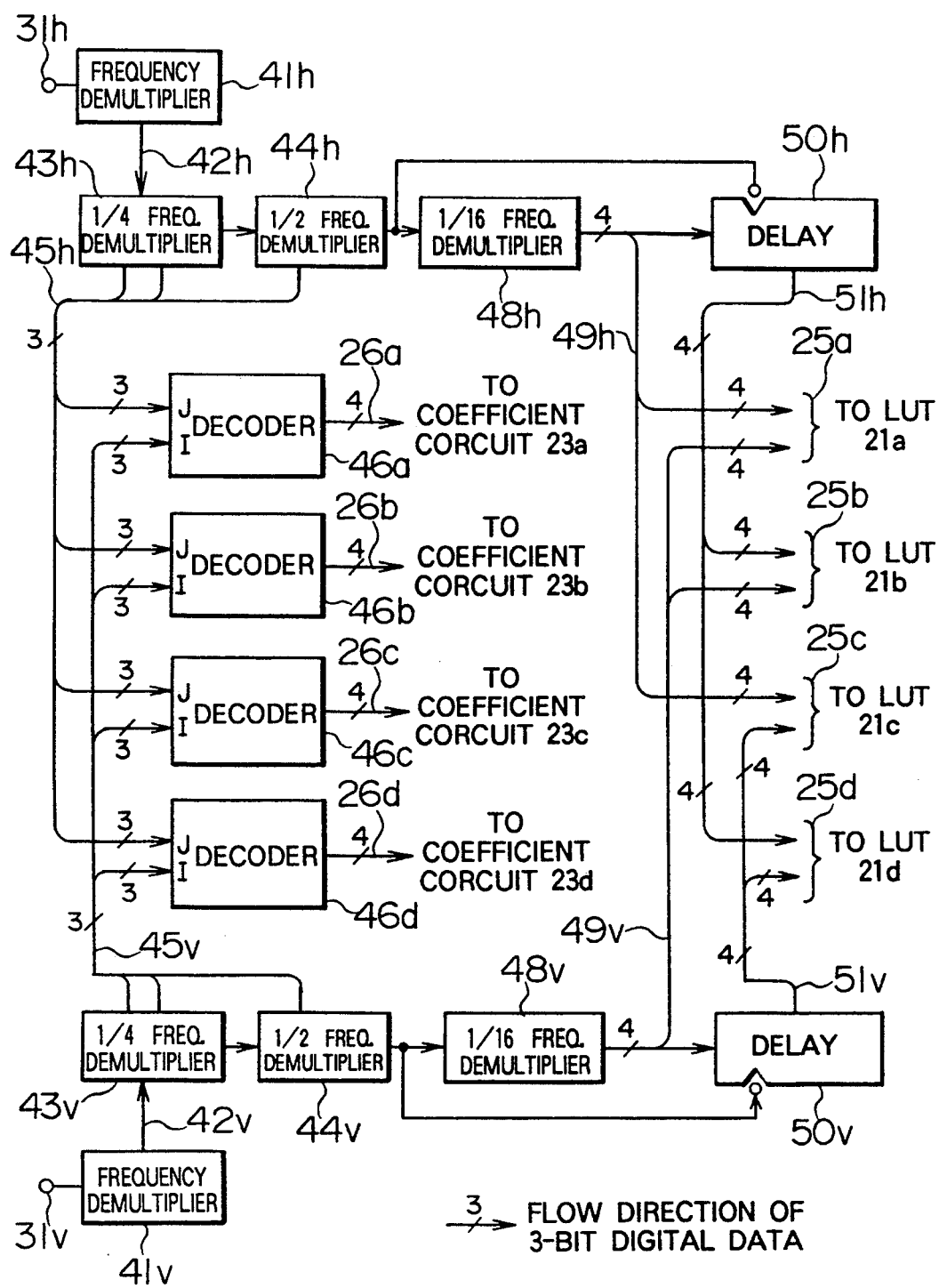
FIG. 9 is a block diagram of an address circuit according to the present invention.

FIG. 9 is a block diagram showing an example of configuration of the address circuit 22. The horizontal driving pulse and the vertical driving pulse are supplied to the input terminals 31$h$ and 31$v$. A horizontal clock pulse 42$h$ and a vertical block pulse 42$v$ are derived by frequency demultipliers 41$h$ and 41$v$. By applying frequency demultiplication to the horizontal block pulse 42$h$ in a frequency demultiplier 43$h$ having a ratio of ¼ and a frequency demultiplier 44h having a ratio of ½, a 3-bit low-order signal 45h of the horizontal block position j is derived and supplied to the low-order address of decoders 46a, 46b, 46c and 46d. In the same way, a 3-bit low-order signal 45v of the vertical block position i is derived by applying frequency demultiplication to the vertical block pulse 42v in a frequency demultiplier 43v having a ratio of ¼ and a frequency demultiplier 44v having a ratio of ½. The 3-bit low-order signal 45v thus derived is supplied to the high-order address of decoders 46a, 46b, 46c and 46d. On the basis of 3-bit low-order signals 45h and 45v respectively of the horizontal and vertical block positions i and j, the decoders 46a, 46b, 46c and 46d derive 4-bit coefficient selection signals 26a, 26b, 26c and 26d to be respectively supplied to the coefficient addition circuits 23a, 23b, 23c and 23d.

The output signal of the frequency demultiplier 44h having a ratio of ½ is further demultiplied in frequency to 1/16 by a frequency demultiplier 48h having a ratio of 1/16. A 4-bit high-order signal 49h of the horizontal block position j is used as the low-order control signal of the LUT control signals 25a and 25c respectively of the LUTs 21a and 21c. A signal 51h obtained by delaying the 4-bit high-order signal 49h of the horizontal block position j in a delay circuit 50h is used as the low-order control signal of the LUT control signals 25b and 25d respectively of the LUTs 21b and 21d. The delay circuit is used because each LUT has correction data every 8 horizontal blocks and corresponding blocks of correction data stored in the LUTs 21b and 21d are displaced by 4 horizontal blocks as compared with the LUTs 21a and 21c. In the same way, the output signal of the frequency demultiplier 44v having a ratio of ½ is further demultiplied in frequency to 1/16 by a frequency demultiplier 48v having a ratio of 1/16. A 4-bit high-order signal 49v of the vertical block position i is used as the high-order control signal of the LUT control signals 25a and 25b respectively of the LUTs 21a and 21b. A signal 51v obtained by delaying the 4-bit high-order signal 49v of the horizontal block position i in a delay circuit 50v is used as the low-order control signal of the LUT control signals 25c and 25d respectively of the LUTs 21c and 21d.

Table 1 indicates the association of coefficient selection signal inputs of the coefficient addition circuit with the above described 10 kinds of coefficients.

TABLE 1

| Coefficient selection signal | 0 | 1 | 2 | 3 | 4 | 5 | 6 | 7 | 8 | 9 | 10–15 |
|---|---|---|---|---|---|---|---|---|---|---|---|
| Coefficient | 0 | 1/16 | 1/8 | 3/16 | 1/4 | 3/8 | 1/2 | 9/16 | 3/4 | 1 | — |

In order to make a selection out of ten kinds of coefficients, a 4-bit coefficient selection signal is used. This corresponds to the coefficient selection signals 26a, 26b, 26c and 26d shown in FIG. 9. By determining in this way, the circuit scale of the coefficient addition circuit can be decided as 20 Kbits as described before. On the basis of the output data of the coefficient addition circuit 23a shown in FIG. 8, Table 2 shows relations between the vertical and horizontal block positions i and j and the coefficient selection signal by using the coefficient selection signal of Table 1. This becomes an input-output table of the decoder 46a.

TABLE 2

| I \ J | 0 | 1 | 2 | 3 | 4 | 5 | 6 | 7 |
|---|---|---|---|---|---|---|---|---|
| 0 | 9 | 8 | 6 | 4 | 0 | 4 | 6 | 8 |
| 1 | 8 | 7 | 5 | 3 | 0 | 3 | 5 | 7 |
| 2 | 6 | 5 | 4 | 2 | 0 | 2 | 4 | 5 |
| 3 | 4 | 3 | 2 | 1 | 0 | 1 | 2 | 3 |
| 4 | 0 | 0 | 0 | 0 | 0 | 0 | 0 | 0 |
| 5 | 4 | 3 | 2 | 1 | 0 | 1 | 2 | 3 |
| 6 | 6 | 5 | 4 | 2 | 0 | 2 | 4 | 5 |
| 7 | 8 | 7 | 5 | 3 | 0 | 3 | 5 | 7 |

In the same way, input-output tables of the decoders 46b, 46c and 46d are derived as shown in Tables 3, 4 and 5.

TABLE 3

| I \ J | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 4 | 3 | 2 | 1 | 0 | 1 | 2 | 3 |
| 2 | 6 | 5 | 4 | 2 | 0 | 2 | 4 | 5 |
| 3 | 8 | 7 | 5 | 3 | 0 | 3 | 5 | 7 |
| 4 | 9 | 8 | 6 | 4 | 0 | 4 | 6 | 8 |
| 5 | 8 | 7 | 5 | 3 | 0 | 3 | 5 | 7 |
| 6 | 6 | 5 | 4 | 2 | 0 | 2 | 4 | 5 |
| 7 | 4 | 3 | 2 | 1 | 0 | 1 | 2 | 3 |

TABLE 4

| I \ J | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 4 | 3 | 2 | 1 | 0 | 1 | 2 | 3 |
| 2 | 6 | 5 | 4 | 2 | 0 | 2 | 4 | 5 |
| 3 | 8 | 7 | 5 | 3 | 0 | 3 | 5 | 7 |
| 4 | 9 | 8 | 6 | 4 | 0 | 4 | 6 | 8 |
| 5 | 8 | 7 | 5 | 3 | 0 | 3 | 5 | 7 |
| 6 | 6 | 5 | 4 | 2 | 0 | 2 | 4 | 5 |
| 7 | 4 | 3 | 2 | 1 | 0 | 1 | 2 | 3 |

TABLE 5

| I \ J | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 1 | 2 | 3 | 4 | 3 | 2 | 1 |
| 2 | 0 | 2 | 4 | 5 | 6 | 5 | 4 | 2 |
| 3 | 0 | 3 | 5 | 7 | 8 | 7 | 5 | 3 |
| 4 | 0 | 4 | 6 | 8 | 9 | 8 | 6 | 4 |
| 5 | 0 | 3 | 5 | 7 | 8 | 7 | 5 | 3 |
| 6 | 0 | 2 | 4 | 5 | 6 | 5 | 4 | 2 |
| 7 | 0 | 1 | 2 | 3 | 4 | 3 | 2 | 1 |

These decoders can also be implemented as LUTs using memories. As for the memory capacity at this time, the address has 3 low-order bits of the vertical block position i and 3 low-order bits of the horizontal block position j. That is to say, each address has a total of 6 bits. Each output data has 4 bits. Therefore, the memory capacity becomes 64×4=256 bits.

Results heretofore described can be collected as below. In case the above described 128×128 blocks are used, the memory capacity required for one color becomes 0.5 Mbits×4=2 Mbits for LUT, 20

Kbits×4=80 Kbits for coefficient addition circuit, and 256×4 =1 Kbits for address addition circuit. That is to say, the total memory capacity required for one color becomes 2.1 Mbits. Even if three primary colors are taken into consideration, the decoder can be formed with 2.1 Mbits ×3=6.3 Mbits. In this way, the memory capacity can be reduced to nearly 1/16 as compared with the above described 96 Mbits. The time required for the computer control device 7 to rewrite LUT data can be shortened, and the time for adjustment work can be shortened.

Figure 10:
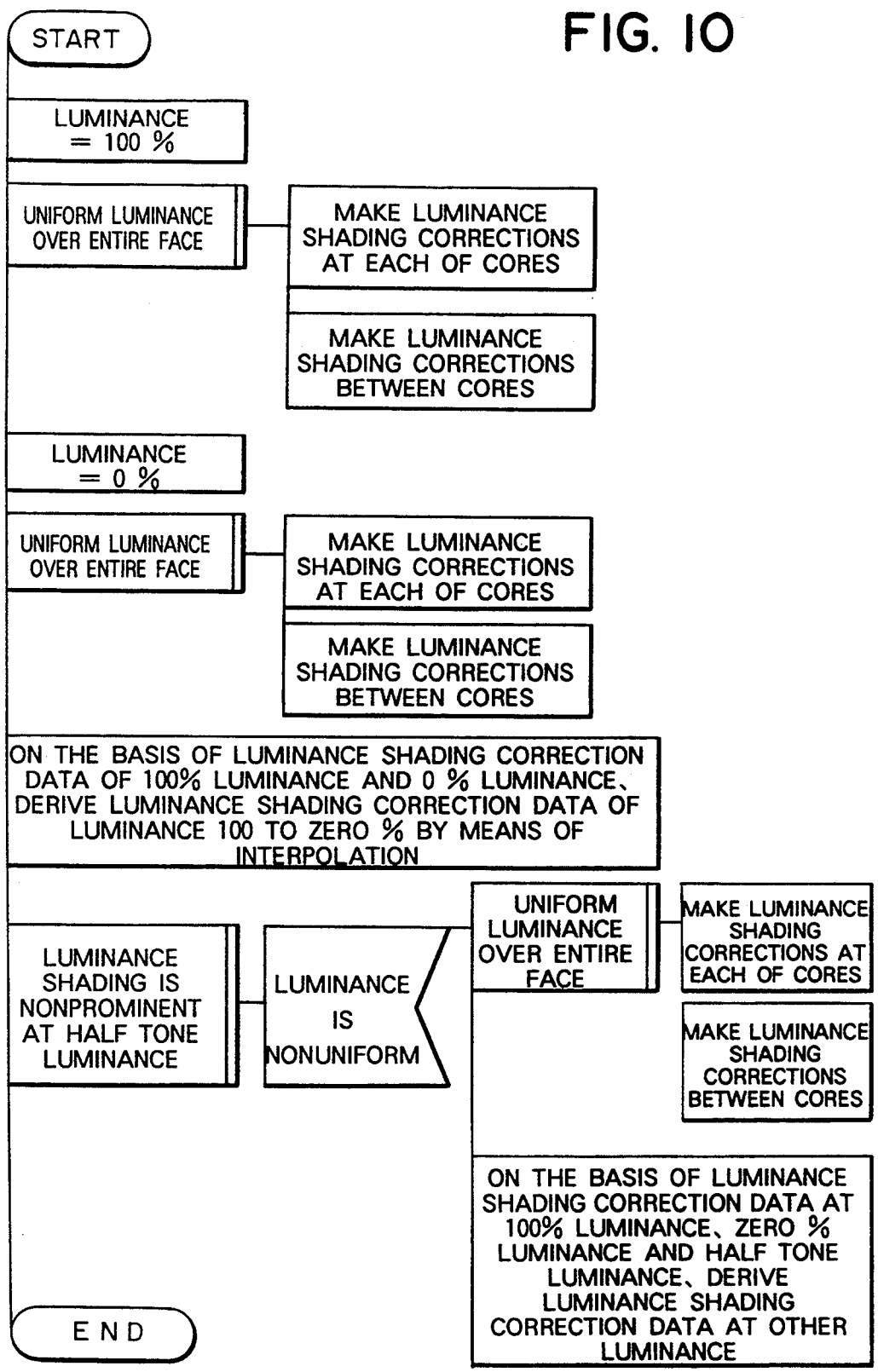
FIG. 10 is an operation flow chart of a circuit according to the present invention.

A procedure of luminance shading correction in a different embodiment of the present invention is shown in FIG. 10. FIG. 10 shows an adjustment procedure of luminance shading correction using interpolation. Adjustment of luminance shading correction can be made with high precision in a short time.

In the first embodiment, luminance shading correction has been made for each luminance. Assuming that the video signal has 8 bits, for example, the number of possible gradation levels becomes 256. That is to say, adjustment work must be done as often as 256 times, resulting in a problem in practical use. In order to reduce the number of times of adjustment work, therefore, correction data of luminance which has not undergone adjustment are derived from correction data which has undergone adjustment by using interpolation.

Figure 2:
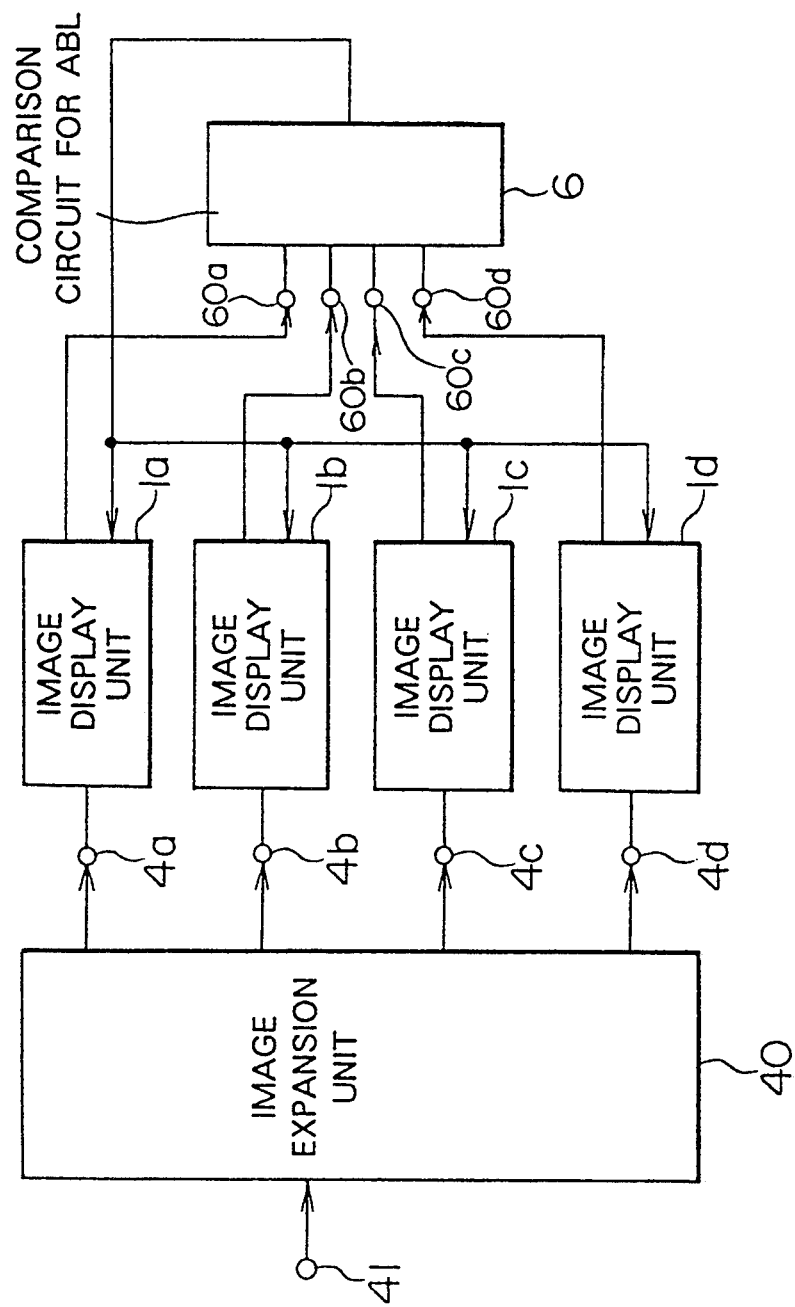
FIG. 2 is a circuit block diagram of a multiscreen display apparatus of the prior art.

By taking a multiscreen display having four cores as shown in FIG. 2 and having a circuit configuration as shown in FIG. 3 as an example, the procedure of luminance shading correction will hereafter be described.

With reference to the flow chart of FIG. 10, display of 100% luminance is first performed. In the same way as the first embodiment, luminance shading corrections respectively of the cores 6a, 6b, 6c and 6d and luminance shading corrections between the cores 6a, 6b, 6c and 6d are made. Thereafter display of 0% luminance is performed. In the same way as the case of 100% luminance, luminance shading corrections are then made. From correction data of 100% luminance and 0% luminance, correction data between 100% luminance and 0% luminance are then derived by calculation using a linear expression or a curvilinear expression as represented by expression (2).

$$y = ax^b \qquad (2)$$

Results of the above described calculation are written into the data converters 4a, 4b, 4c and 4d as luminance shading correction data between 100% luminance and 0% luminance. Supposing that the voltage versus luminance characteristics ranging from 100% luminance to 0% luminance are equal in respective screens of the cores 6a, 6b, 6c and 6d, or between the cores 6a, 6b, 6c and 6d, uniformity of the screen luminance ought to be kept by means of correction data derived by the above described interpolation even if appropriate luminance is displayed.

Therefore, half tone display of 50% luminance, for example, is performed to confirm the uniformity of the screen luminance. If this screen luminance is not uniform at this time, luminance shading corrections at 50% luminance are so made as to make the screen luminance uniform according to the same procedure as that of 100% luminance and 0% luminance. On the basis of luminance shading correction data at 100% luminance, 0% luminance and 50% luminance, luminance shading correction data of 100% luminance to 50% luminance and 50% luminance to 0% luminance are derived again by means of interpolation. Thus data of the data converters 4a, 4b, 4c and 4d are rewritten. Thereby the precision of interpolation can be raised.

By further increasing the number of points such as 25% luminance and 75% luminance whereat luminance shading corrections are actually made while watching the screen, the interpolation precision can be further raised. Luminance shading corrections may be made until luminance shading becomes nonprominent at appropriate half tone display. Supposing that luminance shading correction work is done at only five points such as 100% luminance, 75% luminance, 50% luminance, 25% luminance and 0% luminance and luminance shading correction data for other luminance are derived by using interpolation, the number of times of user's adjustment work can be reduced remarkably from 256 to 5, resulting in significantly reduced adjustment time.

Figure 11:
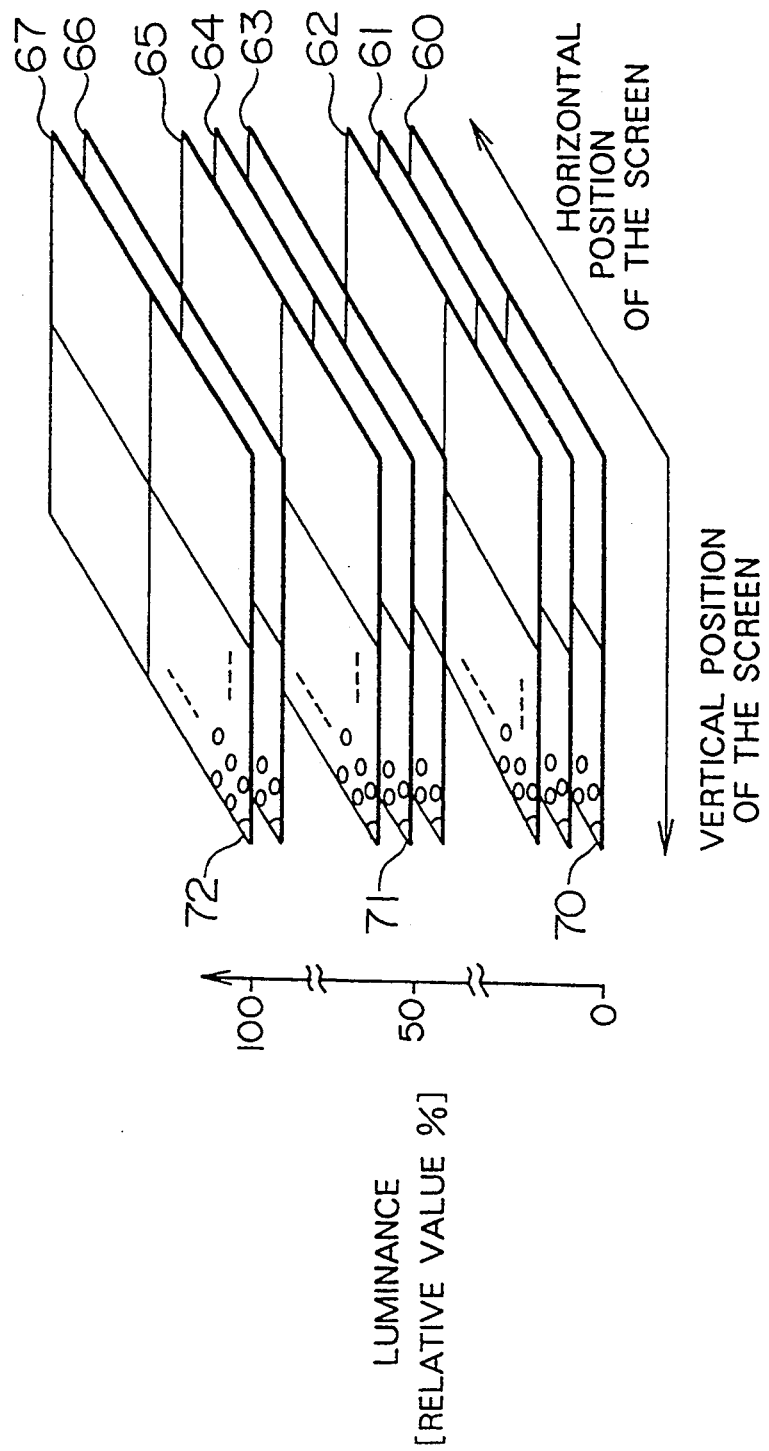
FIG. 11 is a diagram for explaining a luminance correction procedure according to the present invention.

FIG. 11 is a diagram showing an image of the luminance shading correction procedure described before by referring to FIG. 10. The X axis and Y axis respectively indicate horizontal and vertical screen positions, and the Z axis indicates luminance. FIG. 11 has the same configuration as FIG. 1. It is meant that a screen is bisected in the X-axis and Y-axis directions, and the screen is formed by four cores. Screens 60–67 in the Z-axis direction respectively mean luminance levels on the screen. For example, a screen of 0% luminance is denoted by 60, and a screen of 100% luminance is denoted by 67.

First of all, luminance shading correction work on the screen 60 of 100% luminance is done. Thereafter, luminance shading correction work is done on the screen 67 of 0% luminance. Thereby, correction data 70 and 72 respectively of 100% luminance and 0% luminance in the same spatial position have been fixed. On the basis of these correction data 70 and 72, correction data at 100%–0% luminance in this spatial position are derived by means of interpolation. Then display on the screen 64 of 50% luminance, for example, is made. Correction data 71 have already been derived. If there is luminance shading at this time, however, luminance shading correction work is actually done on the screen 64 of 50% luminance and luminance shading correction data are rewritten. Then correction data of other luminance are derived again by means of interpolation. As a matter of course, the same is true of correction data in other spatial positions.

Figure 12:
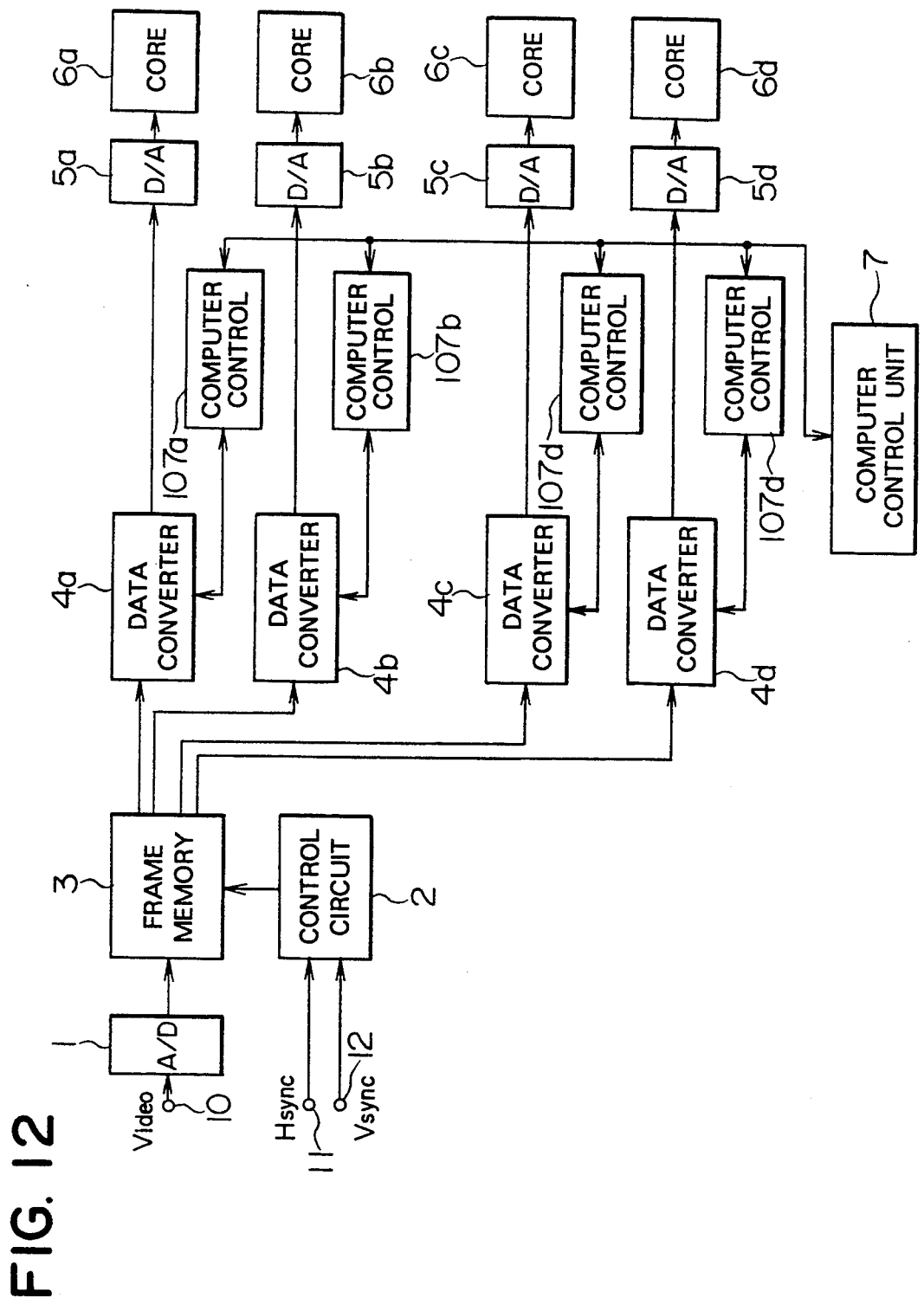
FIG. 12 is a circuit block diagram of a multiscreen display apparatus according to the present invention.

Still another embodiment of the present invention is shown in FIG. 12.

In order to derive data to be written into data converters 4a, 4b, 4c and 4d by means of interpolation computation, for example, dedicated second computer control devices 107a, 107b, 107c and 107d are so provided in the present embodiment as to be respectively associated with data converters 4a, 4b, 4c and 4d. Therefore, a computer control device 7 need only give a calculation instruction, for example, to the computer control devices 107a, 107b, 107c and 107d. Since the computer control device 7 does not perform processing such as data computation of data converters 4a, 4b, 4c and 4d, the processing speed is increased by that amount and the adjustment time can be shortened. The burden on the adjusting personnel can also be lightened.

Further, the amount of information transmission between the computer control device 7 and the computer control devices 107a, 107b, 107c and 107d is reduced. Even if serial interface such as RS-232 is used, therefore, rapid adjustment work can be done. Since other operation is the same as that of the first embodiment, description thereof will be omitted.

Figure 13:
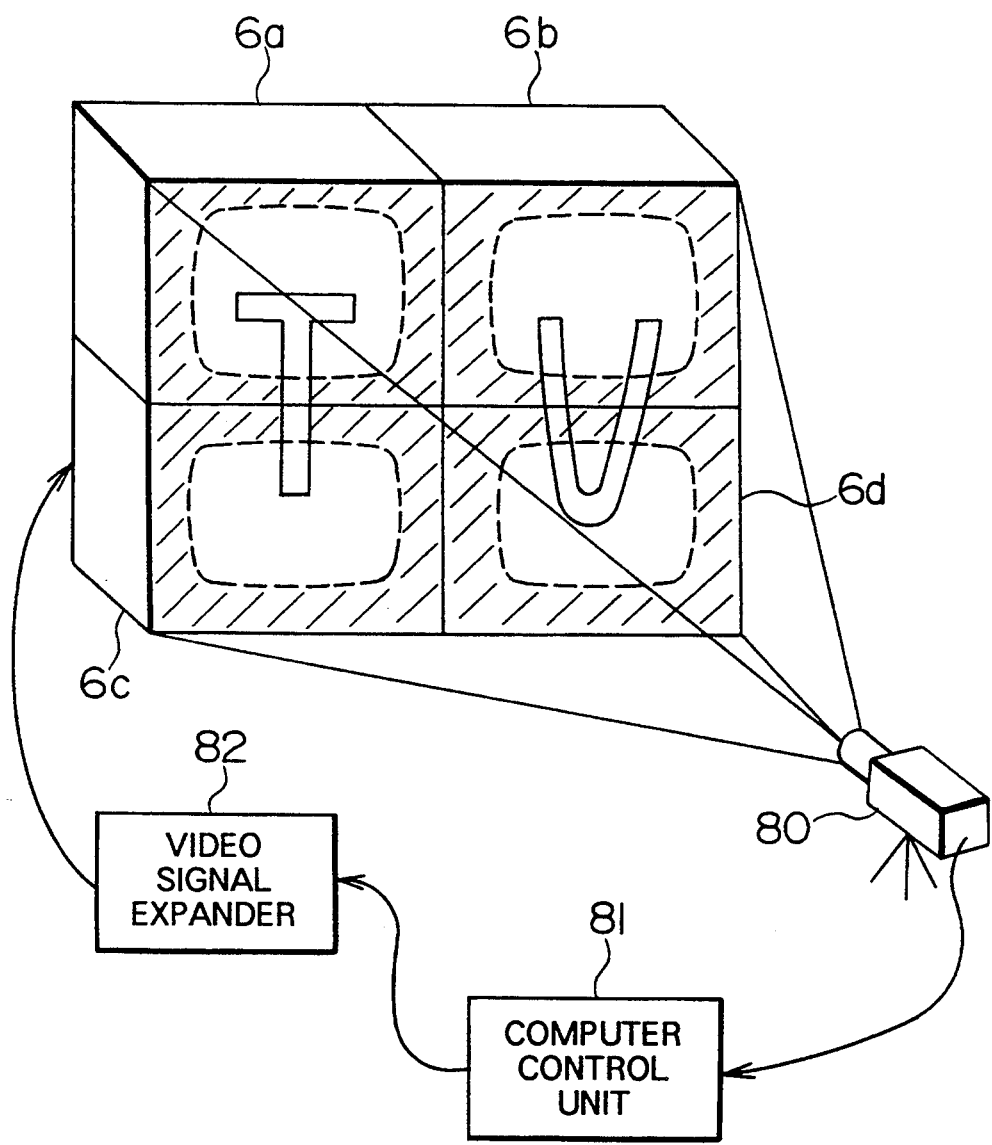
FIG. 13 is an exterior view of a multiscreen display apparatus according to the present invention.

Still another embodiment of the present invention is shown in FIG. 13. In the present embodiment, a part of adjustment work relying upon human eyes is replaced by a light receiving device such as a television camera 80 to automatize the adjustment work.

In FIG. 13, multiscreen display is picked up by the television camera 80. Output information of the television camera 80 undergoes computation processing in a third computer control device 81 to adjust a video signal expander 82 so that luminance shading may be reduced. The video signal expander 82 can be implemented by using the circuit as shown in FIG. 3, for example. The procedure of computation processing in the computer control device 81 may be made identical with the work procedure shown in FIG. 10, for example. Software according to this procedure may activate the computer control device 81. Further, instead of the television camera shown in FIG. 13, a small-sized light receiving device may be disposed on a predetermined location of the screen.

By using this method, adjustment to luminance shading can be automatically made without troubling the adjusting personnel.

Figure 14:
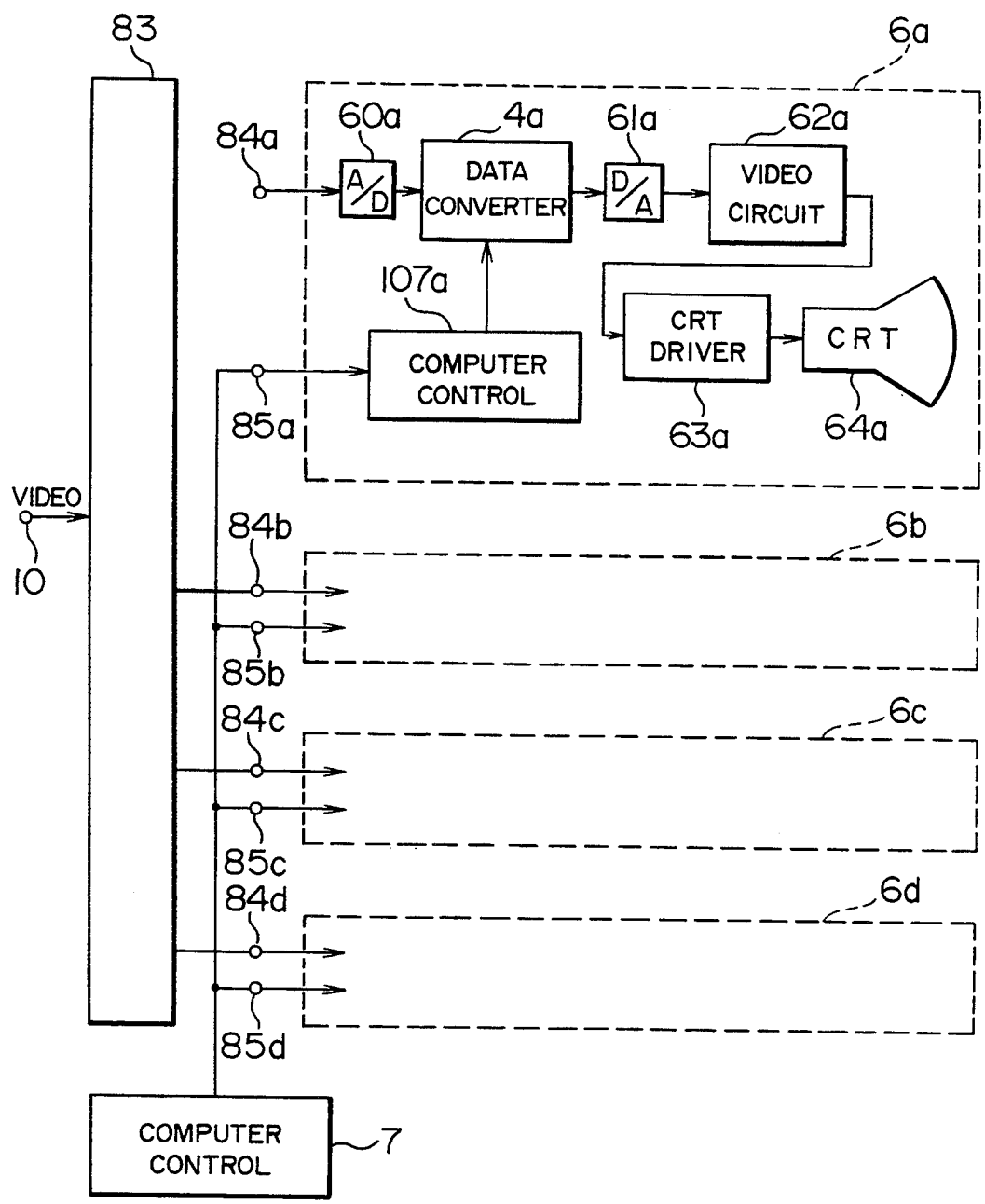
FIG. 14 is a circuit block diagram of a multiscreen display apparatus according to the present invention.

Another embodiment of the present invention is shown in FIG. 14. A feature of the present embodiment is the fact that a data converter 4 and a second computer control device 107 are provided within each of cores 1a, 1b, 1c and 1d.

In the configuration of FIG. 14, 1a, 1b, 1c and 1d denote cores, 83 an image expansion and distribution device, 7 a first computer control device, and 10 a video signal input terminal. The image expansion and distribution device 83 is a device for distributing the video signal applied to the terminal 10 to the cores 1a, 1b, 1c and 1d. The image expansion and distribution device 83 may have the configuration shown in FIG. 3, for example. Since data converters 4a–4d are incorporated in the cores, however, they need not be included within the image expansion and distribution device 83 and the output of the frame memory 3 can be directly inputted to the D/A converters 5a–5d.

Each of the cores 1a, 1b, 1c and 1d has therein a video signal input terminal 84, an A/D converter 60a, a data converter 4a, a D/A converter 61a, a video circuit 62a, a CRT (cathode-ray tube) drive circuit 63a, a CRT 64a, and a second computer control device 107a dedicated to the core. The video circuit 62a is a circuit for adjusting the contrast, luminance and so on of the video signal. The CRT drive circuit 63a is an amplifier for providing the output signal of the video circuit 62a with a voltage level required for driving the CRT 64a. Circuits used in presently commercially available television sets can be used as circuit 63a and the CRT 64a. The first computer control device 7 and the second computer control device 107a are connected to a terminal 85 by a serial interface such as RS-232C.

The data converter 4a, the first computer control device 7, and the second computer control device 107a may be identical with those of the first embodiment. Detailed operation of them has been described before.

Operation of FIG. 14 will now be described in brief. The image expansion and distribution device 83 distributes the video signal inputted from the terminal 10 to the cores 1a, 1b, 1c and 1d. The video signal transmitted to the core 1a is converted into a digital signal by the A/D converter 60a. The resultant digital signal is inputted to the data converter 4a. In the data converter 4a, data are so converted that luminance shading of the core 1a may be corrected. The data thus converted is converted into an analog signal by the D/A converter 61a. The video signal corrected in luminance shading is displayed by the CRT 64a via the video circuit 62a and the CRT drive circuit 63a. The procedure of luminance shading correction in each core and between cores performed by the first computer control device 7 was described before by referring to the first embodiment.

In the present embodiment, the data converter 4a is incorporated in the core 1a. Therefore, the image expansion and distribution device 83 need not have the data converter therein, and the configuration of the image expansion and distribution device 83 can be made simple. Although the first computer control device 7 is separate from the image expansion and distribution device 83 in the present embodiment, the first computer control device 7 may be incorporated into the image expansion and distribution device 83 to simplify the device arrangement.

Figure 15:
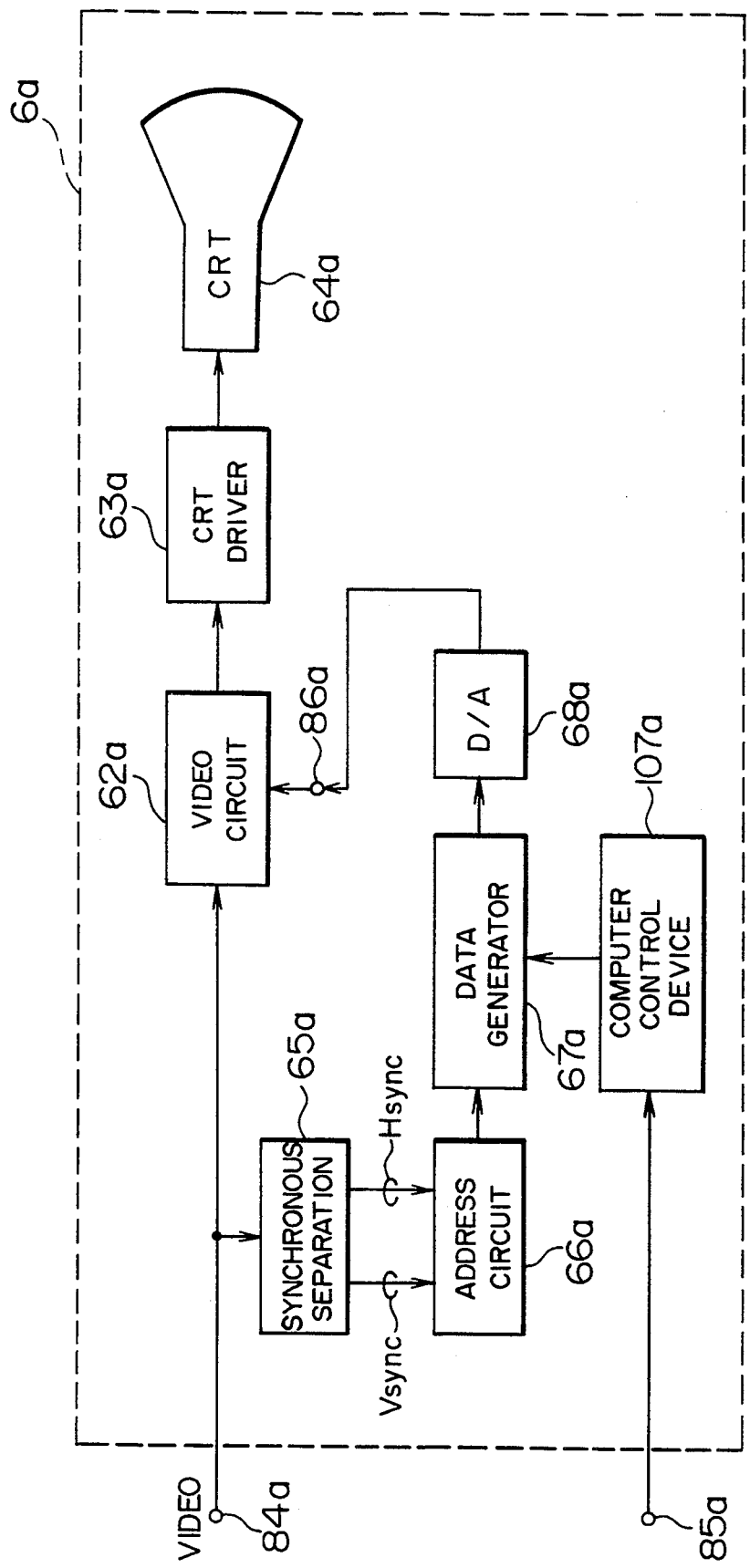
FIG. 15 is a circuit block diagram of a multiscreen display apparatus according to the present invention.

Another embodiment of the present invention is shown in FIG. 15. A feature of the present embodiment is the fact that luminance shading correction is made by modulating the contrast or luminance control terminal in a data generator 67a. In FIG. 15, configuration of only the core 1a is shown and configuration of the whole including the wiring to the image expansion and distribution device may be identical with that of FIG. 14. Further, the adjustment procedure using the first computer control device 7 may be identical with that of FIG. 14.

The core 1a of FIG. 15 includes an address circuit 66a, the data generator 67a, a D/A converter 68a, a synchronous separation circuit 65a, and a contrast or luminance control terminal 86a of a video circuit 62a.

The synchronous separation circuit 65a extracts the horizontal and vertical synchronizing signals from the video signal inputted from the terminal 84a and transmits the horizontal and vertical synchronizing signals to the address circuit 66a. On the basis of the the inputted horizontal and vertical synchronizing signals, the address circuit 66a produces position data obtained by dividing the screen into 128×128 blocks, for example. On the basis of the block position data, the data generator 67a outputs luminance shading correction data for each of the blocks of screen divided into 128×128 blocks. The luminance shading correction data outputted from the data generator 67a is converted into an analog signal by the D/A converter 68a to modulate the contrast or luminance of the video circuit 62a. It is a matter of course that this modulation is multiplying the video signal applied to the terminal 84a by the analog signal of the data of the data generator 67a, i.e., the luminance shading correction data. As compared with the digital signal multiplication described by referring to the first embodiment, for example, significant circuit simplification can be attained. As a matter of course, luminance shading correction data are present in the data generator 67a, and hence arbitrary data arrangement is possible and correction with high precision which is not obtained in conventional parabolic signal correction becomes possible.

Figure 16:
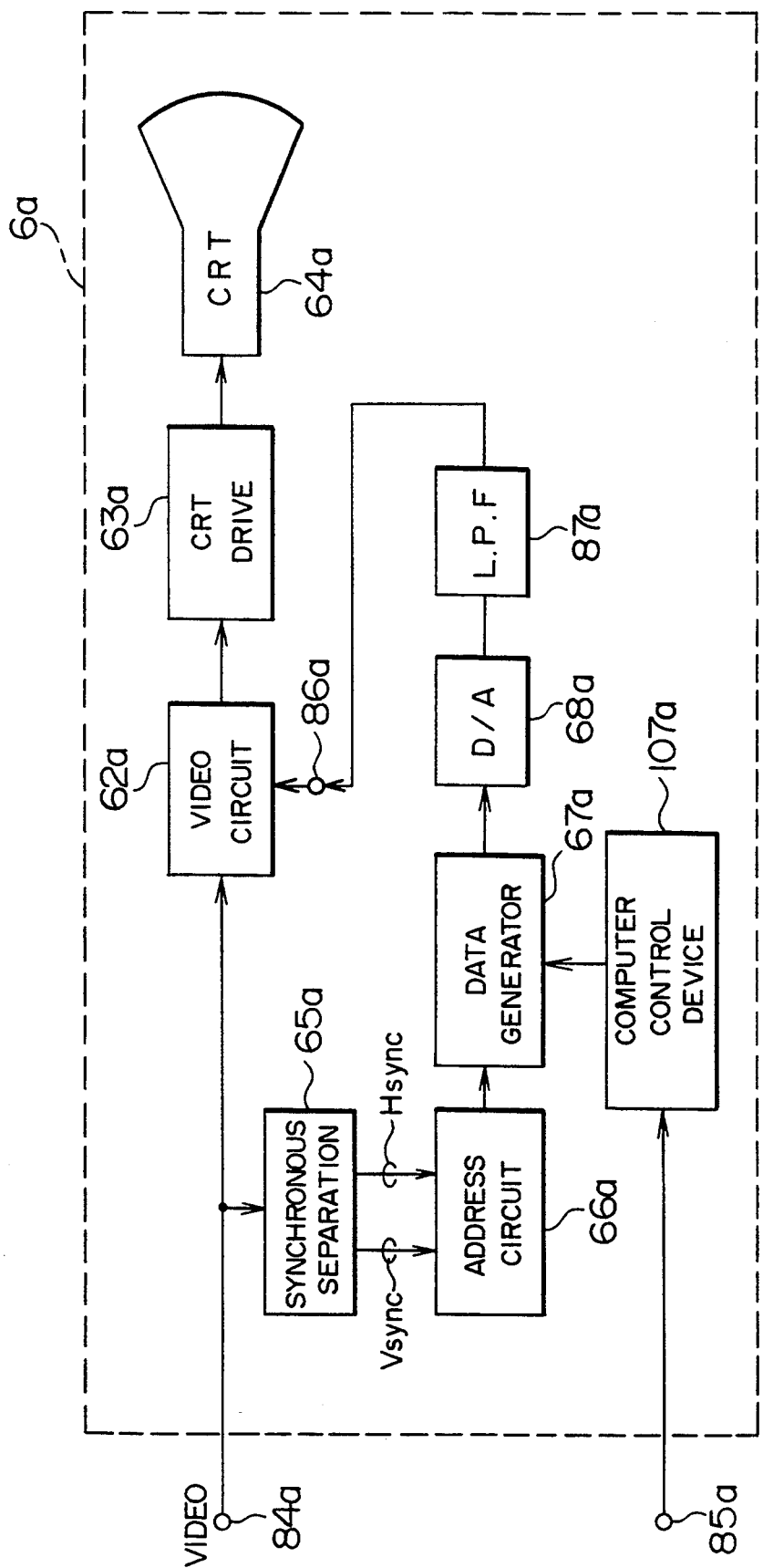
FIG. 16 is a circuit block diagram of a multiscreen display apparatus according to the present invention.

Another embodiment of the present invention is shown in FIG. 16. A feature of the present embodiment is the fact that a low-pass filter (L.P.F) 87a is connected to the output side of the D/A converter 68a in the core 1a and the number of divisions of blocks for correction in the horizontal direction is reduced. Remaining configuration and operation may be identical with that of FIGS. 14 and 15.

Figure 17:
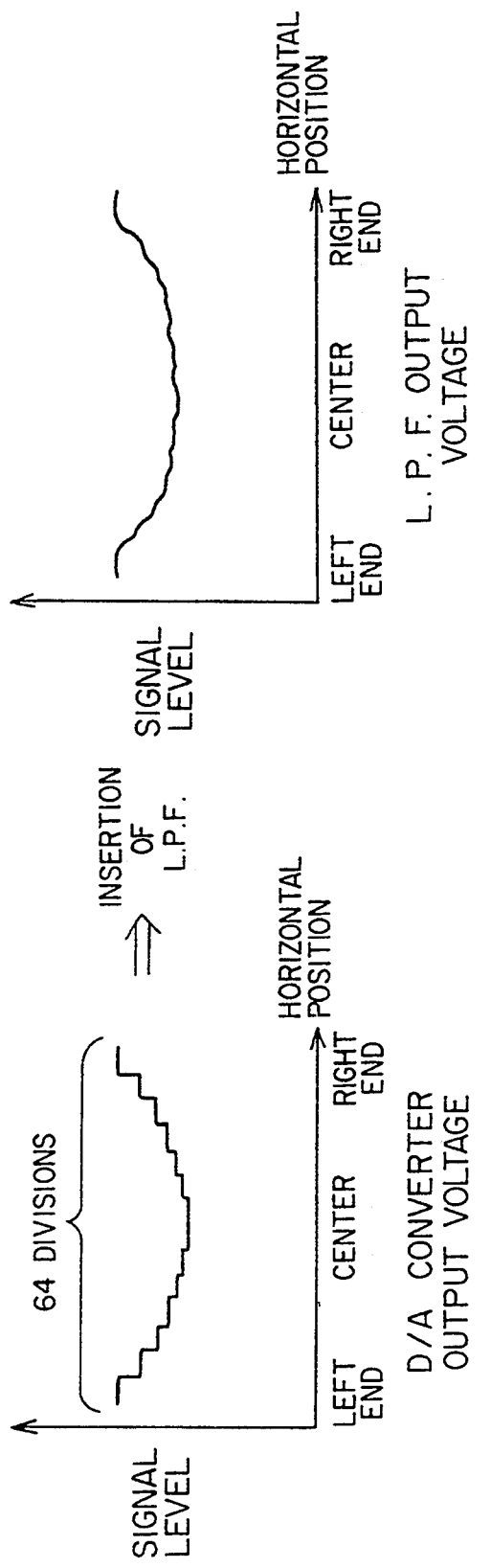
FIG. 17 is a diagram for explaining the operation of the circuit of FIG. 16.

As described before, the luminance correction step between blocks is defined as approximately one gradation level, for example, so that a luminance difference may not be generated between blocks. Therefore, as many blocks as 128 division blocks are needed in both horizontal and vertical directions. Accordingly, the L.P.F 87a is connected to the output side of the D/A converter 68a to smooth the luminance difference between horizontal blocks as shown in FIG. 17. Thereby the number of block divisions in the horizontal direction can be reduced and the memory capacity of the data generator 67a can be reduced.

Description has heretofore been given by taking a television set of CRT projection type as a core. However, it is evident that a television set of CRT direct-view type and a projection television using liquid crystal display elements also have similar effects. In case of a projection television set using liquid crystal display elements, it is a matter of course that data written into the LUT are adapted to voltage-luminance characteristics of liquid crystal display elements.

As heretofore described, the present invention makes it possible to obtain a uniform multiscreen display image reduced not only in luminance shading but also in color shading.

Figure 18:
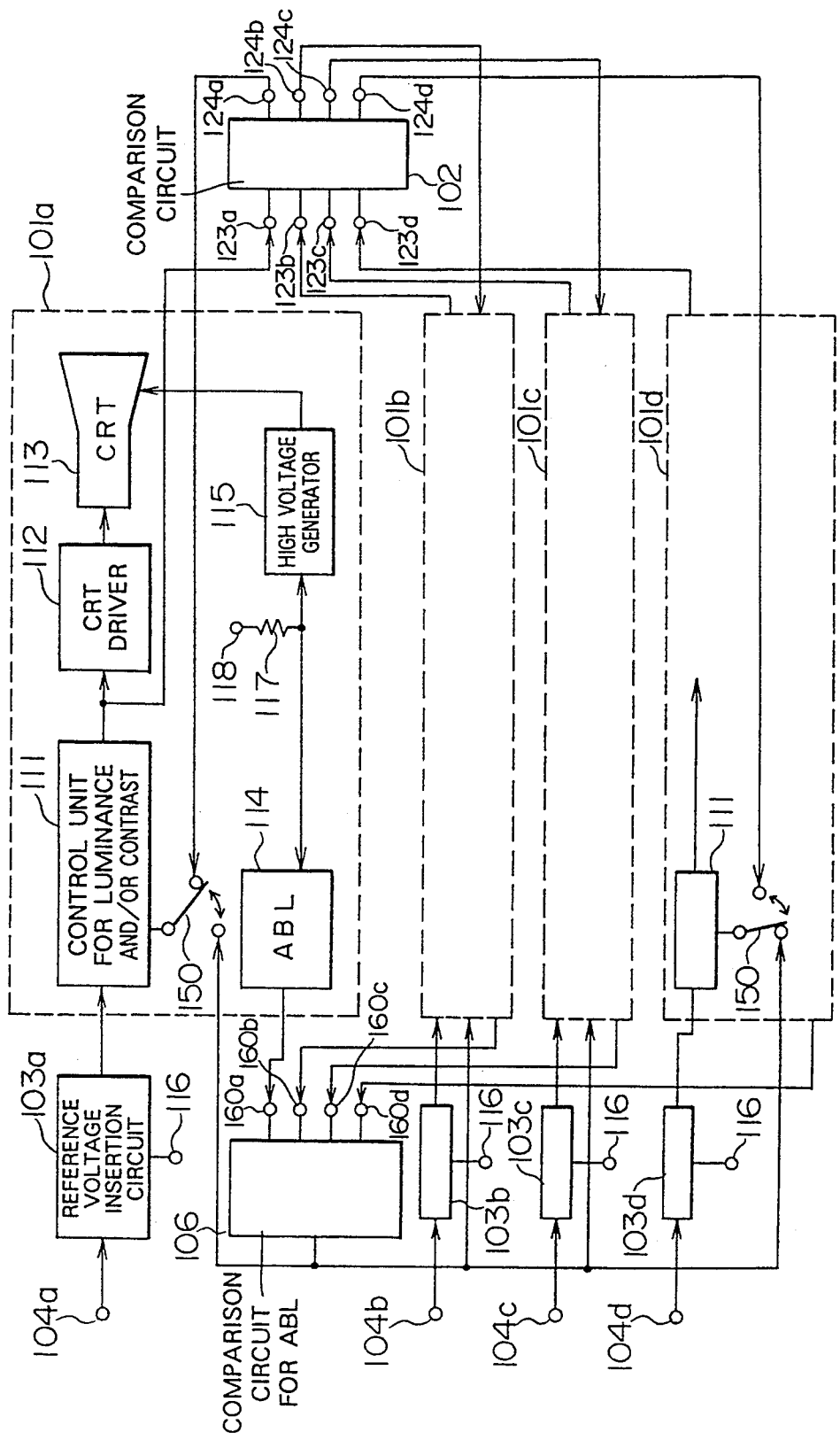
FIG. 18 is a circuit block diagram of a multiscreen display apparatus according to the present invention.

FIG. 18 shows the block diagram of a first embodiment of a multiscreen display capable of compensating dispersion of ABL control characteristics and making a uniform display according to the present invention. Description will now be given by taking the case where four cores as shown in FIG. 1 are used as a multiscreen display as an example.

The embodiment of FIG. 18 includes cores 101a–101d, a contrast and/or luminance control circuit 111, a CRT (cathode-ray tube) driving circuit 112, a CRT 113, an ABL (automatic brightness limit) circuit 114, a high voltage generation circuit 115, a reference voltage application terminal 116, a beam current detection resistor 117, a +B (supply voltage) application terminal 118, and a switch 150. The contrast and/or luminance control circuit 111 is supposed to expand the contrast of a video signal (or increase the luminance) when the control voltage is high. When the control voltage is low, the contrast and/or luminance control circuit 111 functions to suppress the contrast of the video signal (or lower the luminance). Further, the ABL circuit 114 detects the beam current, which is supplied from the high voltage generation circuit 115, via the beam current detection resistor 117 and generates control voltage to be supplied to the contrast and-/or luminance control circuit 111. Characters 103a to 103d denote reference voltage insertion circuits, which insert reference voltage in the overscan interval of a video signal inputted to the contrast and/or luminance control circuit 111. Numeral 102 denotes a comparison circuit, which compares reference voltages inserted into video signals of respective cores and outputs the result of comparison. Numeral 106 denotes a comparison circuit for ABL, which compares ABL control information of respective cores, selects the core indicating the maximum beam current value, outputs the ABL control information indicating the maximum beam current value, and controls the switch 150 of respective cores.

Figure 19:
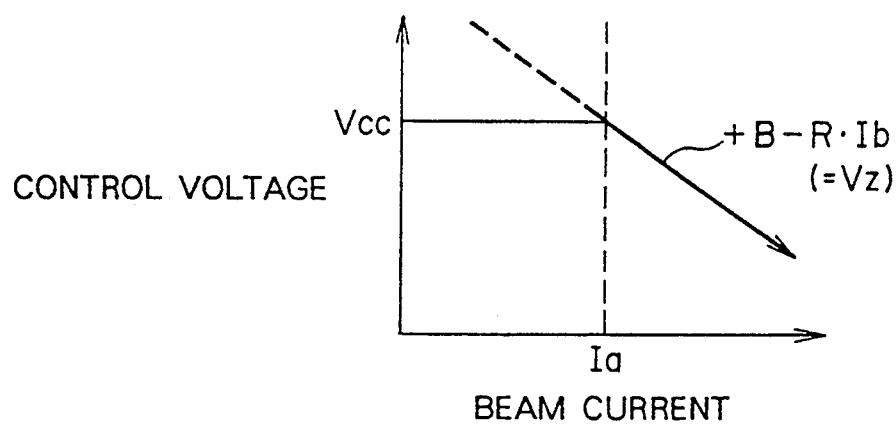
FIG. 19 is a characteristic diagram for explaining the operation of FIG. 18.

FIG. 19 is an example of operation characteristic of the ABL circuit 114. The abscissa represents the beam current, whereas the ordinate represents the control voltage.

Operation of the present embodiment will hereafter be described. It is now supposed that predetermined images are displayed on the screens of CRTs 113 of respective cores by video signals inputted from video signal input terminals 104a–104d. In the core 101a, for example, a beam current Ib flows from the high voltage generation circuit 115 according to the screen luminance on the CRT 113. Assuming that the voltage applied to the terminal 118 is +B and the beam current detection resistor 117 has a resistance value R, voltage +B−R×Ib (=Vz) is generated in the input of the ABL circuit 114. As the display screen becomes bright, the beam current Ib becomes large and Vz becomes small on the contrary. In case the average luminance of the screen, i.e., the beam current Ib is equal to or less than a predetermined level (Ia in FIG. 19), the ABL circuit 114 transmits constant voltage (Vcc in FIG. 19) to the comparison circuit 106 for ABL. When the beam current becomes at least the predetermined level (Ia in FIG. 19), the ABL circuit 114 transmits Vz at that time to the comparison circuit 106 for ABL. That is to say, the ABL circuit 114 functions to lower the control voltage to lower the average luminance when the beam current Ib becomes at least the predetermined level. The ABL circuits 114 of other cores also function in the same way. The comparison circuit 106 for ABL selects ABL control information of the core indicating the lowest value among control voltages outputted from all cores, i.e., the maximum beam current value and supplies the above described ABL control information (the lowest value of control voltage) to all cores.

It is now supposed that the switch 150 is positioned on the contact 150a in every core. In the core having the highest average luminance and outputting the ABL control information, closed-loop control is exercised by its own ABL control information. In each of other cores, however, its own ABL control information is not fed back, resulting in open-loop control. Therefore, there occurs dispersion of luminance because of dispersion of respective open-loop gains, i.e., dispersion of gains of the contrast and/or luminance control circuit 111 and the ABL circuit 114.

Operation of the circuit for absorbing the dispersion of gain according to a feature of the present invention, i.e., operation of the reference voltage insertion circuits 103a–103d and the comparison circuit 102 will now be described.

Figure 20:
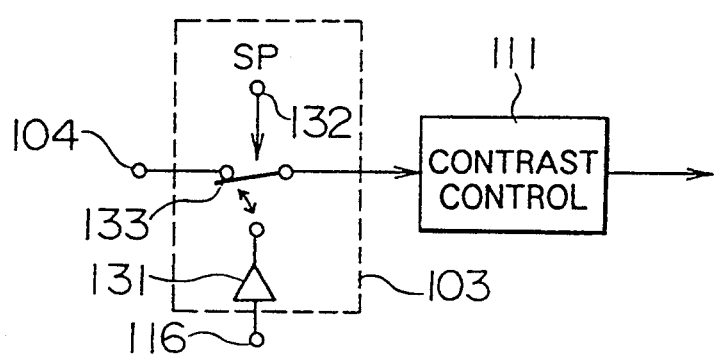
FIG. 20 is a block diagram of a reference voltage insertion circuit according to the present invention.

FIG. 20 is an example of a block diagram for one system of the reference voltage insertion circuits 103a–103d. Numeral 116 denotes an input terminal of reference voltage (B/W), 131 a buffer, 133 a switch for changing over the input to the contrast and/or luminance control circuit 111, and 132 an input terminal of a switching pulse (SP) for controlling the above described switch. The reference voltage (B/W) is supplied to the input terminal 116 in common with the reference voltage insertion circuits 103a–103d of respective cores.

Figure 21:
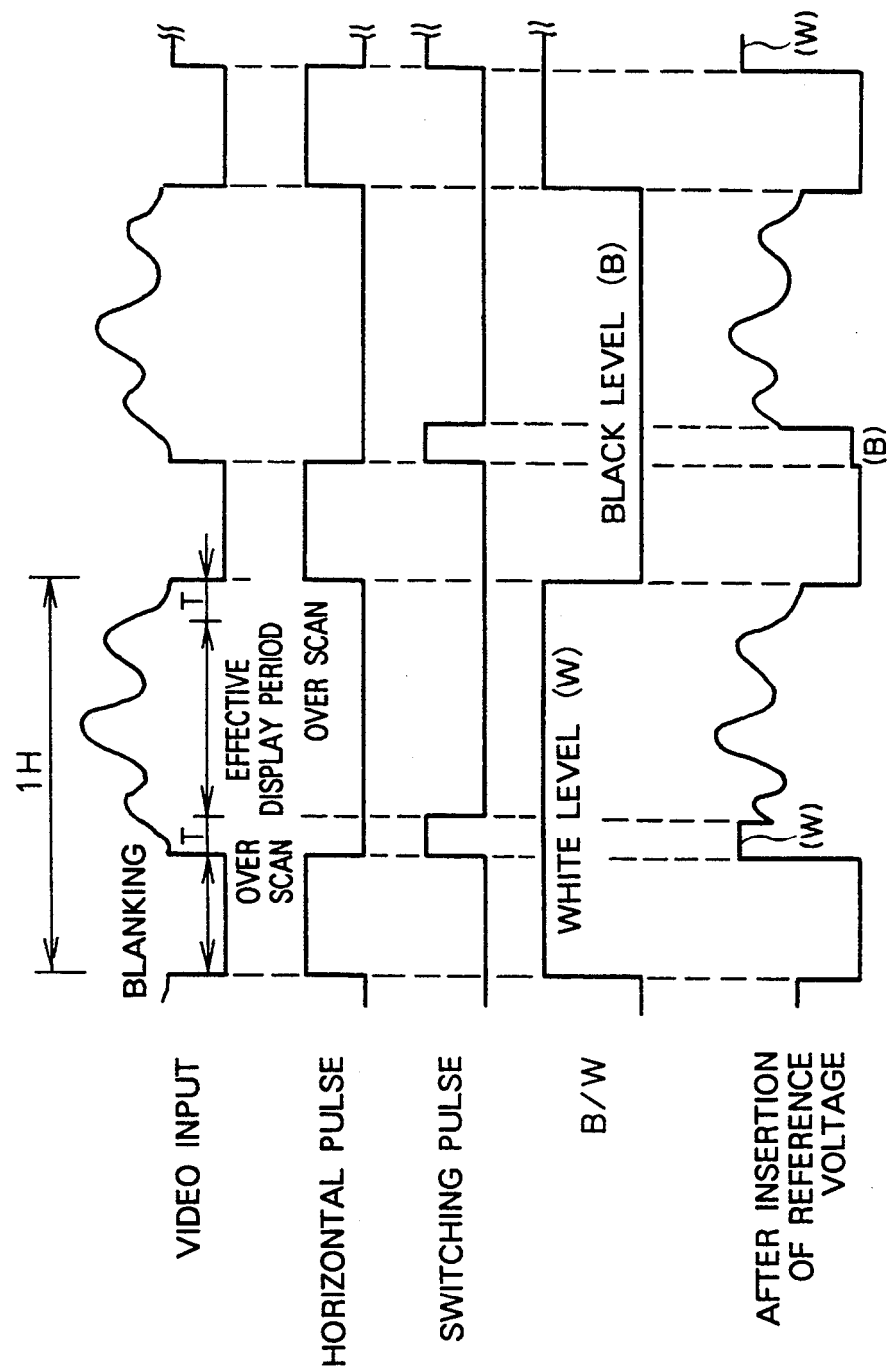
FIG. 21 is a waveform chart of signals of the reference voltage insertion circuit.

FIG. 21 is an example of an operation waveform diagram showing the principle of reference voltage insertion in the circuit of FIG. 20. In FIG. 21, T represents an overscan interval. In a multiscreen display apparatus, the overscan interval is defined as appropriately 8%, for example, of the scanning interval in order to smooth connections between images of cores. The reference voltage (B/W) is a signal in which the white level (W) and the black level (B) are alternated at intervals of 1 H of the video signal, for example. A switching pulse (SP) is a control pulse synchronized preferably with a falling edge of a horizontal synchronizing pulse and having a pulse width T. The above described switching pulse (SP) controls the input signal of the contrast and/or luminance control circuit 111 so that the reference voltage (B/W) may be inputted from the buffer 131 in the overscan interval of the former part of the scanning interval and the video signal may be inputted from the video signal input terminal 104 in the remaining interval. In the overscan interval of the former part of the video signal, therefore, the reference voltage of the white level (W) and the reference voltage of the black level (B) are inserted alternately at intervals of 1 H.

Figure 22:
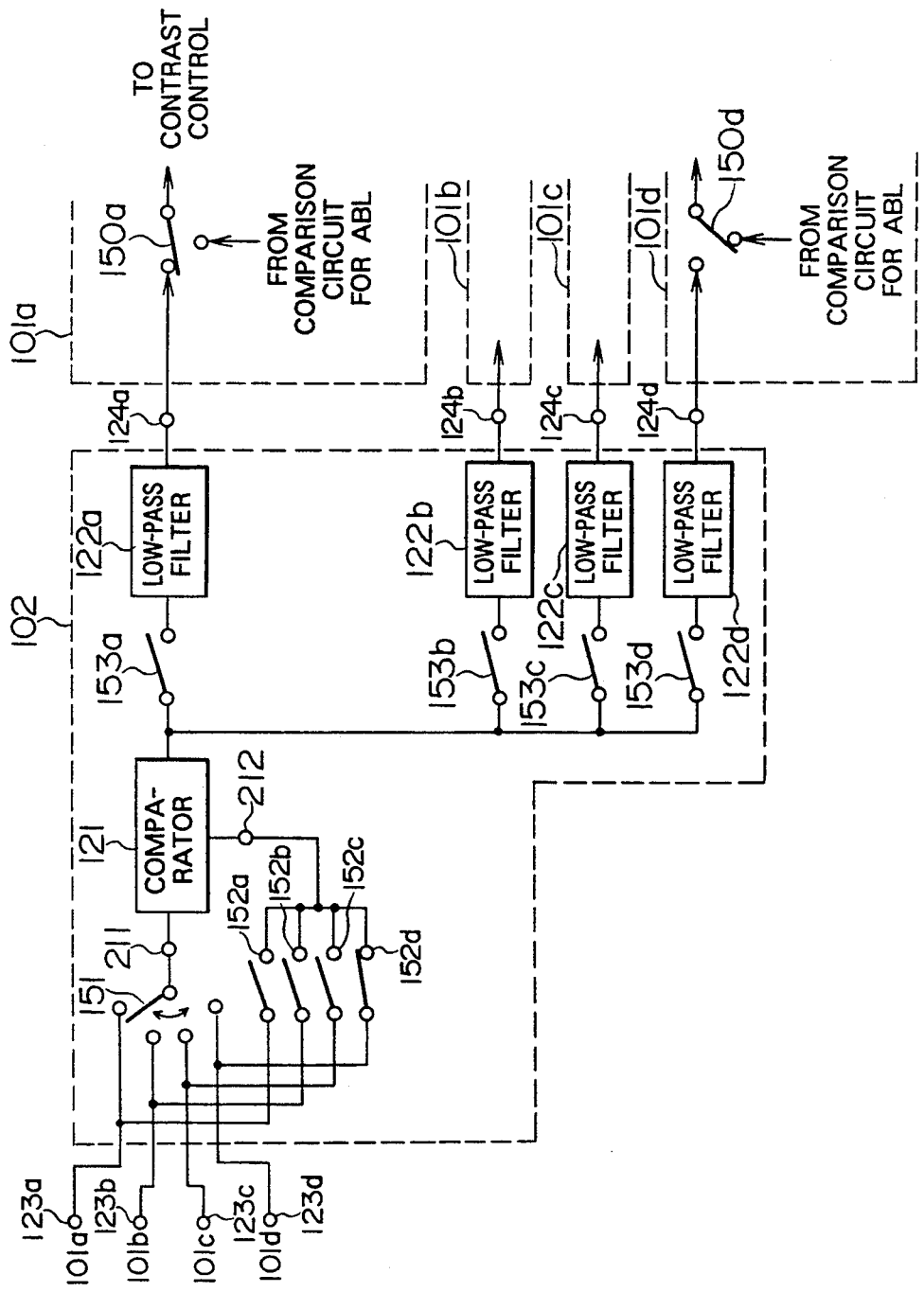
FIG. 22 is a block diagram of a comparison circuit according to the present invention.
Figure 23:
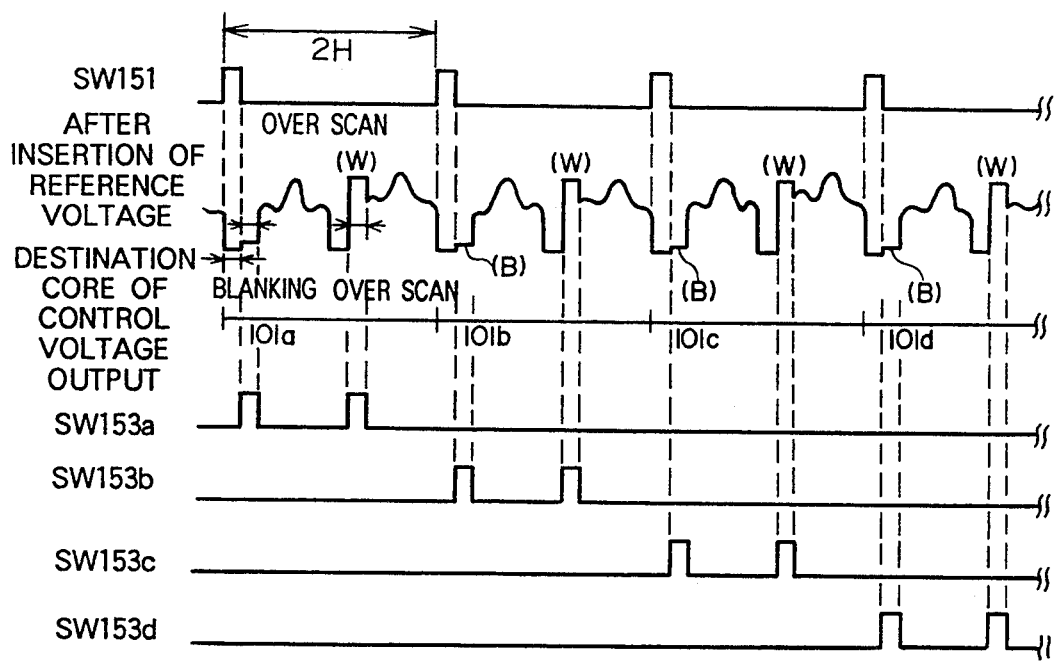
FIG. 23 is a waveform chart of signals of the comparison circuit.

Examples of the block diagram and operation waveform diagram of the comparison circuit 102 are shown in FIGS. 22 and 23, respectively. In the present embodiment, it is now assumed that the average luminance of the screen of the core 101d, for example, is the highest and the comparison circuit 106 for ABL selects the ABL control information of the above described core 101d and outputs the above described ABL control information to respective cores. Further, it is now assumed that the reference voltage signal inserted into the video signal of the core 101d having the highest average luminance is defined as the reference signal and the above described reference signal is compared with the reference voltage signals (comparison signals) inserted into video signals of other cores. A switch 150 included in each core is changed over by the comparison circuit 106 for ABL. In the core 101d having the highest average luminance, the switch 150 is changed over to 150a so that its own ABL control may be fed back. In each of other cores 101a–101c, the switch 150 is changed over to 150b so that the control voltage supplied from the above described comparison circuit 102 may be fed back. In FIG. 22, 123a–123d denote input terminals of video signals after contrast and/or luminance control, 151, 152a–152d and 153a–153d switches, 121 a comparator, 122a–122d low-pass filters, 211 an input terminal of comparison signal, 212 an input terminal of the reference signal, and 124a–124d output terminals of control voltage. In response to the rising edge of a pulse of SW151 shown in FIG. 23, the switch 151 is connected to the input terminal 123 of the video signal of a different core at intervals of 1 H. The reference voltage signal of the video signal of each core is thus inputted to the comparator 121 as the comparison signal at intervals of 1 H. Further, the video signal of the core 101d having the highest average luminance is selected as the reference signal by the switches 152a–152d. The above described reference signal is inputted to the comparator 121. For controlling the switches 152a–152d, control signals of the switches 150 in the cores 101a–101d are preferably used. The comparator 121 compares reference voltage signals of inserted white level (W) and black level (B), and outputs voltage information indicating whether the reference voltage signals of the white level (W) and the black level (B) of the comparison signals (101a, 101b and 101c) are higher or lower than the reference voltage signal of the reference signal (101d). The comparator 121 is preferably a voltage comparator. In response to pulses SW153a–SW153d as shown in FIG. 23, comparison results of only the reference voltages of the white level (W) and the black level (B) inserted in the overscan interval of the video signal are inputted to the low-pass filters 122a–122d corresponding to respective cores by the switches 153a–153d, respectively. To the low-pass filter 122a corresponding to the core 101a, for example, the comparison result is inputted at intervals of 8 H periods by the SW153a. However, the video signal of the reference signal (101d) is also inputted to the comparator 121 as the comparison signal, and the result of that comparison is transmitted to the low-pass filter 122d. Since the switch 150 of the core 101a is connected to 150a, however, the output of the low-pass filter 122d is not transmitted to the contrast and/or luminance control circuit 111 of the core 101d. That is to say, the switch 150 is connected to 150a so that its own ABL control information may be fed back to the contrast and/or luminance control circuit 111 having the highest average luminance. The switch 150 is connected to 150b so that the control voltage supplied from the comparison circuit 102 may be fed back to the contrast and/or luminance control circuit 111 of each of other cores. As a result, it is possible to prevent an erroneous controlled variable from being transmitted to the contrast and/or luminance control circuit 111.

Then control voltage taken out by the low-pass filters 122a–122d is inputted to the contrast and/or luminance control circuit 111. Thereby the cores 101a–101c undergo feedback control so that the reference voltage of each of them may become equivalent to the reference voltage of the core 101d. It is thus possible to absorb the gain dispersion and so on of the ABL circuit, and dispersion of luminance level caused by it can be suppressed.

An example in which the average luminance of the core 101d becomes the highest has heretofore been described. The same is true of the case where the average luminance of another core becomes high. Hence such a case will not be described.

Further, the present embodiment has been described by taking the case where the reference signal is inserted in the overscan interval of the horizontal period as an example. However, the reference signal may be inserted into the overscan interval of the vertical period. It is a matter of course that the control pulse for the switches 151 and 153a–153d and the switching pulse (SP) are so generated in this case as to be in synchronism with the vertical period.

Figure 24:
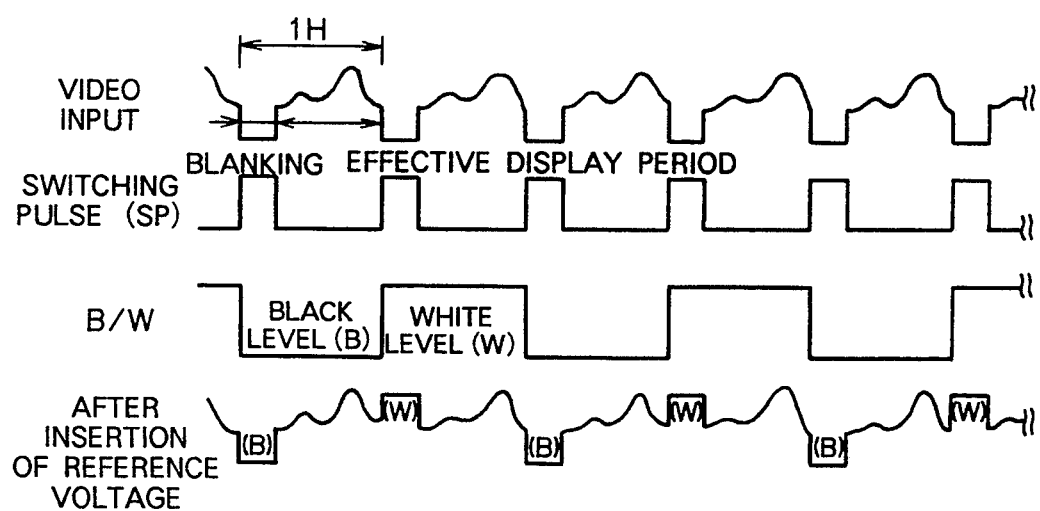
FIG. 24 is a waveform chart of signals of the reference voltage insertion circuit.

Another embodiment of the present invention is shown in FIG. 24. This is featured by that the reference voltage is inserted not in the overscan interval but in the blanking interval. The reference voltage (B/W) is a signal in which the white level (W) and the black level (B) are alternated at intervals of 1H of the video signal. The switching pulse (SP) controls the input signal of the contrast and/or luminance control circuit 111 of FIG. 18. The reference voltage insertion circuit shown in FIG. 20 so functions that the reference voltage (B/W) may be inputted from the buffer 131 when the above described switching pulse (SP) is ON and the video signal may be inputted from the video signal input terminal 104 in the remaining interval. In the blanking interval of the video signal, therefore, the reference voltage of the white level (W) and the reference voltage of the black level (B) are inserted alternately at intervals of 1 H.

Figure 25:
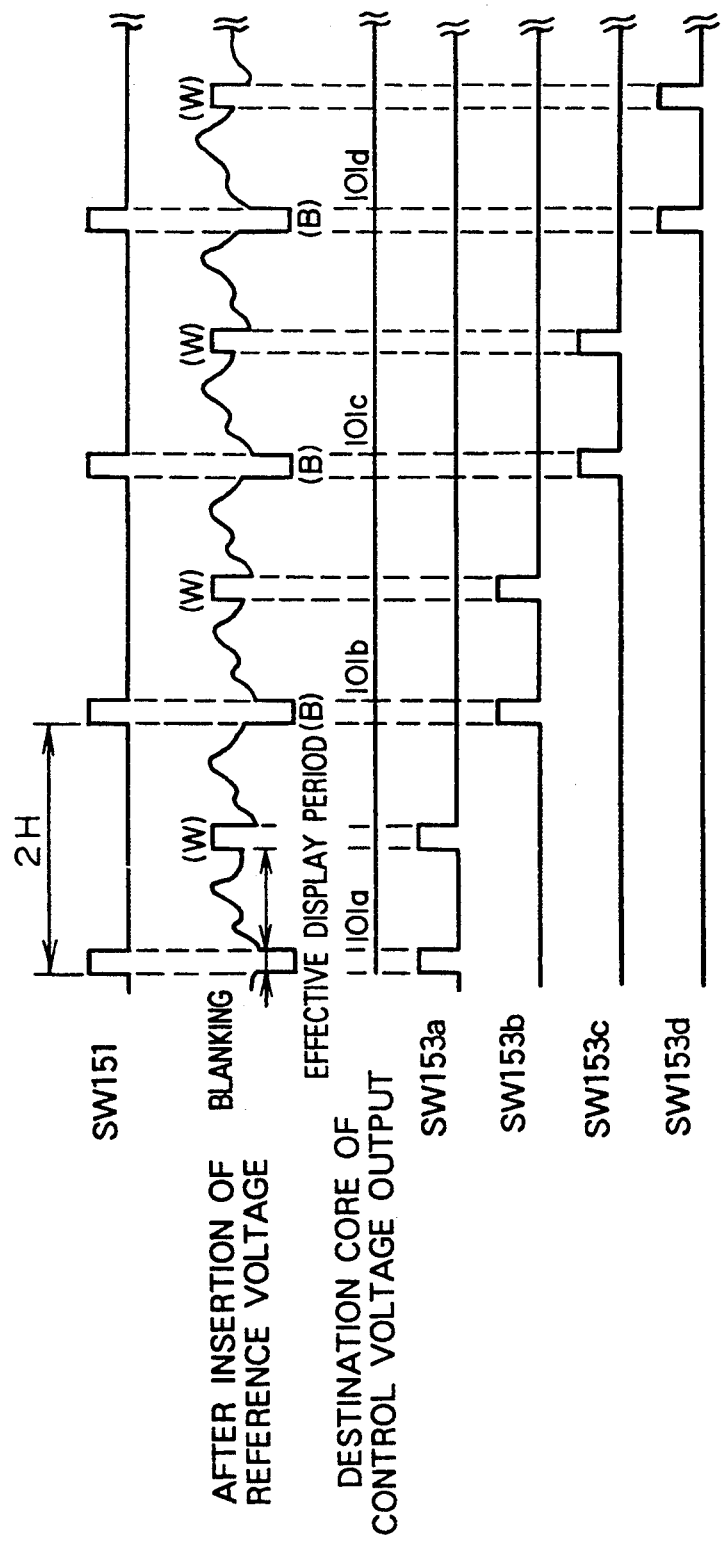
FIG. 25 is a waveform chart of signals of the comparison circuit.

FIG. 25 is an example of an operation waveform diagram of the comparison circuit 102 of FIG. 22 in case the above described reference voltage is inserted in the blanking interval. In FIG. 22, the switch 151 is connected to the input terminal 123 of the video signal of a different core at intervals of 2H in response to the rising edge of a pulse of SW151 shown in FIG. 25. The reference voltage signal of the white level (W) and the black level (B) of each video signal is thus inputted to the comparator 121 as the comparison signal. Further, the video signal of the core having the highest average luminance is selected as the reference signal by the switch 152 and inputted to the comparator 121. Dispersion correction operation of ABL control in the comparator 121 and its succeeding stages is conducted in the same way as the foregoing description and hence it will not be described. In the blanking interval of the video signal outputted from the contrast and/or luminance control circuit 111, the reference voltage of the white level (W) remains to be inserted. Since a blanking circuit is typically included in the CRT driving circuit 112, however, slanting white lines (retrace lines) do not appear in the screen. The present embodiment has a feature that the reference voltage is inserted in the blanking interval and hence the reference voltage can be inserted and compared with a margin. It is effective when the overscan interval is very short and the insertion and comparison of the reference voltage is difficult.

In the same way as the first embodiment, it is a matter of course that the insertion position of the reference signal is not limited to the blanking interval of the horizontal period in the present embodiment as well, but the reference signal may be inserted in the blanking interval of the vertical period.

Figure 26:
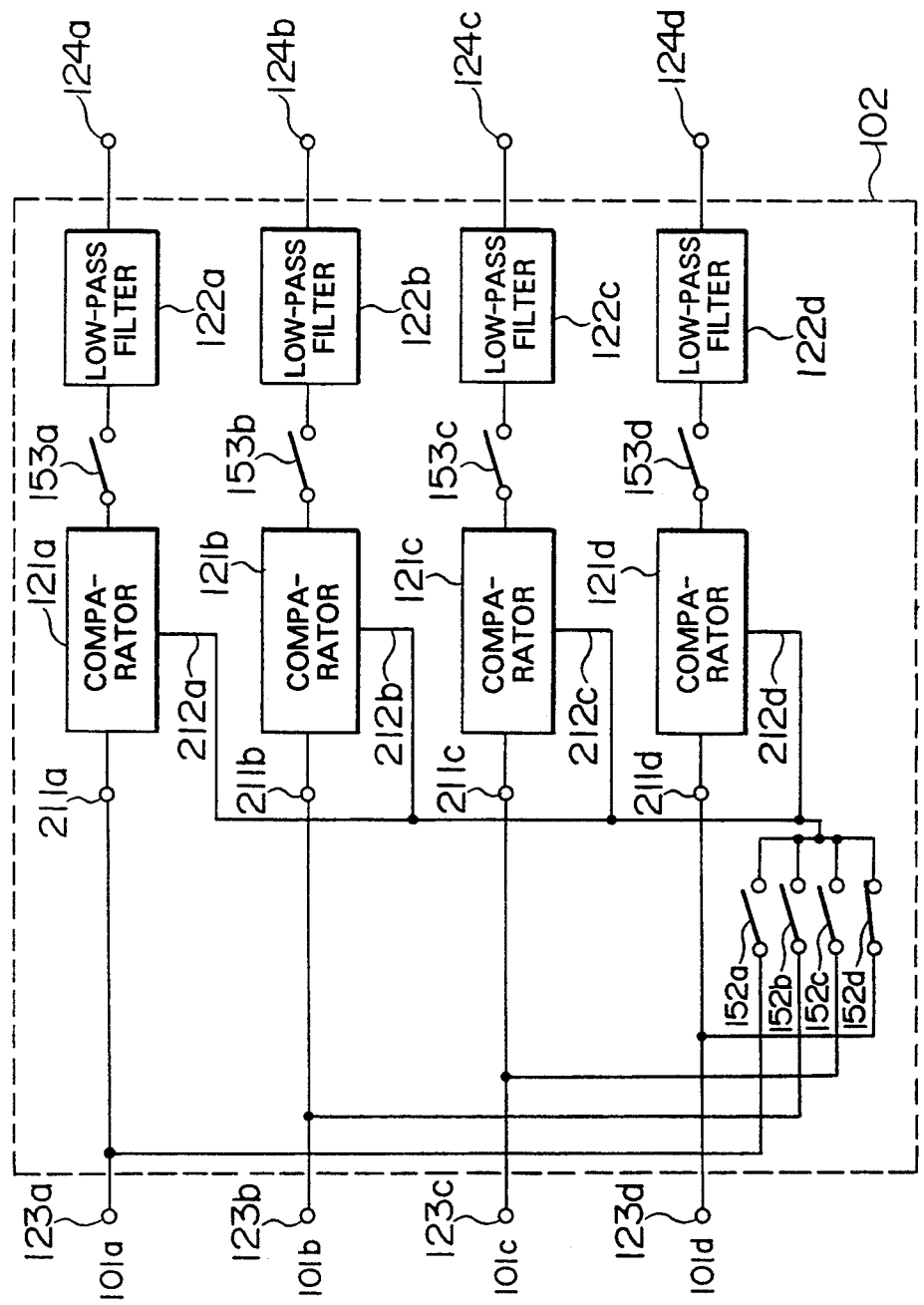
FIG. 26 is a block diagram of a comparison circuit according to the present invention.
Figure 27:
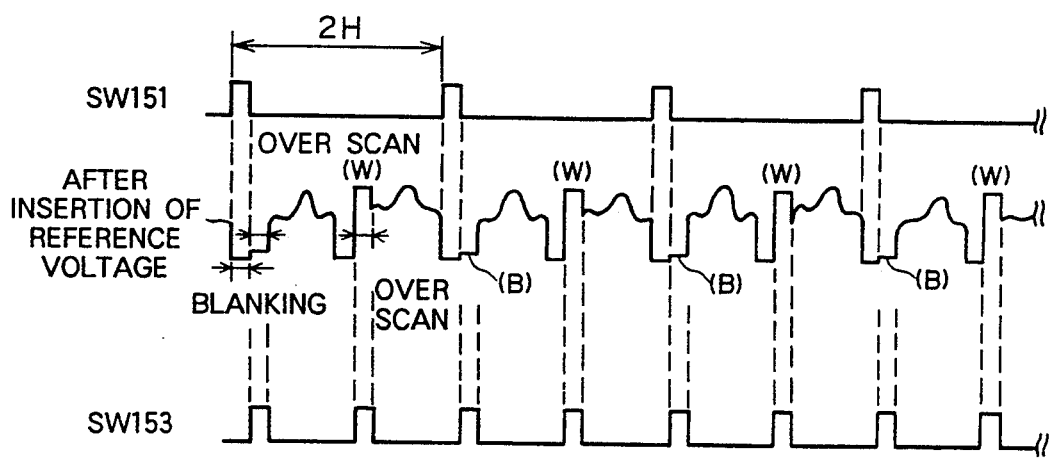
FIG. 27 is a waveform chart of signals of the comparison circuit.
Figure 28:
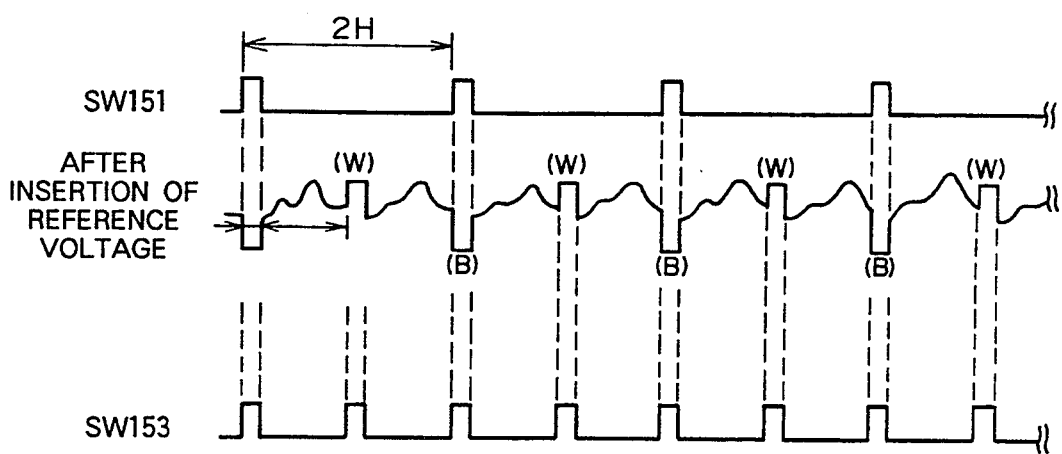
FIG. 28 is a waveform chart of signals of the comparison circuit.

The block diagram of an embodiment of the comparison circuit 102 is shown in FIG. 26. Further, examples of an operation waveform diagram of the present comparison circuit 102 are shown in FIGS. 27 and 28. FIG. 27 shows the case where the reference voltage is inserted in the overscan interval, whereas FIG. 28 shows the case where the reference voltage is inserted in the blanking interval. In the present embodiment, it is now assumed that the average luminance of the screen of the core 101d, for example, is the highest and the comparison circuit 106 for ABL selects the ABL control information of the above described core 101d and outputs the above described ABL control information to respective cores. Further, it is now assumed that the reference voltage signal inserted into the video signal of the core 101d having the highest average luminance is defined as the reference signal and the above described reference signal is compared with the reference voltage signals (comparison signals) inserted into video signals of other cores. In FIG. 26, 123a–123d denote input terminals of video signals, 152a–152d and 153a–153d switches, 121a–121d comparators, 122a–122d low-pass filters, 211a–211d input terminals of comparison signals, 212a–212d input terminals of the reference signal, and 124a–124d output terminals of control voltage. Video signals, which are supplied from the cores 101a–101d, which have undergone contrast and/or luminance control, and which have reference voltage (B/W) inserted therein, are respectively inputted to the input terminals 123a–123d and transmitted to the comparators 121a–121d corresponding to respective cores. The video signal of the core 101d having the highest average luminance is selected as the reference signal by the switches 152a–152d. The above described reference signal is inputted to the comparators 121a–121d in common. Respective comparators 121a–121d compare reference voltage signals of inserted white level (W) and black level (B), and output voltage information indicating whether the reference voltage signals of the white level (W) and the black level (B) of the comparison signals (101a, 101b and 101c) are higher or lower than the reference voltage signal of the reference signal (101d). In case the reference voltage (B/W) is inserted in the overscan interval, comparison results of only the reference voltages of the white level (W) and the black level (B) inserted in the overscan interval of the video signal are inputted to the low-pass filters 122a–122d corresponding to respective cores by the switches 153a–153d in response to a pulse SW153 shown in FIG. 27. In case the reference voltage (B/W) is inserted in the blanking interval, comparison results of only the reference voltages of the white level (W) and the black level (B) inserted in the overscan interval of the video signal are inputted to the low-pass filters 122a–122d corresponding to respective cores by the switches 153a–153d in response to a pulse SW153 shown in FIG. 28. Subsequent operation of the comparison circuit 102 and the cores 101a–101d is similar to the foregoing description and hence it will not be described. The present comparison circuit 102 has a feature that control voltage can be fed back to all cores at intervals of 1 H and more rapid control can be exercised by providing the comparators 121a–121d corresponding to respective cores.

Figure 29:
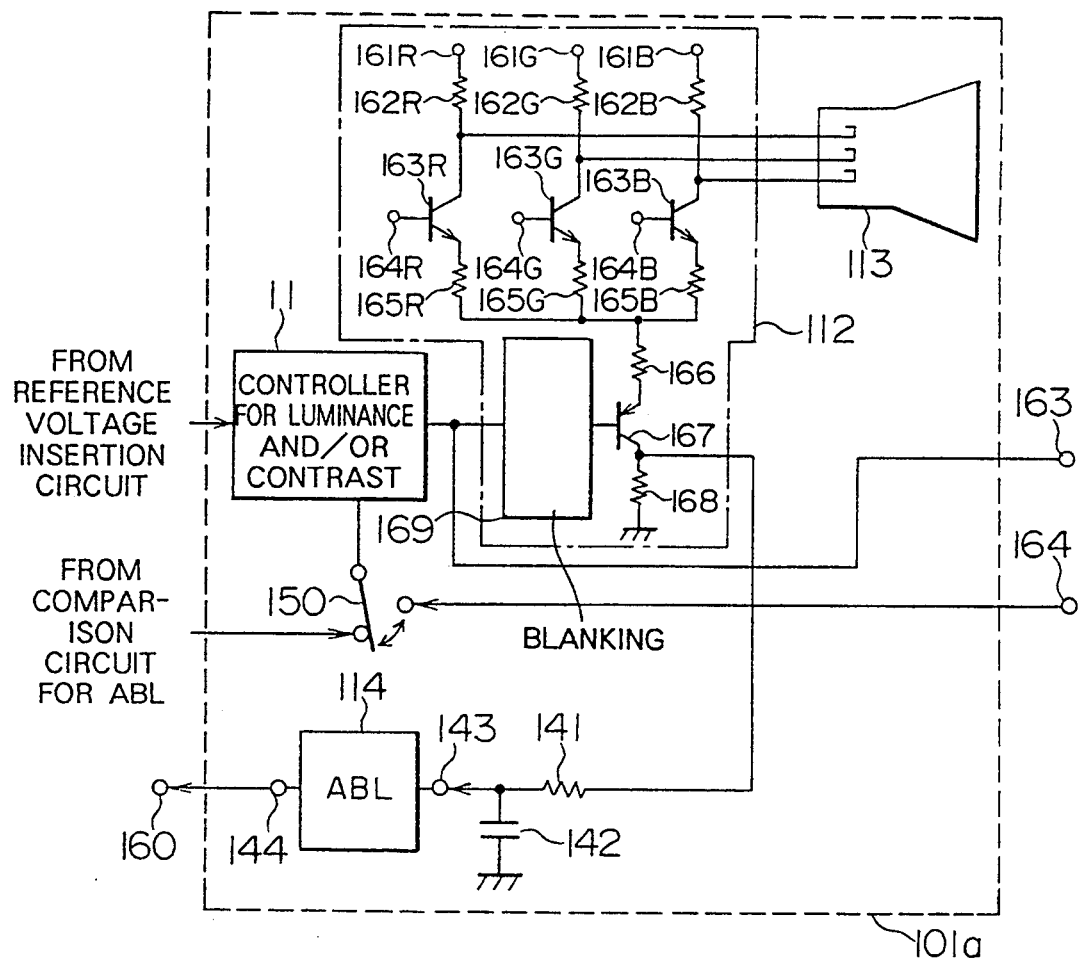
FIG. 29 is a circuit block diagram of a multiscreen display apparatus according to the present invention.

Another embodiment of the present invention is shown in FIG. 29. Since the basic configuration of the present embodiment is nearly identical with that of the first embodiment shown in FIG. 18, only the part of the core 101a is illustrated. The present embodiment has a feature that the ABL control information is detected not from the beam current but from the average value of the CRT drive voltage. In FIG. 29, numeral 112 denotes a CRT drive circuit, which has supply voltage application terminals 161, resistors 162, 165, 166 and 168, transistors 163 and 167, a color difference signal input terminal 164, and a blanking circuit 169. The CRT drive circuit 112 supplies primary color signals -R, -G and -B to a CRT 113. A resistor 141 and a capacitor 142 generate the average value of CRT drive voltage inputted to an ABL circuit 114. Numeral 143 denotes a terminal for inputting the average value of the CRT drive voltage, and numeral 144 denotes a terminal for outputting the control voltage.

Figure 30:
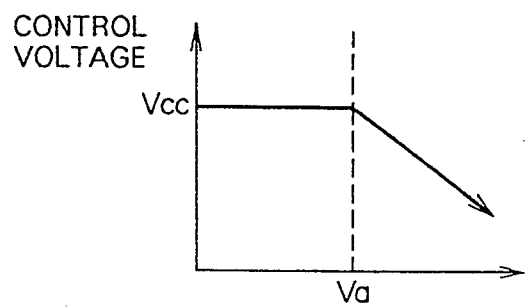
FIG. 30 is a characteristic diagram for explaining the operation of the circuit shown in FIG. 29.

FIG. 30 is a graph showing the operation of the ABL circuit 114. The abscissa represents the average value of the CRT drive voltage, whereas the ordinate represents the control voltage.

Operation of the present embodiment will hereafter be described. It is now supposed that a predetermined image is displayed on the screen of the CRT 113 by an inputted video signal. A video signal blanked by the blanking circuit 169, i.e., CRT drive voltage is outputted to the collector of the transistor 167. The above described CRT drive voltage is averaged by the resistor 141 and the capacitor 142. The average value is transmitted to the terminal 143. In case the average luminance of the screen, i.e., the average value of the above described CRT drive voltage is equal to or less than a predetermined level (Va in FIG. 30), the ABL circuit 114 outputs constant control voltage (Vcc in FIG. 30). In case the average value of the above described CRT drive voltage is at least the predetermined level, the ABL circuit 114 functions so as to lower the control voltage in proportion to the input voltage as shown in FIG. 30. In this way, the ABL circuit 114 detects the average value of the CRT drive voltage. If the average luminance of the CRT screen, i.e., the average value of the CRT drive voltage becomes at least the predetermined level, the ABL circuit 114 functions to suppress the output amplitude of the contrast and/or luminance control circuit 111 by reducing the control voltage. Operation for correcting the dispersion of gains of the contrast and/or luminance control circuit 111 and the ABL circuit 114 is similar to that of the first embodiment, and hence it will not be described.

A feature of the present embodiment is the fact that a circuit for absorbing the dispersion of gain can adapt to the case of circuit configuration for detecting the ABL control information from the average value of the CRT drive voltage.

Figure 31:
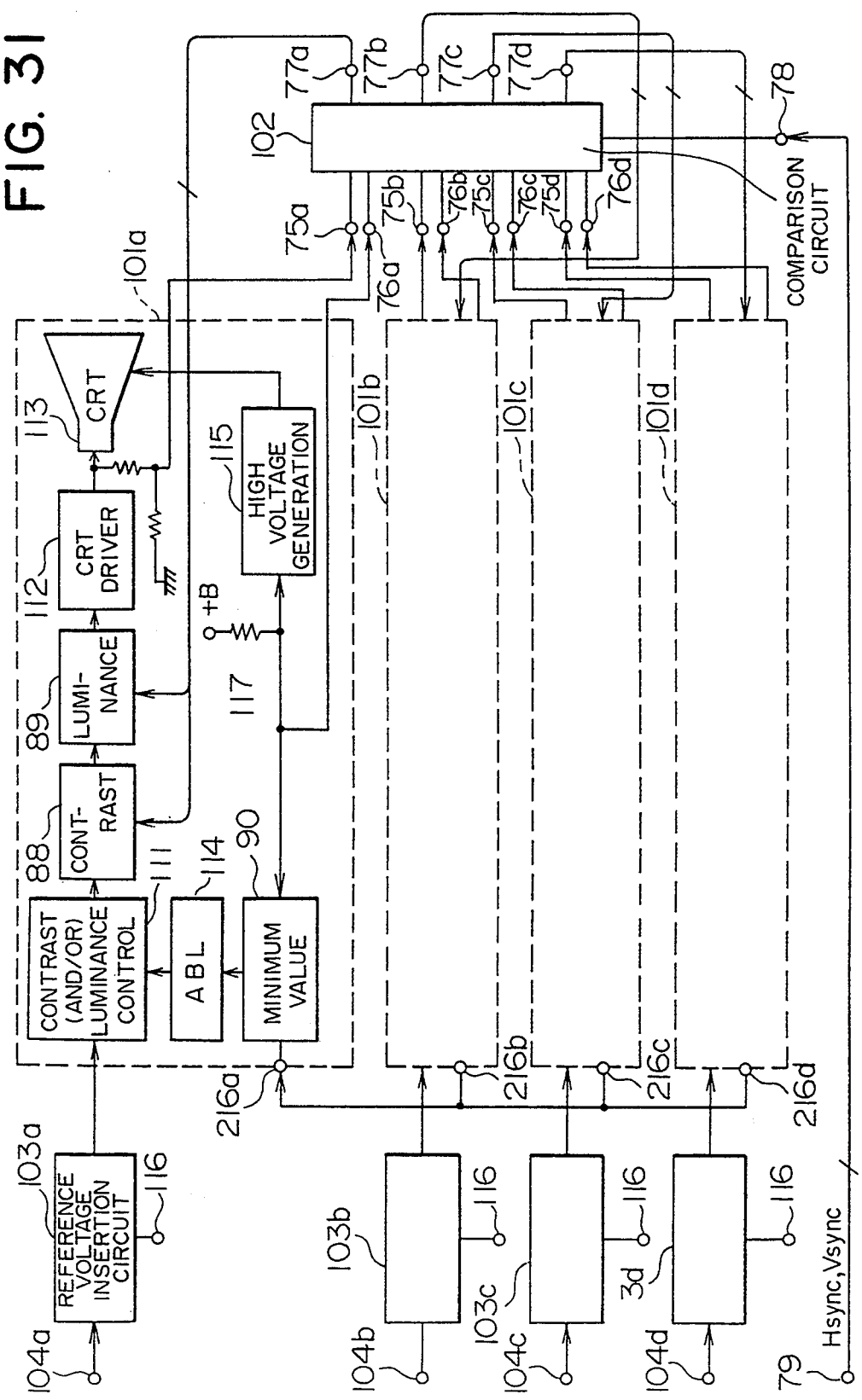
FIG. 31 is a circuit block diagram of a multiscreen display apparatus according to the present invention.

Another embodiment of the present invention is shown in FIG. 31. The present embodiment shows a more practical configuration.

A minimum value circuit 90 compares the voltage detected by a beam current detection resistor 117 with external voltage (which is voltage detected by a beam current detection resistor 117 of another core) and selects a lower voltage. Since terminals 216a–216d are connected together, the output of the minimum value circuit 90 of each core becomes equivalent to the voltage detected by the beam current detection resistor 117 of the core having the highest average luminance and the contrast and/or luminance control circuits are controlled all together by the ABL circuit 114.

Figure 32:
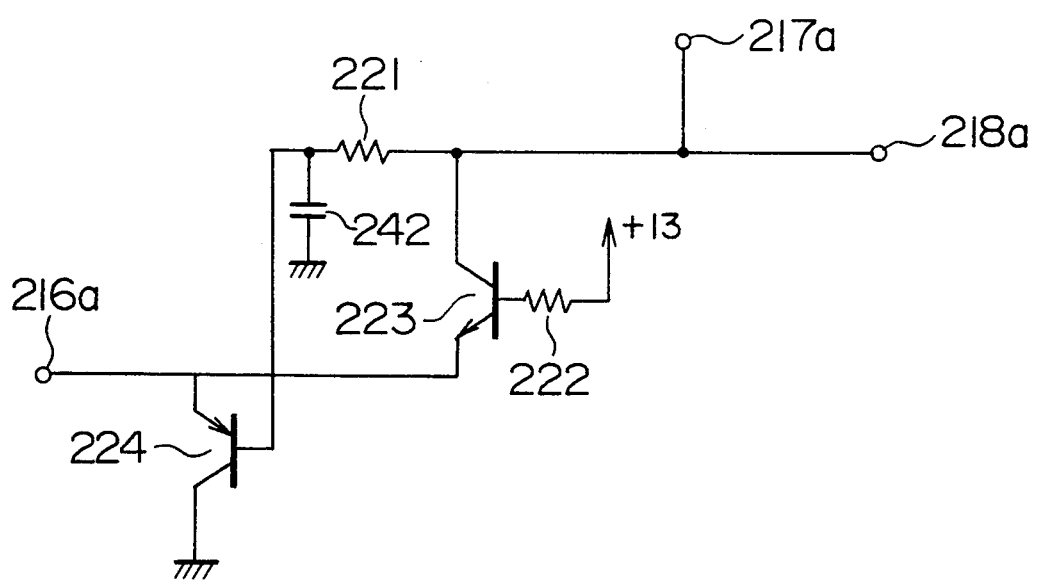
FIG. 32 is a block diagram of a minimum value circuit according to the present invention.

The minimum value circuit 90 may have the configuration as shown in FIG. 32, for example. A terminal 218a is a terminal for applying voltage detected by the beam current detection resistor 117. A terminal 217a is an output terminal.

If the voltage of the terminal 218a is smaller than that of a terminal 216a, for example, a transistor 223 turns off, so that the voltage of the terminal 218a is outputted to the output terminal 217a and at the same time the voltage of the terminal 218a is outputted to the terminal 216a as well via the base-emitter of the transistor 224.

If on the contrary the voltage of the terminal 218a is larger than that of the terminal 216a, the transistor 224 turns off whereas the transistor 223 turns on, so that the voltage of the terminal 216a is outputted to the terminal 217a because of conduction between the emitter and collector of the transistor 223.

By using such a minimum value circuit within the core, the configuration is simplified as compared with FIG. 18.

As described before, connection of this minimum value circuit 90 alone results in open-loop control in cores other than the core having the highest average luminance. Because of dispersion of gains of the contrast and/or luminance control circuit and so on, luminance levels of the cores disperse. Therefore, a contrast control circuit 88 and a luminance control circuit 89 are controlled by a comparison circuit 102.

Apart from the contrast and/or luminance control circuit 111 controlled by the ABL circuit 114, the contrast control circuit 88 and the luminance control circuit 89 are provided so as to allow control of contrast and luminance without the switch 150 of FIG. 18.

Figure 33:
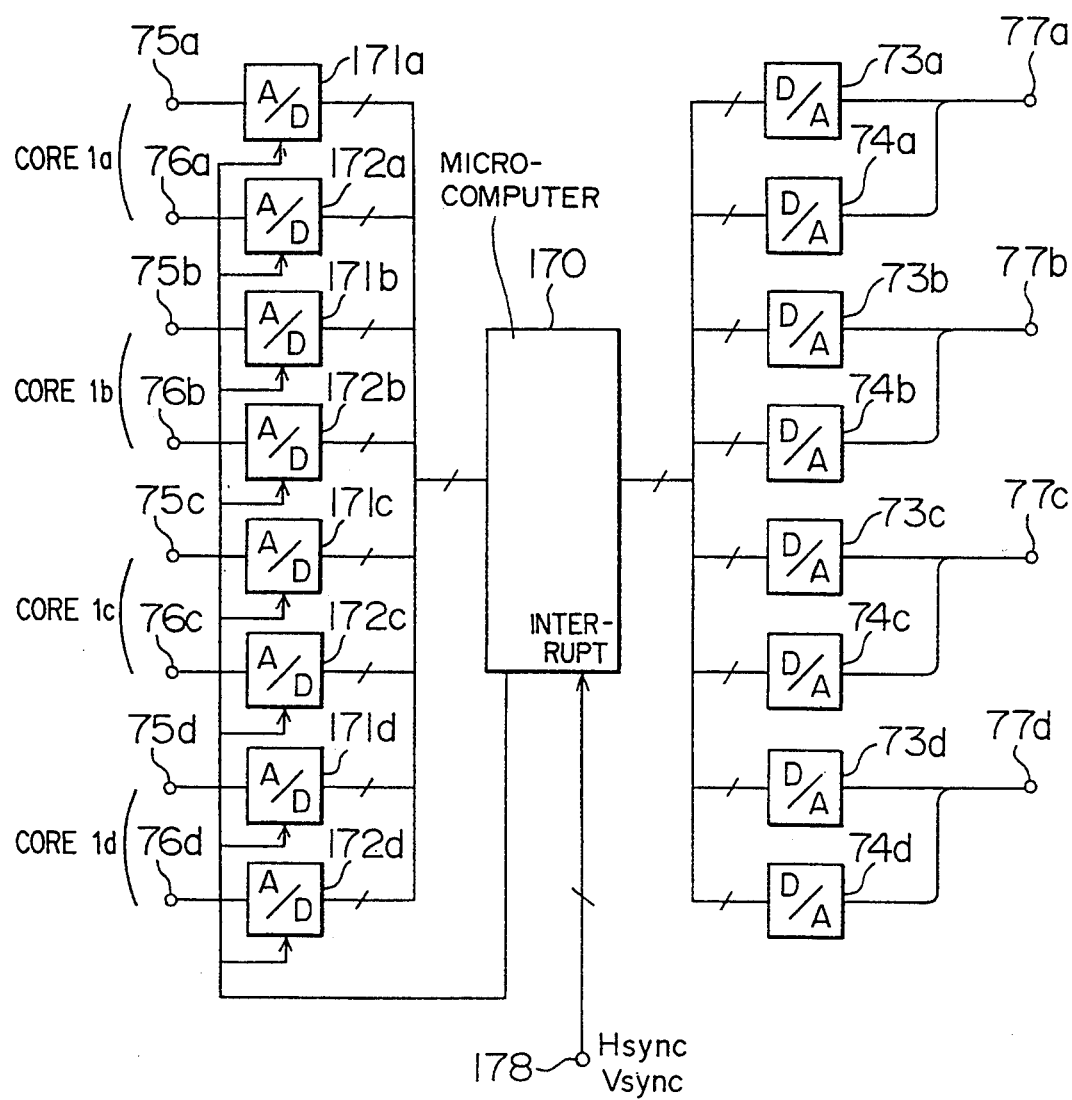
FIG. 33 is a block diagram of a comparison circuit according to the present invention.

As shown in FIG. 33, for example, the comparator circuit 102 is mainly composed of a microcomputer 170. The comparator circuit 102 also comprises A/D converters 171a, 172a, 171b, 172b, 171c, 172c, 171d and 172d, and D/A converters 73a, 74a, 73b, 74b, 73c, 74c, 73d and 74d.

Video signals after being subject to contrast and/or luminance control are inputted to the A/D converters 171a, 171b, 171c and 171d whereas voltages detected by the beam current detection resistor 117 are inputted to the A/D converters 172a, 172b, 172c and 172d.

As a matter of course, conversion timing of the A/D converters 171a, 171b, 171c and 171d is located in reference voltage insertion positions. The conversion timing pulse may be generated by software by using the horizontal synchronization and vertical synchronization (Hsync and Vsync), for example, as the interrupt signal of the microcomputer 170. As a matter of course, the conversion timing pulse may be formed by a dedicated logic circuit. As for insertion of the reference voltage, it may be identical with that of the embodiment shown in FIG. 18, for example, and hence its description will be omitted.

On the basis of data converted by the A/D converters 172a, 172b, 172c and 172d, the microcomputer 170 selects the minimum value of voltages detected by the beam current detection resistor 117, i.e., the core having the highest average luminance.

On the other hand, reference signals of the core 101a, core 101b, core 101c and core 101d after contrast and/or luminance control undergo A/D conversion in the A/D converters 171a, 171b, 171c and 171d, respectively. White level Information and black level information are taken in the microcomputer 170.

Figure 34:
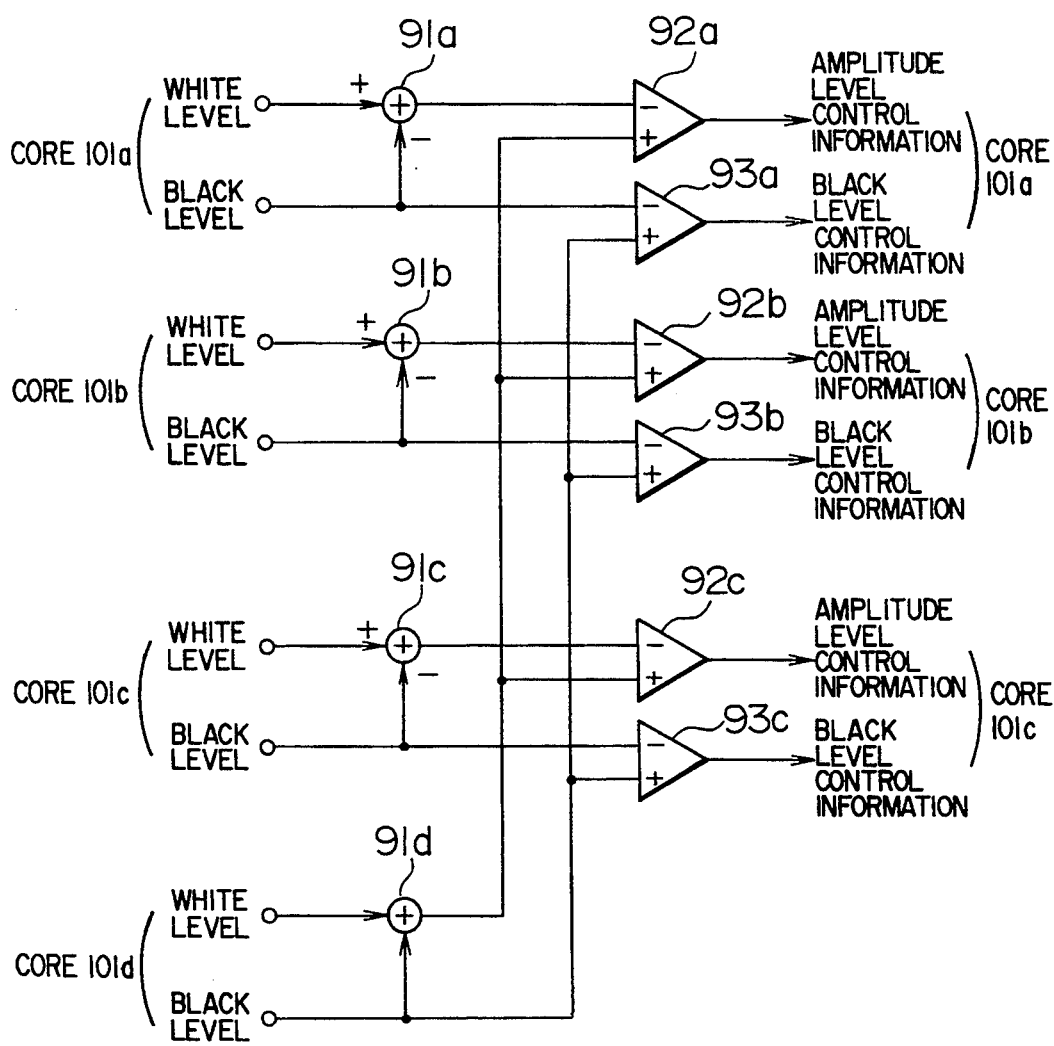
FIG. 34 is a diagram for explaining the operation concept of a microcomputer according to the present invention.

The concept of operation of the microcomputer 170 will now be described by referring to FIG. 34.

There are white level information and black level information of each of the core 101a, core 101b, core 101c and core 101d taken into the microcomputer 170. Among them, black level information is inputted to each of comparators 93a, 93b and 93c as it is. As for the white level, difference between it and the black level is inputted to each of the comparators 92a, 92b and 92c. Assuming now that the core 101d has been selected as the core having the highest average luminance, black level information and amplitude level information of the core 101d become reference information of the comparators 93a, 93b and 93c and reference information of the comparators 92a, 92b and 92c, respectively. That is to say, outputs of the comparators 93a, 93b and 93c become black level control information of respective cores, whereas outputs of the comparators 92a, 92b and 92c become amplitude level control information of respective cores. Luminance is controlled by the black level control information, whereas contrast is controlled by the amplitude level information. As a matter of course, software processing in the microcomputer 170 has heretofore been described. In fact, the black level control information of the core 101a (corresponding to the output of the comparator 93a), for example, is converted into analog voltage by the D/A converter 74a as shown in FIG. 33 to control the luminance control circuit 89. The amplitude level control information (corresponding to the output of the comparator 92a) is converted into analog voltage by the D/A converter 73a to control the contrast control circuit 88. The same holds true of the core 101b and the core 101c.

By the operation heretofore described, feedback control is exercised for all cores. Dispersion of luminance due to open-loop control described before can thus be suppressed.

A great feature of the present embodiment is that the comparison circuit 102 and the contrast control circuit 88 and the luminance control circuit 89 controlled by the comparison circuit 102 are completely separated from the minimum value circuit 90, the ABL circuit 114 and the contrast and/or luminance control circuit 111 and hence they operate independently.

The circuit system including the minimum value circuit 90, the ABL circuit 114 and the contrast and/or luminance control circuit 111 does not operate outside of the operation region of the ABL circuit 114 (such as the beam current of at least Ia in FIG. 19). As for the circuit system including the comparison circuit 102, the contrast control circuit 88 and the luminance control circuit 89, however, feedback control is always possible. In the non-operation region of the ABL circuit 114, not to mention in the operation region of the ABL circuit 114, therefore, luminance dispersion of cores can be suppressed, resulting in a system effective for a change with the passage of time and a change with the temperature change.

Herein, the video signal after contrast and/or luminance control is extracted by means of voltage division from the output of the CRT drive circuit 112. It is a matter of course that luminance dispersion due to dispersion of gains of CRT drive circuits 112 of the cores can also be suppressed by doing so.

Figure 35:
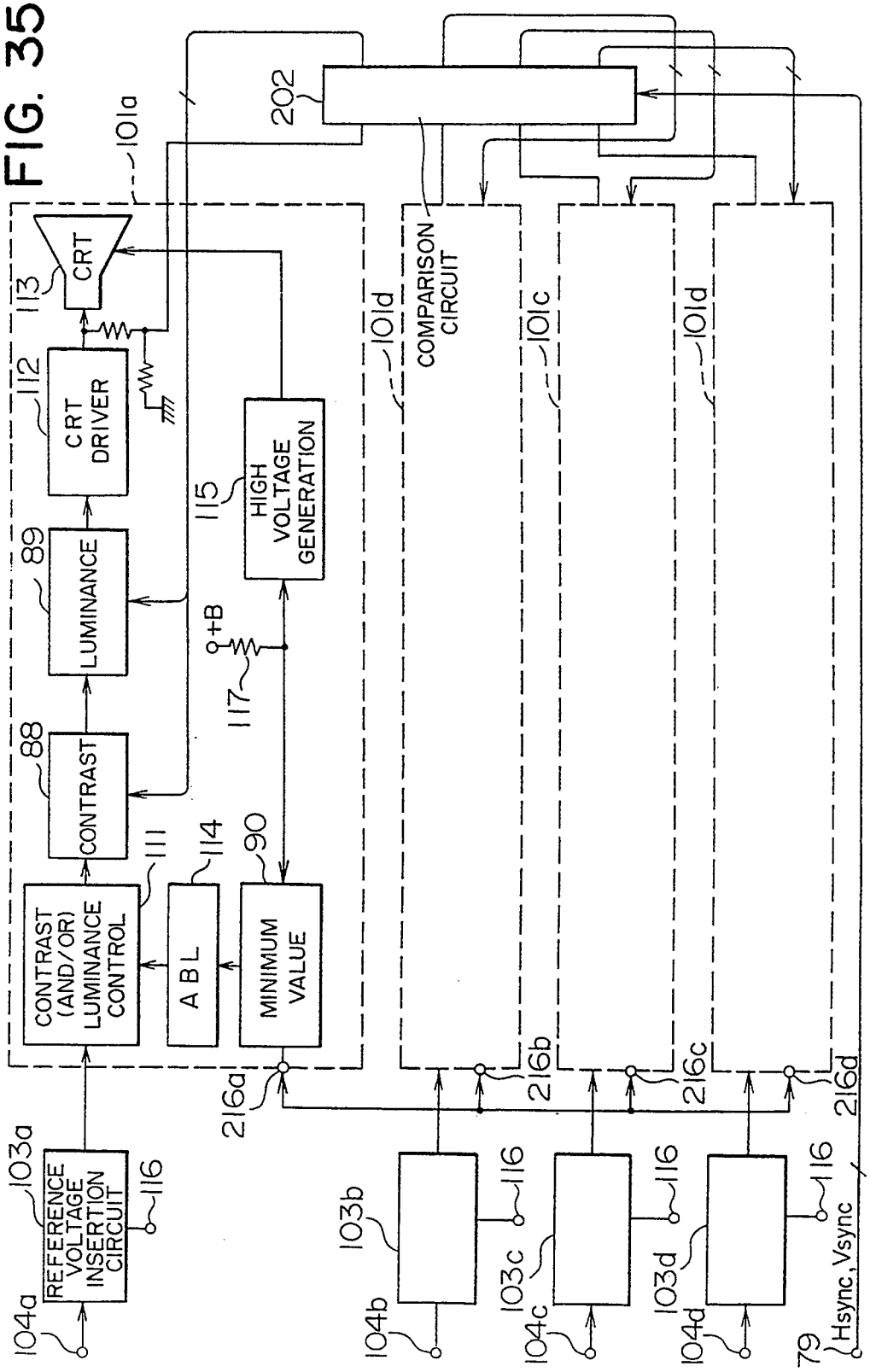
FIG. 35 is a circuit block diagram of a multiscreen display apparatus according to the present invention.

Another embodiment of the present invention is shown in FIG. 35.

The circuit shown in FIG. 35 differs very markedly from the circuit shown in FIG. 31 in that the voltage detected by the beam current detection resistor 117 is not taken into a comparison circuit 202. Insertion of reference voltage and so on are identical.

In FIG. 31, this has been done in order to select the core having the highest average luminance. In the embodiment shown in FIG. 35, however, selection of the core having the highest average luminance is not made.

That is to say, the core used as the reference is fixed.

It is now assumed that the core 101d, for example, has been fixed as the reference core.

First of all, the case where the core 101a has the highest average luminance will now be considered. At this time, the contrast and/or luminance control circuit 111 is brought by the ABL circuit 114 to such a state that the lowest luminance level is attained. Since the core 101d is defined as the reference, however, feedback control is so applied to the contrast control circuit 88 and the luminance control circuit 89 of the core 101a via the comparison circuit 202 as to raise the luminance. As a result, the luminance of the screen attempts to rise. Immediately, however, the voltage detected by the beam current detection resistor 117 falls and prevents rise of luminance via the minimum value circuit 90 and the ABL circuit 114. At the same time, the output of the minimum value circuit 90, i.e., the voltage detected by the beam current detection resistor 117 is conveyed to other cores as well.

Consequently, the level of the core 101d also falls and the difference in level between the core 101d and the core 101a becomes small. Finally, stability is attained where the reference signals coincide with each other.

As for other cores, the operation is similar to that of FIG. 31 and hence its description will be omitted. As for the case where the core 101d has the highest average luminance, the operation is completely identical with that of FIG. 31 and hence its description will be omitted.

Even if the core used as the reference is thus fixed, operation similar to that of FIG. 31 can be performed.

The present embodiment eliminates taking in the voltage detected by the beam current detection resistor 117. Therefore, the A/D converters 171a, 171b, 171c and 171d shown in FIG. 33, for example, become unnecessary and minimum value selection of the microcomputer also becomes unnecessary. The configuration of the comparison circuit 202 becomes simpler.

Figure 36:
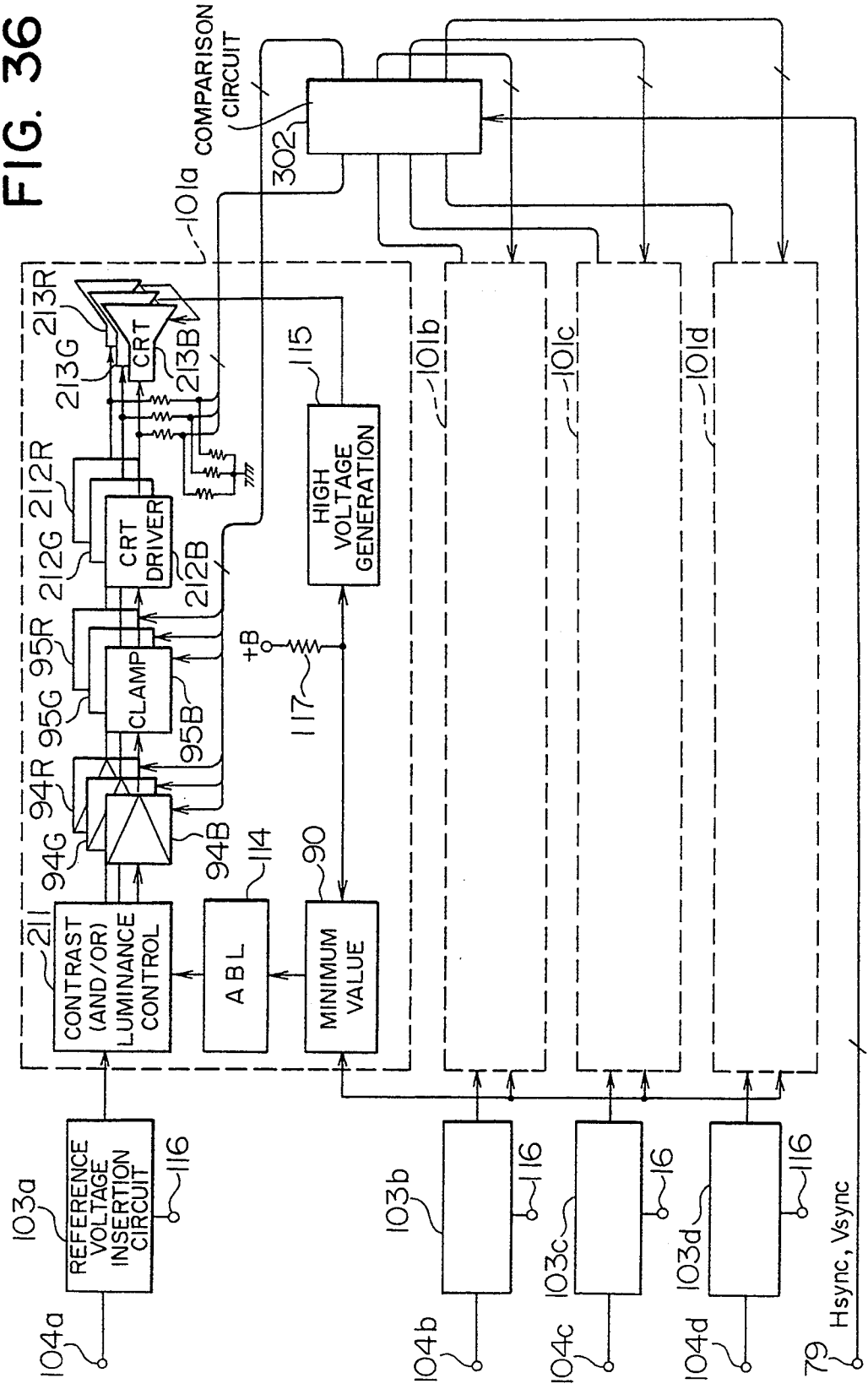
FIG. 36 is a circuit block diagram of a multiscreen display apparatus according to the present invention.

Another embodiment of the present invention is shown in FIG. 36.

A feature of FIG. 36 is that outputs of the comparison circuit 302 are fed back to amplifiers 94R, 94G and 94B as well as clamp circuits 95R, 95G and 95B to control R, G and B independently. This can be used in the case where the output of the contrast and/or luminance control circuit 211 is a primary color signal output, for example. As a matter of course, the comparison circuit 302 needs A/D conversion and comparison processing for three colors, i.e., R, G and B as well as D/A converters for controlling clamp circuits 95R, 95G and 95B. However, the control procedure becomes the same operation as that of FIG. 35 and hence its detailed description will be omitted. As for insertion of the reference voltage as well, it may be identical with that of the embodiment shown in FIG. 18, for example, and hence its description will be omitted.

By such independent control of R, G and B, dispersion of RGB signals among cores can be suppressed with higher precision. Prominent effects are thus obtained in adjustment and maintenance of white balance in the multiscreen display.

Figure 37:
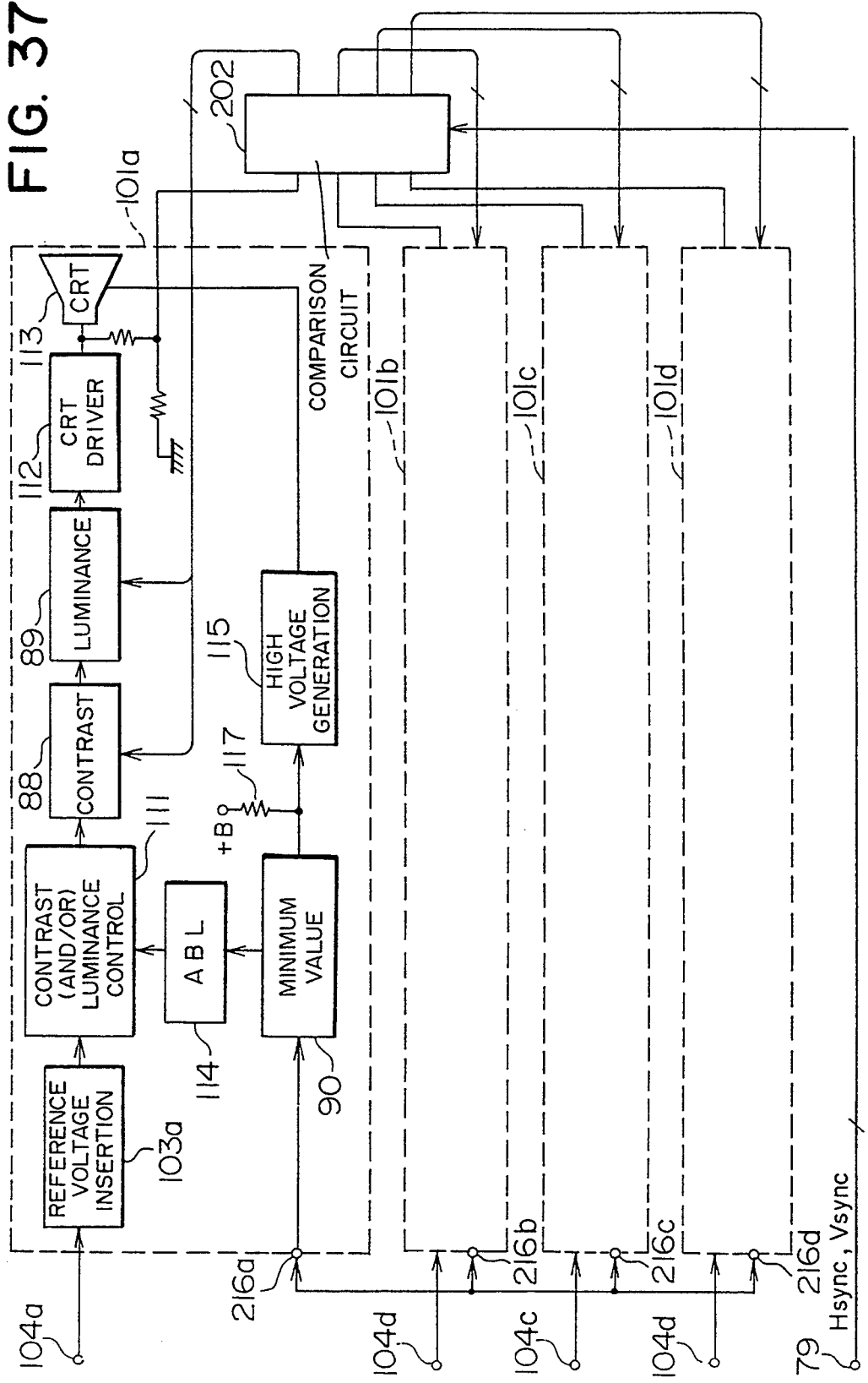
FIG. 37 is a circuit block diagram of a multiscreen display apparatus according to the present invention.

Another embodiment of the present invention is shown in FIG. 37.

A great feature of FIG. 37 is that the reference voltage insertion circuit is incorporated into the core.

Excepting this, FIG. 37 is completely identical with FIG. 35 and hence description of the operation itself will be omitted.

In the present embodiment, the reference voltage insertion circuit differs from core to core. From core to core, therefore, the white level and the black level ought to differ. Therefore, the white pattern is displayed simultaneously on the core 101a, core 101b, core 101c and core 101d, for example. The gain of the CRT drive circuit 112, for example, is so adjusted that the same color temperature of white may be attained in all cores. Thereafter, the white level voltage applied to the reference voltage insertion circuit 103a is so adjusted that white levels of reference voltage of the cores after the contrast and/or luminance control may coincide with each other. Then the gray pattern is displayed simultaneously on the core 101a, core 101b, core 101c and core 101d. The cutoff voltage of the CRT 113, for example, is so adjusted that all cores may have the same luminance. Thereafter, the voltage of the black level applied to the reference voltage insertion circuit 103a is so adjusted that black levels of the reference voltage of the cores after the contrast and/or luminance control may coincide with each other.

By thereafter causing operation which is completely identical with that of FIG. 35 in the comparison circuit 202, luminance shading of cores can be suppressed.

In the present embodiment, the image expansion device 40 need not have the reference voltage insertion circuit and the configuration of the image expansion device is simplified.

The insertion position and so on of the reference voltage may be identical with those of the embodiment shown in FIG. 18, for example, and hence description will be omitted.

Figure 38:
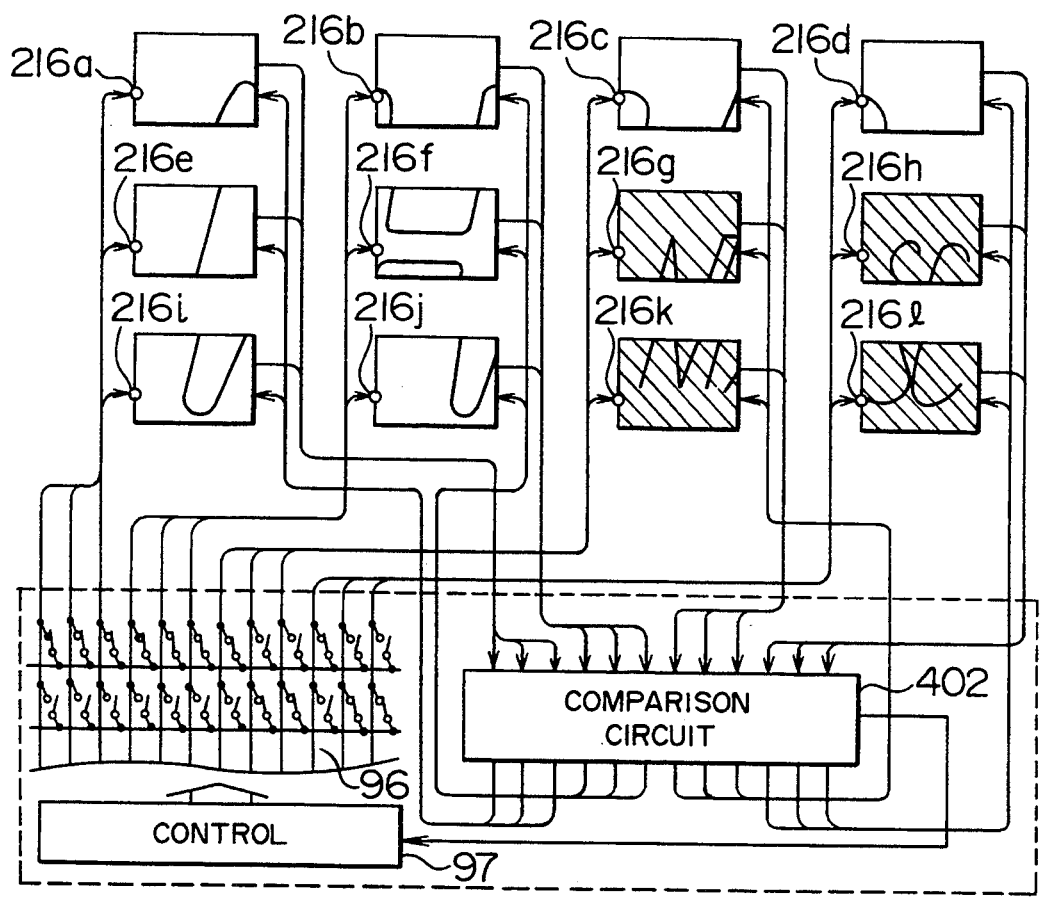
FIG. 38 is a circuit block diagram of a multiscreen display apparatus according to the present invention.

Another embodiment of the present invention is shown in FIG. 38. FIG. 38 shows an example in which the present invention has been applied to a multiscreen display having 12 screens, for example.

Figure 39:
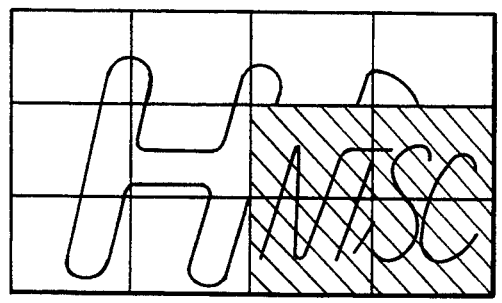
FIG. 39 is a diagram for explaining the operation of the circuit of FIG. 38.

If the number of cores increases, simply connecting terminals 216a, 216b, 216c and 216d as shown in FIG. 35 poses a problem in representation. In case it is desired to display a different pattern on four out of 12 screens as shown in FIG. 39, for example, patterns must be controlled, respectively. Therefore, a matrix switch 96 is provided to control terminals 216a–216l of the cores collectively. The matrix switch 96 may be formed by analog switches, for example, and a control circuit 97 may be provided and controlled by the microcomputer of the comparison circuit 402. Although the description lacks sequence, the comparison circuit may be formed by a microcomputer in the same way as FIG. 35, for example. As a matter of course, the number of A/D converters and D/A converters must be increased by the number of cores. Since the operation itself is the same as that of FIG. 35, its description will be omitted.

Figure 40:
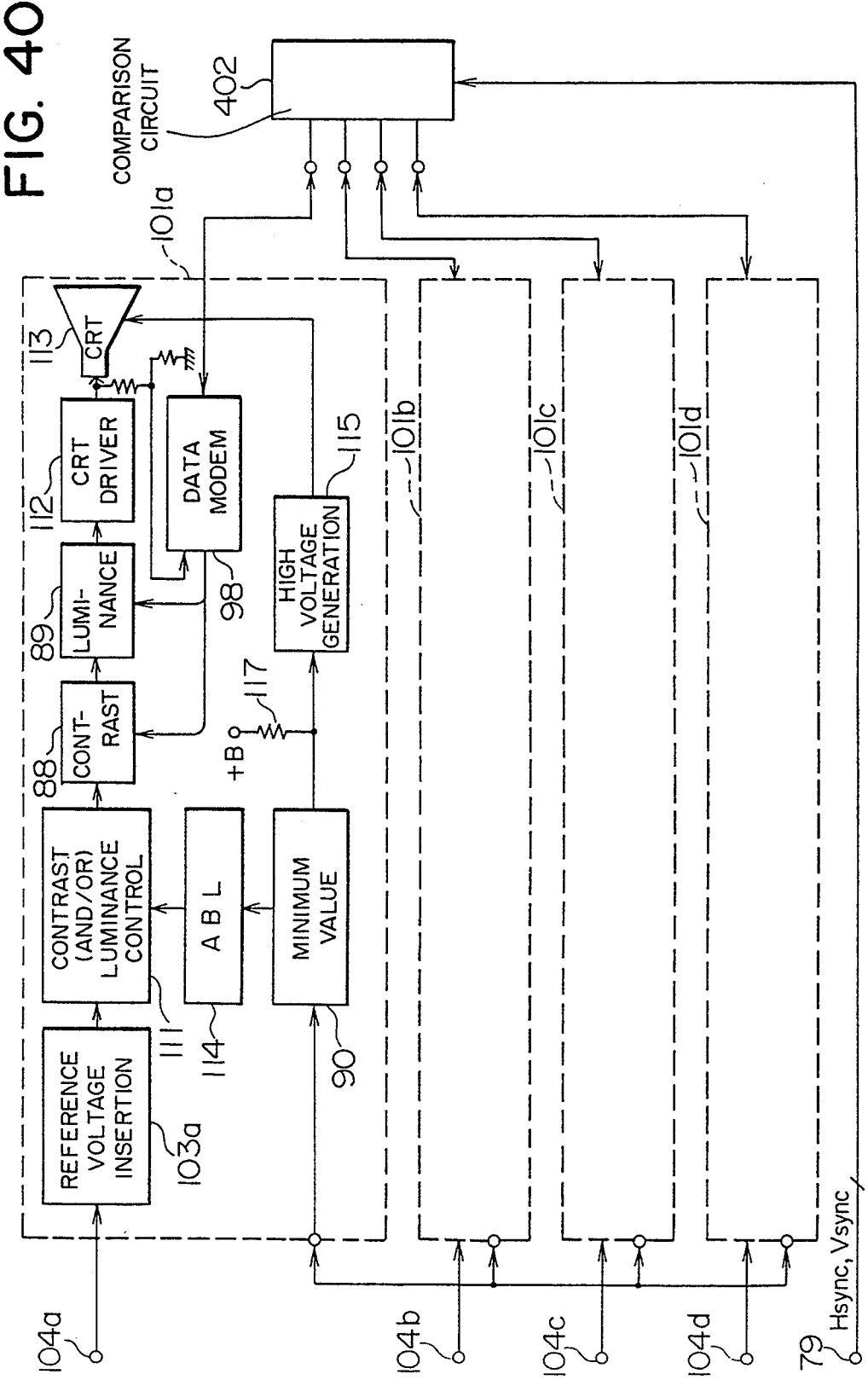
FIG. 40 is a circuit block diagram of a multiscreen display apparatus according to the present invention.

Another embodiment of the present invention is shown in FIG. 40.

A feature of FIG. 40 is that each core has a data modem 98 and digital data transmission is performed between the data modem 98 and the comparison circuit 402 via the RS232C interface, for example.

The data modem 98 converts the reference signal after contrast and/or luminance control into digital data in the core, transmits the digital data to the comparison circuit 402, and decodes control information supplied from the comparison circuit 402 to control the contrast control circuit 88 and the luminance control circuit 89.

Figure 41:
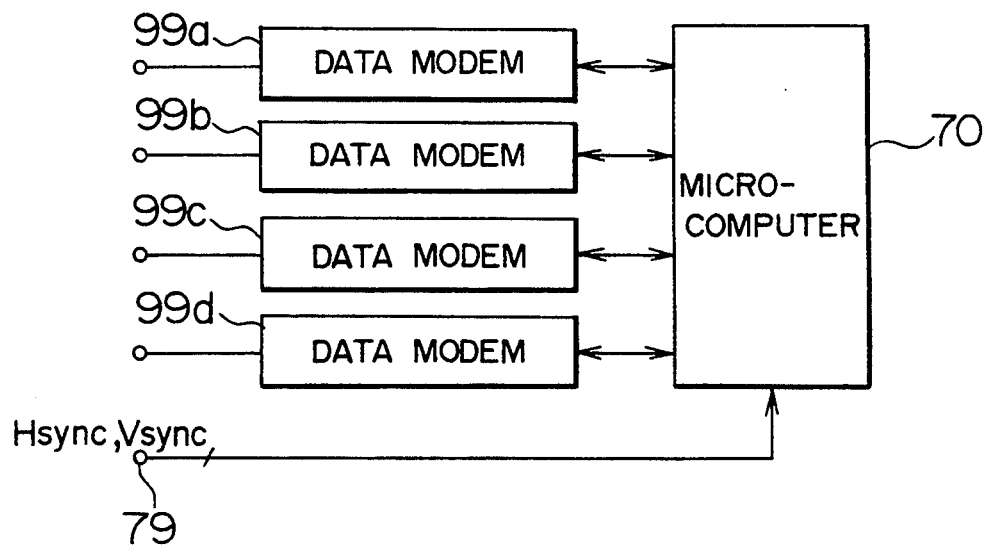
FIG. 41 is a block diagram of a comparison circuit according to the present invention.

On the other hand, data modems 99a, 99b, 99c and 99d are provided in the comparison circuit 402 as well as shown in FIG. 41 to perform data transmission with the data modems 98 of respective cores. The processing procedure of the microcomputer 70 may be identical with that of FIG. 35 and hence its detailed description will be omitted.

By thus connecting the image expansion device with the multiscreen device via digital data transmission lines, the effects of the present invention can be demonstrated even if they are installed in a place having many noises or the ground potential changes because the image expansion device is far away from the multiscreen device.

Figure 42:
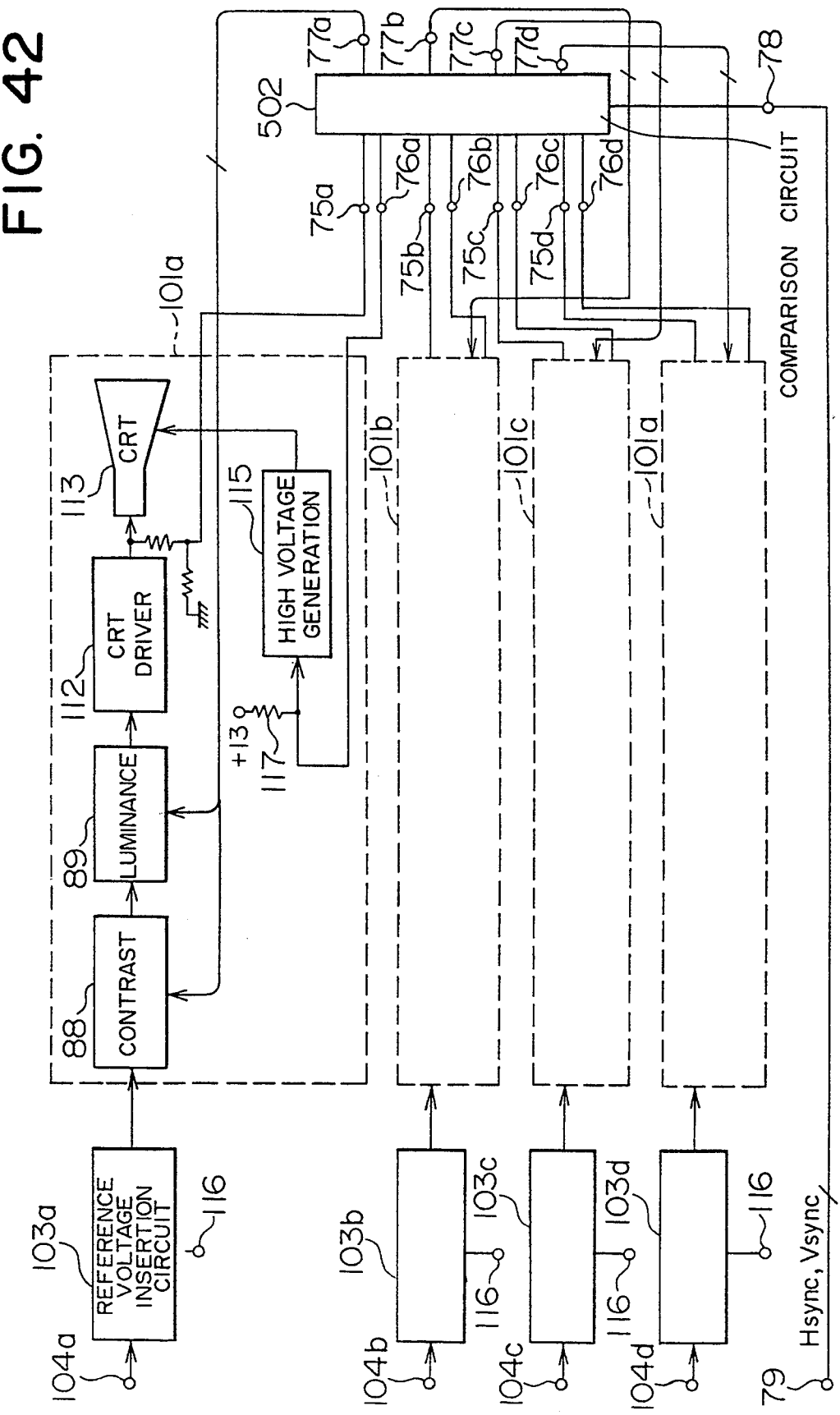
FIG. 42 is a circuit block diagram of a multiscreen display apparatus according to the present invention.

Another embodiment of the present invention is shown in FIG. 42.

A feature of the present embodiment is that the comparison circuit 502 controls the contrast control circuit 88 and the luminance control circuit 89 inclusive of the ABL function of the core. FIG. 42 has a configuration obtained by removing the contrast and/or luminance control circuit 111, the ABL circuit 114 and the minimum value circuit 90 from the configuration of FIG. 31, resulting in an advantage of simplified core configuration.

The comparison circuit 502 may have the same configuration as that of the comparison circuit 102. Since the minimum value circuit 90 and the ABL circuit 114 are absent in the core, mere addition of the function of them to the microcomputer 70 will do. That is to say, voltages detected by the beam current detection resistors 117 and applied to terminals 76a, 76b, 76c and 76d, for example, are compared. The control voltage shown in FIG. 19 is applied to the contrast control circuit 88 and/or luminance control circuit 89 of the core, which is included in cores having a beam current exceeding Ia of FIG. 19 and which has a maximum current value.

Other functions of the microcomputer 70 may be identical with those of the embodiment shown in FIG. 31, for example, and hence detailed description of them will be omitted.

Figure 43:
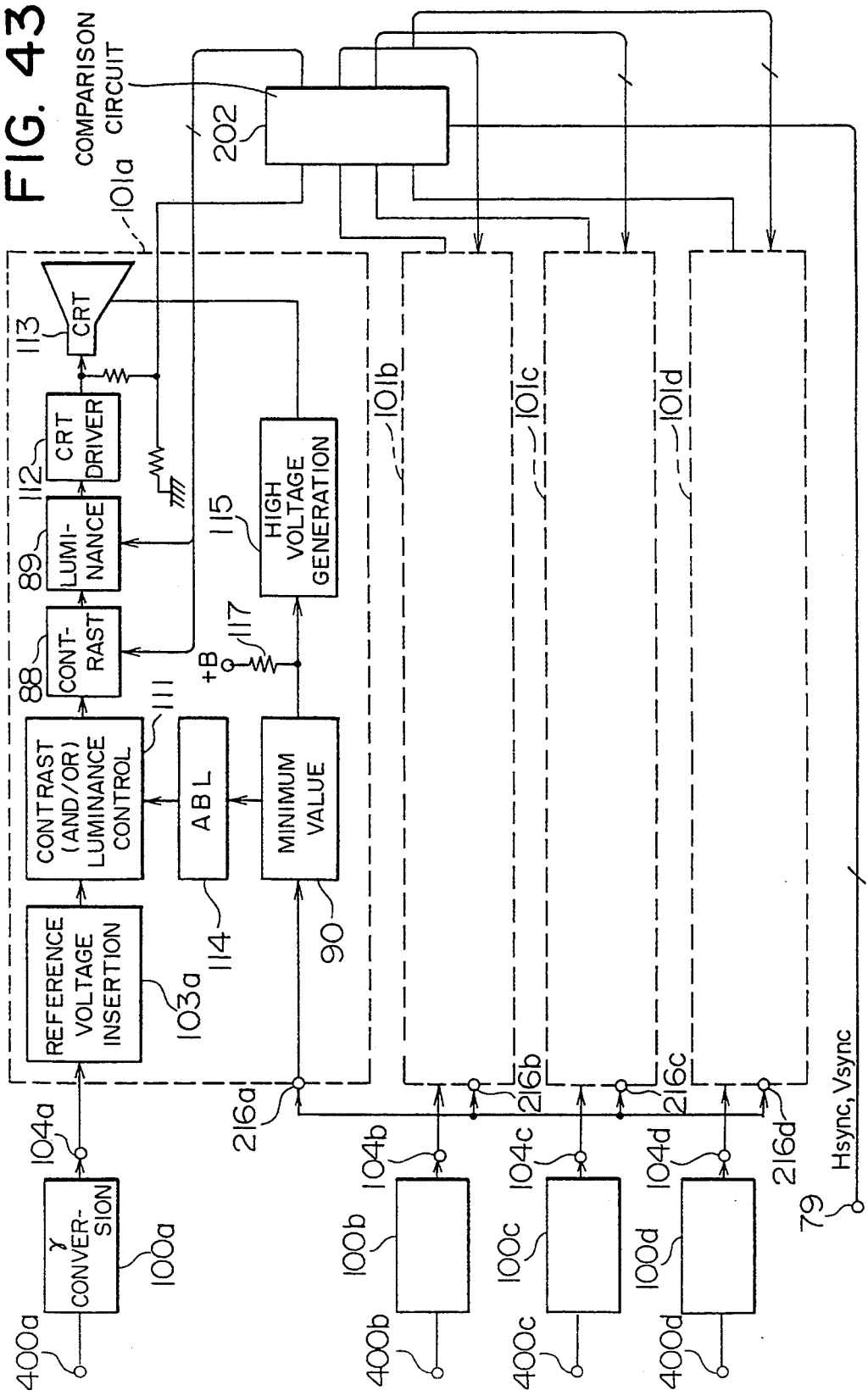
FIG. 43 is a circuit block diagram of a multiscreen display apparatus according to the present invention.

Another embodiment of the present invention is shown in FIG. 43.

A feature of the present embodiment is that $\gamma$ conversion circuits 100a, 100b, 100c and 100d are added to the configuration of FIG. 37 to absorb dispersion of $\gamma$ characteristics of CRT 113 of the cores 101a, 101b, 101c and 101d.

Figure 44:
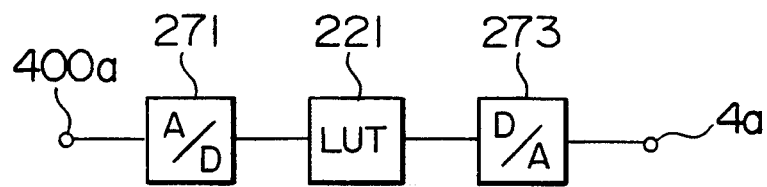
FIG. 44 is a block diagram of a $\gamma$ conversion circuit.

The $\gamma$ conversion circuits 100a, 100b, 100c and 100d can be implemented preferably by converting a video signal into a digital signal in an A/D converter 271, changing the input/output characteristics of the digital signal in an LUT 221, and converting the resultant digital signal in a D/A converter 273 as shown in FIG. 44. It is a matter of course that the LUT 221 can be formed by using a ROM, for example.

That is to say, it is possible to suppress dispersion of ABL control characteristics among cores by using the means described before with reference to FIG. 37 while absorbing dispersion of $\gamma$ characteristics of CRT 113 in the $\gamma$ conversion circuits 100a, 100b, 100c and 100d. It is thus possible to obtain a single uniform multiscreen display.

In FIG. 43, the $\gamma$ conversion circuits 100a, 100b, 100c and 100d are disposed outside of the cores. However, they may be disposed within the cores 101a, 101b, 101c and 101d, or they may be disposed within the image expansion device 40. Further, in FIG. 43, the $\gamma$ conversion circuits 100a, 100b, 100c and 100d are connected to the configuration of FIG. 37. As a matter of fact, however, there is no problem at all even if the $\gamma$ conversion circuits 100a, 100b, 100c and 100d are connected to the configuration of FIG. 31 or FIG. 35.

By means of the feedback control using the comparison circuit, the present invention makes it possible to suppress dispersion of luminance due to dispersion of ABL control characteristics of respective cores, obtain continuity of luminance at boundaries of cores, and improve the quality of image display.

We claim:

1. A multiscreen display apparatus having one large screen formed by combining screens of a plurality of display units, said multiscreen display apparatus comprising:

data converters respectively provided in said display units, said data converters receiving video signal data represented in a digital form and correcting said video signal data according to correction data obtained on the basis of display characteristics of said display units; and control means for controlling data correction operations of said data converters as a whole;

wherein each of said data converters comprises a plurality of look-up tables, each of the look-up tables storing correction data for making shading of a respective one of a plurality of divisional regions of the screen of a respective display unit uniform, and correction means for correcting said video signal data by using the correction data stored in said plurality of look-up tables.

2. A multiscreen display apparatus according to claim 1, wherein each of said data converters further comprises interpolation means for determining unknown correction data for a region by means of interpolation on the basis of known correction data for a plurality of specific regions stored in said plurality of look-up tables.

3. A multiscreen display apparatus according to claim 2, wherein said control means comprises computer control devices respectively provided in said display units for controlling data correction operations of said data converters, and control means for exercising general control over said computer control devices.

4. A multiscreen display apparatus having one large screen formed by combining screens of a plurality of display units, said multiscreen display apparatus comprising:
data converters respectively provided in said display units, said data converters receiving video signal data represented in a digital form and correcting said video signal data according to correction data obtained on the basis of display characteristics of said display units;
means for detecting at least one of luminance and color information from said large screen formed by combining the screens of said plurality of display units; and
means for controlling said data converters on the basis of said detected at least one of luminance and color information;
wherein each of said data converters comprises a plurality of look-up tables, each of the look-up tables storing correction data for making shading of a respective one of a plurality of divisional regions of the screen of a respective display unit uniform, and correction means for correcting said video signal data by using the correction data stored in said plurality of look-up tables.

5. A multiscreen display apparatus having one large screen formed by combining screens of a plurality of display units, said multiscreen display apparatus comprising:
data converters respectively provided in said display units, said data converters receiving video signal data represented in a digital form and correcting said video signal data according to correction data obtained on the basis of display characteristics of said display units;
computer control devices respectively provided in said display units to control said data converters; and
control means for exercising general control over said computer control devices respectively provided in said display units;
wherein each of said data converters comprises a plurality of look-up tables, each of the look-up tables storing correction data for making shading of a respective one of a plurality of divisional regions of the screen of a respective display unit uniform, and correction means for correcting said video signal data by using the correction data stored in said plurality of look-up tables.

6. A multiscreen display apparatus having one large screen formed by combining screens of a plurality of display units, said multiscreen display apparatus comprising:
data generators respectively provided in said display units, said data generators generating correction data on the basis of display characteristics of said display units;
address circuits respectively provided in said display units to control said data generators;
D/A converters respectively provided in said display units to convert digital signal outputs of said data generators to analog signals;
video circuits respectively provided in said display units to modulate video signals of said display units with outputs of said D/A converters;
computer control devices respectively provided in said display units to control said data generators; and
control means for exercising general control over said computer control devices respectively provided in said display units;
wherein each of said data generators generates a plurality of correction data, each of the correction data being correction data for making shading of a respective one of a plurality of divisional regions of the screen of a respective display unit uniform.

7. A multiscreen display apparatus having one large screen formed by combining screens of a plurality of display units, said multiscreen display apparatus comprising:
data generators respectively provided in said display units, said data generators generating correction data on the basis of display characteristics of said display units;
address circuits respectively provided in said display units to control said data generators;
D/A converters respectively provided in said display units to convert digital signal outputs of said data generators to analog signals;
low-pass filter circuits respectively provided in said display units to smooth outputs of said D/A converters;
video circuits respectively provided in said display units to modulate video signals of said display units with outputs of said low-pass filter circuits;
computer control devices respectively provided in said display units to control said data generators;
control means for exercising general control over said computer control devices respectively provided in said display units;
wherein each of said data generators generates a plurality of correction data, each of the correction data being correction data for making shading of a respective one of a plurality of divisional regions of the screen of a respective display unit uniform.

8. A multiscreen display apparatus having one large screen formed by combining screens of a plurality of display units having cathode-ray tubes (CRTs), the multiscreen display apparatus comprising:
control means for receiving respective video signals for the display units, and for controlling the video signals to make at least one of respective contrasts and respective luminances of the display units coincide with each other;
means for detecting one of (1) respective average beam currents of the display units and (2) respective average CRT drive voltages of the display units, and for outputting respective detection signals indicative of the detected one of average beam currents and average CRT drive voltages;
means for selecting one of the detection signals indicative of one of (1) a maximum average beam current among the average beam currents and (2) a maximum average CRT drive voltage among the average CRT drive voltages;

means for inserting respective reference voltages in one of a line retrace interval and an overscan interval of the video signals before the video signals have been controlled by the control means to make the at least one of respective contrasts and respective luminances of the display units coincide with each other;

means for extracting the reference voltages from the video signals after the video signals have been controlled by the control means to make the at least one of respective contrasts and respective luminances of the display units coincide with each other; and means for defining the reference voltage extracted from the video signal for one of the display units having the one of a maximum average beam current and a maximum CRT drive voltage as a reference signal, for comparing the reference voltages extracted from the video signals for remaining ones of the display units with the reference signal, and for outputting respective comparison signals for the remaining display units indicative of results of the comparing;

wherein the control means controls the video signal for the one display unit having the one of a maximum average beam current and a maximum CRT drive voltage based on the selected detection signal indicative of the one of a maximum average beam current and a maximum CRT drive voltage, and controls the video signals for the remaining display units based on the respective comparison signals for the remaining display units, thereby making the at least one of respective contrasts and respective luminances of the display units coincide with each other.

9. A multiscreen display apparatus having one large screen formed by combining screens of a plurality of display units having cathode-ray tubes (CRTs), the multiscreen display apparatus comprising:

control means for receiving respective video signals for the display units, and for controlling the video signals to make at least one of respective contrasts and respective luminances of the display units coincide with each other;

means for detecting one of (1) respective average beam currents of the display units and (2) respective average CRT drive voltages of the display units, and for outputting respective detection signals indicative of the detected one of average beam currents and average CRT drive voltages;

means for selecting one of the detection signals indicative of one of (1) a maximum average beam current among the average beam currents and (2) a maximum average CRT drive voltage among the average CRT drive voltages;

means for inserting respective reference voltages in one of a line retrace interval and an overscan interval of the video signals before the video signals have been controlled by the control means to make the at least one of respective contrasts and respective luminances of the display units coincide with each other;

means for extracting the reference voltages from the video signals after the video signals have been controlled by the control means to make the at least one of respective contrasts and respective luminances of the display units coincide with each other; and means for defining the reference voltage extracted from the video signal for one of the display units having the one of a maximum average beam current and a maximum CRT drive voltage as a reference signal, for comparing the reference voltages extracted from the video signals for remaining ones of the display units with the reference signal, and for outputting respective comparison signals for the remaining display units indicative of results of the comparing;

wherein the control means controls the video signals for the one display unit having the one of a maximum average beam current and a maximum CRT drive voltage based on the selected detection signal indicative of the one of a maximum average beam current and a maximum CRT drive voltage, and controls the video signals for the remaining display units based on (1) the selected detection signal indicative of the one of a maximum average beam current and a maximum CRT drive voltage and (2) the respective comparison signals for the remaining display units, thereby making the at least one of respective contrasts and respective luminances of the display units coincide with each other.

10. A multiscreen display apparatus according to claim 9, wherein the control means includes a first stage for controlling the video signals based on the selected detection signal indicative of the one of a maximum average beam current and a maximum CRT drive voltage, and a second stage succeeding the first stage for controlling the video signals based on the comparison signals.

11. A multiscreen display apparatus having one large screen formed by combining screens of a plurality of display units having cathode-ray tubes (CRTs), the multiscreen display apparatus comprising:

control means for receiving respective video signals for the display units, and for controlling the video signals to make at least one of respective contrasts and respective luminances of the display units coincide with each other;

means for detecting one of (1) respective average beam currents of the display units and (2) respective average CRT drive voltages of the display units, and for outputting respective detection signals indicative of the detected one of average beam currents and average CRT drive voltages;

means for selecting one of the detection signals indicative of one of (1) a maximum average beam current among the average beam currents and (2) a maximum average CRT drive voltage among the average CRT drive voltages;

means for inserting respective reference voltages in one of a line retrace interval and an overscan interval of the video signals before the video signals have been controlled by the control means to make the at least one of respective contrasts and respective luminances of the display units coincide with each other;

means for extracting the reference voltages from the video signals after the video signals have been controlled by the control means to make the at least one of respective contrasts and respective luminances of the display units coincide with each other; and means for defining the reference voltage extracted from the video signal for an arbitrarily selected one of the display units as a reference signal, for comparing the reference voltages extracted from the video signals for remaining ones of the display units with the reference signal, and for outputting respective comparison signals for the remaining display units indicative of results of the comparing;

wherein the control means controls the video signals for the arbitrarily selected display unit based on the selected detection signal indicative of the one of a maximum average beam current and a maximum CRT drive voltage, and controls the video signals for the remaining display units based on (1) the selected detection signal indicative of the one of a maximum average beam current and a maximum CRT drive voltage and (2) the respective comparison signals for the remaining display units, thereby making the at least one of respective contrasts and respective luminances of the display units coincide with each other.

12. A multiscreen display apparatus according to claim 11, wherein the control means includes a first stage for controlling the video signals based on the selected detection signal indicative of the one of a maximum average beam current and a maximum CRT drive voltage, and a second stage succeeding the first stage for controlling the video signals based on the comparison signals.

13. A multiscreen display apparatus having one large screen formed by combining screens of a plurality of display units having cathode-ray tubes (CRTs), the multiscreen display apparatus comprising:

first control means for receiving respective video signals for the display units, for controlling the video signals to make at least one of respective contrasts and respective luminances of the display units coincide with each other, and for converting the video signals to respective RGB primary color signals for the display units after the video signals have been controlled by the first control means to make the at least one of respective contrasts and respective luminances of the display units coincide with each other;

second control means for controlling the RGB primary color signals to make at least one of respective amplitudes and respective direct current levels of the respective RGB primary color signals for the display units coincide with each other;

means for detecting one of (1) respective average beam currents of the display units and (2) respective average CRT drive voltages of the display units, and for outputting respective detection signals indicative of the detected one of average beam currents and average CRT drive voltages;

means for selecting one of the detection signals indicative of one of (1) a maximum average beam current among the average beam currents and (2) a maximum average CRT drive voltage among the average CRT drive voltages;

means for inserting respective reference voltages in one of a line retrace interval and an overscan interval of the video signals before the video signals have been controlled by the first control means to make the at least one of respective contrasts and respective luminances of the display units coincide with each other, the reference voltages being included in the RGB primary color signals when the first control means converts the video signals to the respective RGB primary color signals;

means for extracting the reference voltages from the RGB primary color signals after the RGB primary color signals have been controlled by the second control means to make at least one of respective amplitudes and respective direct current levels of the respective RGB primary color signals for the display units coincide with each other; and means for defining the reference voltage extracted from the RGB primary color signals for an arbitrarily selected one of the display units as a reference signal, for comparing the reference voltages extracted from the RGB primary color signals for remaining ones of the display units with the reference signal, and for outputting respective comparison signals for the remaining display units indicative of results of the comparing;

wherein the first control means controls the video signals for the arbitrarily selected display unit and the remaining display units based on the selected detection signal indicative of the one of a maximum average beam current and a maximum CRT drive voltage, thereby making the at least one of respective contrasts and respective luminances of the display units coincide with each other; and wherein the second control means controls the RGB primary color signals for the remaining display units based on the respective comparison signals for the remaining display units, thereby making the at least one of respective amplitudes and respective direct current levels of the respective RGB primary color signals for the display units coincide with each other.

14. A multiscreen display apparatus having one large screen formed by combining screens of a plurality of display units having cathode-ray tubes (CRTs), the multiscreen display apparatus comprising:

control means for receiving respective video signals for the display units, and for controlling the video signals to make at least one of respective contrasts and respective luminances of the display units coincide with each other, the video signals representing at least two different programs;

means for detecting one of (1) respective average beam currents of the display units and (2) respective average CRT drive voltages of the display units, and for outputting respective detection signals indicative of the detected one of average beam currents and average CRT drive voltages;

selecting means for selecting one of the detection signals indicative of one of (1) a maximum average beam current among the average beam currents and (2) a maximum average CRT drive voltage among the average CRT drive voltages, the selecting means including a matrix switch for enabling the selecting means to select a respective detection signal indicative of the one of a maximum average beam current and a maximum average CRT drive voltage for each of the at least two programs;

means for inserting respective reference voltages in one of a line retrace interval and an overscan interval of the video signals before the video signals have been controlled by the control means to make the at least one of respective contrasts and respective luminances of the display units coincide with each other;

means for extracting the reference voltages from the video signals after the video signals have been controlled by the control means to make the at least one of respective contrasts and respective luminances of the display units coincide with each other; and means for defining the reference voltage extracted from the video signal for an arbitrarily selected one of the display units as a reference signal, for comparing the reference voltages extracted from the video signals for remaining ones of the display units with the reference signal, and for outputting respective comparison signals for the remaining display units indicative of results of the comparing;

wherein the control means controls the video signals for the arbitrarily selected display unit based on the selected detection signal indicative of the one of a maximum average beam current and a maximum CRT drive voltage for one of the at least two programs which is displayed on the arbitrarily selected display unit, and controls the video signals for the remaining display units based on (1) the selected detection signal indicative of the one of a maximum average beam current and a maximum CRT drive voltage for respective ones of the at least two programs which are displayed on the remaining display units and (2) the respective comparison signals for the remaining display units, thereby making the at least one of respective contrasts and respective luminances of the display units coincide with each other.

15. A multiscreen display apparatus according to claim 14, wherein the control means includes a first stage for controlling the video signals based on the selected detection signal indicative of the one of a maximum average beam current and a maximum CRT drive voltage, and a second stage succeeding the first stage for controlling the video signals based on the comparison signals.

16. A multiscreen display apparatus having one large screen formed by combining screens of a plurality of display units having cathode-ray tubes (CRTs), the multiscreen display apparatus comprising:

control means for receiving respective video signals for the display units, and for controlling the video signals to make at least one of respective contrasts and respective luminances of the display units coincide with each other;

means for detecting one of (1) respective average beam currents of the display units and (2) respective average CRT drive voltages of the display units, and for outputting respective detection signals indicative of the detected one of average beam currents and average CRT drive voltages;

means for selecting one of the detection signals indicative of one of (1) a maximum average beam current among the average beam currents and (2) a maximum average CRT drive voltage among the average CRT drive voltages;

means for inserting respective reference voltages in one of a line retrace interval and an overscan interval of the video signals before the video signals have been controlled by the control means to make the at least one of respective contrasts and respective luminances of the display units coincide with each other;

means for extracting the reference voltages from the video signals after the video signals have been controlled by the control means to make the at least one of respective contrasts and respective luminances of the display units coincide with each other;

means for defining the reference voltage extracted from the video signal for an arbitrarily selected one of the display units as a reference signal, for comparing the reference voltages extracted from the video signals for remaining ones of the display units with the reference signal, and for outputting respective comparison signals for the remaining display units indicative of results of the comparing; and digital data transmitting means for transmitting the comparison signals to the control means;

wherein the control means controls the video signals for the arbitrarily selected display unit based on the selected detection signal indicative of the one of a maximum average beam current and a maximum CRT drive voltage, and controls the video signals for the remaining display units based on (1) the selected detection signal indicative of the one of a maximum average beam current and a maximum CRT drive voltage and (2) the respective comparison signals for the remaining display units, thereby making the at least one of respective contrasts and respective luminances of the display units coincide with each other.

17. A multiscreen display apparatus according to claim 16, wherein the control means includes a first stage for controlling the video signals based on the selected detection signal indicative of the one of a maximum average beam current and a maximum CRT drive voltage, and a second stage succeeding the first stage for controlling the video signals based on the comparison signals.

18. A multiscreen display apparatus having one large screen formed by combining screens of a plurality of display units having cathode-ray tubes (CRTs), the multiscreen display apparatus comprising:

control means for receiving respective video signals for the display units, and for controlling the video signals to make at least one of respective contrasts and respective luminances of the display units coincide with each other;

means for detecting one of (1) respective average beam currents of the display units and (2) respective average CRT drive voltages of the display units, and for outputting respective detection signals indicative of the detected one of average beam currents and average CRT drive voltages;

means for selecting one of the detection signals indicative of one of (1) a maximum average beam current among the average beam currents and (2) a maximum average CRT drive voltage among the average CRT drive voltages;

means for inserting respective reference voltages in one of a line retrace interval and an overscan interval of the video signals before the video signals have been controlled by the control means to make the at least one of respective contrasts and respective luminances of the display units coincide with each other;

means for extracting the reference voltages from the video signals after the video signals have been controlled by the control means to make the at least one of respective contrasts and respective luminances of the display units coincide with each other; and means for defining the reference voltage extracted from the video signal for one of the display units having the one of a maximum average beam current and a maximum CRT drive voltage as a reference signal, for comparing the reference voltages extracted from the video signals for remaining ones of the display units with the reference signal, and for outputting respective comparison signals for the remaining display units indicative of results of the comparing;

wherein the control means controls the video signals for the remaining display units based on the respective comparison signals for the remaining display units, thereby making the at least one of respective contrasts and respective luminances of the display units coincide with each other.

19. A multiscreen display apparatus having one large screen formed by combining screens of a plurality of display units having cathode-ray tubes (CRTs), the multiscreen display apparatus comprising:

means for correcting respective $\gamma$ characteristics of the cathode-ray tubes to make the respective $\gamma$ characteristics coincide with each other;

control means for receiving respective video signals for the display units, and for controlling the video signals to make at least one of respective contrasts and respective luminances of the display units coincide with each other;

means for detecting one of (1) respective average beam currents of the display units and (2) respective average CRT drive voltages of the display units, and for outputting respective detection signals indicative of the detected one of average beam currents and average CRT drive voltages;

means for selecting one of the detection signals indicative of one of (1) a maximum average beam current among the average beam currents and (2) a maximum average CRT drive voltage among the average CRT drive voltages;

means for inserting respective reference voltages in one of a line retrace interval and an overscan interval of the video signals before the video signals have been controlled by the control means to make the at least one of respective contrasts and respective luminances of the display units coincide with each other;

means for extracting the reference voltages from the video signals after the video signals have been controlled by the control means to make the at least one of respective contrasts and respective luminances of the display units coincide with each other; and means for defining the reference voltage extracted from the video signal for an arbitrarily selected one of the display units as a reference signal, for comparing the reference voltages extracted from the video signals for remaining ones of the display units with the reference signal, and for outputting respective comparison signals for the remaining display units indicative of results of the comparing;

wherein the control means controls the video signals for the arbitrarily selected display unit based on the selected detection signal indicative of the one of a maximum average beam current and a maximum CRT drive voltage, and controls the video signals for the remaining display units based on (1) the selected detection signal indicative of the one of a maximum average beam current and a maximum CRT drive voltage and (2) the respective comparison signals for the remaining display units, thereby making the at least one of respective contrasts and respective luminances of the display units coincide with each other.

20. A multiscreen display apparatus according to claim 19, wherein the control means includes a first stage for controlling the video signals based on the selected detection signal indicative of the one of a maximum average beam current and a maximum CRT drive voltage, and a second stage succeeding the first stage for controlling the video signals based on the comparison signals.

21. A multiscreen display apparatus having one large screen formed by combining screens of a plurality of display units having cathode-ray tubes (CRTs), the multiscreen display apparatus comprising:

control means for receiving respective video signals for the display units, and for controlling the video signals to make at least one of respective contrasts and respective luminances of the display units coincide with each other;

means for detecting one of (1) respective average beam currents of the display units and (2) respective average CRT drive voltages of the display units, and for outputting respective detection signals indicative of the detected one of average beam currents and average CRT drive voltages;

means for selecting one of the detection signals indicative of one of (1) a maximum average beam current among the average beam currents and (2) a maximum average CRT drive voltage among the average CRT drive voltages;

means provided within each of the display units for inserting respective reference voltages in one of a line retrace interval and an overscan interval of the video signals before the video signals have been controlled by the control means to make the at least one of respective contrasts and respective luminances of the display units coincide with each other;

means fox extracting the reference voltages from the video signals after the video signals have been controlled by the control means to make the at least one of respective contrasts and respective luminances of the display units coincide with each other; and means for defining the reference voltage extracted from the video signal for an arbitrarily selected one of the display units as a reference signal, for comparing the reference voltages extracted from the video signals for remaining ones of the display units with the reference signal, and for outputting respective comparison signals for the remaining display units indicative of results of the comparing;

wherein the control means controls the video signals for the arbitrarily selected display unit based on the selected detection signal indicative of the one of a maximum average beam current and a maximum CRT drive voltage, and controls the video signals for the remaining display units based on (1) the selected detection signal indicative of the one of a maximum average beam current and a maximum CRT drive voltage and (2) the respective comparison signals for the remaining display units, thereby making the at least one of respective contrasts and respective luminances of the display units coincide with each other.

22. A multiscreen display apparatus according to claim 21, wherein the control means includes a first stage for controlling the video signals based on the selected detection signal indicative of the one of a maximum average beam current and a maximum CRT drive voltage, and a second stage succeeding the first stage for controlling the video signals based on the comparison signals.

* * * * *